(12) United States Patent
Rand

(10) Patent No.: US 9,462,115 B2
(45) Date of Patent: Oct. 4, 2016

(54) UNIFIED COMMUNICATIONS SYSTEM AND METHOD

(71) Applicant: James S. Rand, Ingleside (CA)

(72) Inventor: James S. Rand, Ingleside (CA)

( * ) Notice: Subject to any disclaimer, the term of this patent is extended or adjusted under 35 U.S.C. 154(b) by 0 days.

(21) Appl. No.: 14/770,114

(22) PCT Filed: Apr. 4, 2014

(86) PCT No.: PCT/CA2014/050342
§ 371 (c)(1),
(2) Date: Aug. 25, 2015

(87) PCT Pub. No.: WO2014/161091
PCT Pub. Date: Oct. 9, 2014

(65) Prior Publication Data
US 2016/0036962 A1 Feb. 4, 2016

Related U.S. Application Data

(60) Provisional application No. 61/808,334, filed on Apr. 4, 2013, provisional application No. 61/905,228, filed on Nov. 17, 2013.

(51) Int. Cl.
*H04W 76/04* (2009.01)
*H04M 1/725* (2006.01)
(Continued)

(52) U.S. Cl.
CPC .......... *H04M 1/72569* (2013.01); *G06F 3/165* (2013.01); *G10L 25/78* (2013.01); *H04H 60/80* (2013.01); *H04H 60/85* (2013.01); *H04L 12/58* (2013.01); *H04L 51/046* (2013.01);
(Continued)

(58) Field of Classification Search
CPC . H04W 84/18; H04W 76/045; H04W 88/06; H04R 1/1041; H04M 3/527; H04S 7/00; G06Q 30/0601
USPC ........................................................ 455/418
See application file for complete search history.

(56) References Cited

U.S. PATENT DOCUMENTS 7,020,292 B1 * 3/2006 Heubel .................. H03G 3/342
379/93.29
8,346,284 B2 1/2013 Khokhlov
(Continued)

FOREIGN PATENT DOCUMENTS

WO WO-2014/161091 10/2014

OTHER PUBLICATIONS

"International Application No. PCT/CA2014/050342, International Preliminary Report on Patentability mailed Jun. 18, 2015", 14 pgs.
(Continued)

*Primary Examiner* — William Nealon
(74) *Attorney, Agent, or Firm* — Schwegman Lundberg & Woessner, P.A.

(57) ABSTRACT

A unified communications system enables a user to simultaneously manage real time voice communication with background audio streams such as a music. In one embodiment, the system comprises a plurality of devices connected through a persistent voice over IP channel, where each device is playing background audio independently, and each device is operatively coupled to a microphone. When a connected user speaks, Voice Activity Detection results in the automatic adjustment of background audio on other connected devices, the adjustments based upon user-input settings on each device.

22 Claims, 62 Drawing Sheets

(51) Int. Cl.
| | |
|---|---|
| *H04L 12/58* | (2006.01) |
| *H04M 3/527* | (2006.01) |
| *H04M 3/53* | (2006.01) |
| *H04R 3/12* | (2006.01) |
| *H04W 4/02* | (2009.01) |
| *H04H 60/80* | (2008.01) |
| *H04H 60/85* | (2008.01) |
| *H04R 1/10* | (2006.01) |
| *G10L 25/78* | (2013.01) |
| *H04M 1/656* | (2006.01) |
| *G06F 3/16* | (2006.01) |
| *H04R 27/00* | (2006.01) |
| *H04W 84/18* | (2009.01) |

(52) U.S. Cl.
CPC ....... *H04M 1/656* (2013.01); *H04M 1/72558* (2013.01); *H04M 1/72563* (2013.01); *H04M 1/72583* (2013.01); *H04M 3/527* (2013.01); *H04M 3/53* (2013.01); *H04R 1/1041* (2013.01); *H04R 3/12* (2013.01); *H04W 4/02* (2013.01); *H04W 76/045* (2013.01); *H04R 27/00* (2013.01); *H04R 2227/003* (2013.01); *H04R 2227/009* (2013.01); *H04R 2420/01* (2013.01); *H04R 2420/07* (2013.01); *H04R 2430/01* (2013.01); *H04W 84/18* (2013.01)

(56) References Cited

U.S. PATENT DOCUMENTS

| | | | |
|---|---|---|---|
| 8,391,719 | B2 | 3/2013 | Alameh et al. |
| 2004/0101145 | A1* | 5/2004 | Falcon ..................... H04S 7/00 |
| | | | 381/64 |
| 2005/0071253 | A1* | 3/2005 | Yang .................. G06Q 30/0601 |
| | | | 705/26.1 |
| 2006/0132382 | A1 | 6/2006 | Jannard |
| 2011/0142016 | A1 | 6/2011 | Chatterjee |
| 2011/0206099 | A1 | 8/2011 | Rofougaran et al. |
| 2012/0159011 | A1 | 6/2012 | Rostaing et al. |
| 2013/0322665 | A1* | 12/2013 | Bennett ............ G08G 1/096855 |
| | | | 381/300 |

OTHER PUBLICATIONS

"International Application No. PCT/CA2014/050342, International Search Report and Written Opinion mailed Jun. 17, 2014", 19 pgs.

* cited by examiner

Container - Audio Settings — 7027

Audio Settings

Reduce External Audio Volume When:
E.g. this will reduce music or game volume when the following events take place: — 7012

| External Events | | Full Volume | Total Quiet | |
|---|---|---|---|---|
| | | | | — 7013 |
| Phone calls outside of TurnMeUp | ✓ | | —O— | — 7014 |
| Calls to and from Skype | ✓ | | —O— | — 7015 |
| External Notifications | ✓ | —O— | | |

TurnMeUp Events — 7016

| During walkie talkie mode | ✓ | —O— | | — 7017 |
|---|---|---|---|---|
| During entire two way call | ☐ | O— | | — 7018 |
| When voice detected in two way calls | ☐ | —O— | | — 7019 |
| TurnMeUp Notifications | ☐ | O— | | |

Make Specific Apps Louder/Quieter

| | Quieter | Default | Louder | |
|---|---|---|---|---|
| | | | | — 7020 |
| iTunes [100%] | | —O— | | — 7021 |
| Spotify [100%] | | —O— | | — 7022 |
| YouTube [100%] | | —O— | | — 7023 |
| TurnMeUp Notifications [100%] | | —O— | | — 7024 |
| Other Notifications [100%] | | —O— | | — 7025 |
| All Others [100%] | | —O— | | |

[ Add more apps to list ]

Automatically detect and manage voice — 7026
E.g. this will recognize human voice (not voice with music) in other applications and automatically normalize the volume, setting it to the default voice level.

YouTube ☐

Google Chrome ☐

FIG. 7A

Container - Planner, Friend Availability

Individual Search

- 7034 — Search For: Friends, Family, Co-Workers
- 7038 — Available For: All Statuses, Live Music/Concert ✓, Movie ✓, Working ✓, Going Out, Custom Statuses
- 7035 — From: Now  Until: 11:00p
- 7036 — Additional Filters
- 7037 — Available entire timeframe: ✓; Online Now (within 2 mins): ✓; Match unscheduled time: ☐

Go

Group Search

Add Friends
- 7039 — Pat, Liz, Sid, Adrien, Vero, Mario

Show me when
- 7040 — All ☐ or At least 3 ✓ are available
- 7041 — Between Tomorrow And 21/02/2014
- For a minimum of 30 minutes
- 7042 — Match unscheduled time ☐

Menu Bar

Normal State of Menu Bar (Bottom, Dark Colored)

Expanded State of Menu Bar

System Architecture, Example 4

Client-Server Example

Peer to Peer Example

UNIFIED COMMUNICATIONS SYSTEM AND METHOD

TECHNICAL FIELD

The present invention relates generally to telecommunications and more particularly to voice and audio communications.

BACKGROUND

Electronic voice service inefficiencies limit the amount people communicate. Some examples of these inefficiencies are:
1. Unscheduled calls often interrupt the recipient because the callers are unaware of what the recipients are doing at that time.
2. Spontaneous discussion is limited by Traditional 2-way communication systems. When nobody is speaking, silence is awkward, and the call ends.
3. Existing communication services are not unified (e.g. Text messaging services, Push To Talk, 2-way communication, group conferencing, video calling, file sharing, etc.).
4. People need to interrupt the audio from their other applications in order to connect. This may include taking headphones off, turning volume down manually, having audio ducked automatically, or manually pausing playback.
5. Establishing connections between parties can take time, often including a need to dial and wait for an answer.
6. In public places: Communications are limited when background music/noise is loud (as in bars). People are forced to yell or stand so close that eye contact and non-verbal communication is lost.

Furthermore, digital voice communications and music have conventionally been delivered on separate channels and through separate applications. Communications applications typically build in code that causes the music audio to be "ducked" to a fixed level for incoming calls and other events such as voice message playback and notifications, for example. Ducking involves reducing the level of one audio signal by the presence of another, such as lowering the volume of music during a call. Typically, communications software, mobile operating systems, and other software applications including music services presume that ducking is desirable. The present applicant recognizes that ducking is not always desirable, and that the user should be able to control both the presence and level of ducking according to his/her preferences and to levels calculated based on background noise and other factors. The applicant further recognizes that selective ducking of certain frequencies may be desirable, and that other audio mixing techniques may provide for a better user experience in a variety of use cases. It is therefore desirable to provide a system, architecture, and User Interface that is purpose designed for use cases where typical systems fail to provide the level of control and audio mixing functionality necessary for modes of communication in which voice is mixed with other audio signals in real time. A partial architecture exists through prior art that is particular to the gaming industry. It is desirable to leverage this architecture and to develop it further for many other use cases, especially as related to the use of mobile devices and emerging hardware technologies.

Limitations in electronic communication can also have implications for productivity. When teams share a physical workroom their productivity is significantly higher due to increased collaboration and spontaneous communication. When teams are spread out, spontaneous communication is decreased. When people have spontaneous thoughts or questions that should be shared, they stop to consider whether the thought is "important enough" for a phone call. Often spontaneous thoughts are potentially important, and immediate communication could help to save time and errors, but this is non-obvious to the person contemplating the call. In addition, there is a risk that the recipients will not be there to answer the call. In this case, a follow up call is often delayed and forgotten as the caller resumes other work. It is therefore desirable to provide a communications system that encourages spontaneous communication and provides automated tools to alert and connect parties as they become available, without interrupting them. An embodiment of this system designed for team collaboration would likely increase productivity significantly.

In general, a novel technology is desirable to provide a new communications paradigm for interacting with others and for integrating the delivery of voice with music and other audio.

SUMMARY OF THE INVENTION

The invention encourages spontaneous communication by combining a number of features into a single, unified communications application aimed at addressing common problems created by traditional communication methods. Several embodiments of the present invention contain a design and architecture that encourages persistent voice connections that can run silently in the background with minimal data consumption during silence, with the ability to activate almost instantaneously through speech detection. The platform includes advanced audio management capabilities that allow users to collaborate without interrupting audio from other applications, music, videos, and communication channels. Several embodiments also contain a virtual workroom and other flexible interface features that encourage friends and co-workers to 'stay connected' all the time. This document will make reference to persistent voice connections, which refer to voice communication channels that persist over time. This is analogous to persistent text based chat, but is made feasible for voice channels through the use of modern silence suppression technology. The present invention leverages this technology, and other technologies, through novel combinations of existing hardware and software, as well as innovative new features, UI designs, methods and techniques, to solve common communication problems.

The six problems of the prior art are solved by one or more embodiments of the present invention as follows:
1. Unscheduled calls often interrupt the recipient because the callers are unaware of what the recipients are doing at that time. Embodiments of the invention contain planning features and status indicators that help users to solve this problem.
2. Spontaneous discussion is limited by Traditional 2-way communication systems. When nobody is speaking, silence is awkward, and the call ends. Embodiments of the invention are optimized for "always connected" 2-way and multi-way communication. This optimization is derived from the interface design, audio mixing flexibility, and the use of silence suppression technology. For the purposes of this specification, 2-way communications means a duplex communication.
3. Existing communication services are not unified (e.g. Text messaging services, Push To Talk, 2-way communication, group conferencing, video calling, file sharing, etc.). Embodiments of the invention combine these services into a single platform in order to simplify communications and unify contact networks on a single platform (e.g. When texting with a friend, there is no need to open another app to send a file, share music, or speak. This is especially important because this friend may not have the other app necessary).

4. People need to interrupt the audio from their other applications in order to connect. This may include taking headphones off, turning volume down manually, having audio ducked automatically, or manually pausing playback. While this is sometimes desirable, it is not always the case. For example, two friends may be walking to school together and each wishes to listen to music, but to still be able to communicate. They would like to leave a voice connection open the entire time, but not have the audio "ducked". They may prefer only slight ducking or no ducking at all; it is a matter of personal preference. Embodiments of the invention have features to take these preferences into account. Furthermore, when communicating with nearby users, embodiments of the invention can establish peer to peer communications that function in the absence of internet signals, allowing users to communicate without taking their headphones off.

5. Establishing connections between parties can take time, often including a need to dial and wait for an answer. Embodiments of the invention facilitate the use of persistent, silence suppressed voice connections, allowing for near instantaneous connection through manual or voice detection driven unmuting.

6. In public places: Communications are limited when background music/noise is loud (as in bars). People are forced to yell or stand so close that eye contact and non-verbal communication is lost. When headphones are used in place of loud speakers in noisy public environments, embodiments of the invention will provide individual control over voice and music levels thereby solving communication problems in establishments such as nightclubs. Patrons could thus communicate with one another without yelling or needing to be extremely close. Patrons could also communicate from greater distances, limited only by the network provided (e.g. line of sight, another room, a different bar, or another city).

Some of the embodiments of the invention provide a headphones-optimized communications application that allows a user to manage simultaneous voice and audio streams. This means the user can listen to music, play games, or watch movies while talking to others on a phone, tablet, or computer. These embodiments will include the use of silence suppression technology to minimize data consumption during silence, allowing users to stay connected for hours while working, playing, running, cleaning the house, or doing just about anything else.

The embodiments of the invention combine a number of features into a single, unified communications application aimed at addressing common problems in existing electronic communications networks. In some cases, individual novel features solve the problems by themselves. In others, it is a non-obvious combination of features in a single system that provides value to the end user through ease of use and/or other synergies. Below many of these problems are described, as well as how they are addressed by this novel technology. Some problems are particular to use cases in the commercial and enterprise domains.

Generally speaking, consumer and enterprise use cases require similar embodiments of this technology, while commercial use cases require adaptations including purpose-built features to solve problems that are particular to individual commercial use cases. For this reason, commercial adaptations of the technology have been described in a dedicated section under Detailed Description of Embodiments.

The invention may be implemented using the system architecture shown in FIG. 12. As shown by way of example in FIG. 12, a system will normally include a first communication device (Device 1), a second communication device (Device 2), optionally other communication devices, and applications for executing a set of instructions on the devices. The instructions generally come from 3 sources: audio inputs, voice inputs, and control inputs, as described further in Detailed Description of Embodiments. In most embodiments, an audio output is necessary, and in a number of embodiments, other inputs and outputs are possible. In some exemplary embodiments:

Headsets are used as a Voice Input and Audio Output (i.e. the microphone on the headset is the input, the headphone speakers are the output).

Device 1 and Device 2 are mobile devices that are connected through a network permitting voice and data communication. The devices further act as the Audio Input (i.e. music played from the device's music library), and Control Inputs (the devices' touchscreens and buttons), as well as a Display Output (the screen).

The Application is a mobile application embodied as a computer readable medium executed by the mobile devices.

The Application optionally contains code for executing the mixing and control of Voice Inputs and Audio Inputs through commands input to the mobile device.

The Application optionally contains code for delivering features that help users to determine the availability of their friends for communication and collaboration. The application may display this information as a status or make use of it in other features.

The Application optionally contains code for delivering "Gamification" features for encouraging communications among device users who may not already be acquainted, as in a nightclub or other public space.

Other Inputs may include GPS, RFID, Indoor Positioning Systems, or other positioning system functionality in conjunction with the same mobile application to enable position based application features.

Other Inputs may also include hardware such as gyros, accelerometers, NFC, Bluetooth, Wi-Fi, and other device subsystems.

Accordingly, one aspect of the present invention is a system comprising a first set of headphones worn by a first user and a first mobile device connected to the first set of headphones and executing an integrated conversation and music management application for selectively listening to music and conversing with a second user. The system further comprises a second set of headphones worn by the second user and a second mobile device connected to the second set of headphones and executing an integrated conversation and music management application for listening to music and for conversing with the first user. Headphones or a headset, for the purposes of this specification, includes a microphone mounted to the headphones or headset although it will be appreciated that the headphones or headset may operate with a separate or standalone microphone.

Another aspect of the present invention is a method comprising steps, acts, or operations of connecting a first mobile device to a first set of headphones worn by a first user, executing an integrated conversation and music management application on the first mobile device for selectively listening to music and conversing with a second user; connecting a second mobile device to a second set of headphones worn by the second user; and executing an integrated conversation and music management application on the second mobile device for listening to music and for conversing with the first user.

Yet another aspect of the present invention is a mobile device comprising a memory for storing an integrated conversation and music management application selectively listening to music and conversing with one of a plurality of other users. The mobile device further includes a processor operatively coupled to the memory for executing the integrated conversation and music management application to cause a displays screen to display a management screen for managing music and conversations with the other users.

Yet a further aspect of the present invention is a computer-readable medium comprising instructions in code which are stored in a memory of a mobile device and executable by a processor of the mobile device to cause the mobile device to execute an integrated conversation and music management application for selectively listening to music and conversing with one of a plurality of other users and to cause the mobile device to display a management screen for managing music (or other audio content such as TV, news, etc.) and conversations with the other users.

Yet a further aspect of the present invention is a method of downloading an application to a mobile device, the method comprising determining a current location of the mobile device; detecting that the current location of the mobile device matches a location of a bar; and downloading a bar-specific application to the mobile device, the application containing a bar map and an interface for buying drinks for other users.

Yet a further aspect of the present invention is a method of interacting with mobile device users in a bar, the method comprising sending a game request to another mobile device user; receiving a game request acceptance from the other mobile device user; wherein the game promotes interactions between users by requiring that one user communicate with another user in order to play the game.

Another aspect of the present invention is a computer-readable medium comprising instructions in code which are stored in a memory of a mobile device and executable by a processor of the mobile device to cause the mobile device to execute an integrated conversation and music management application for selectively listening to music and conversing with one of a plurality of other users and to cause the mobile device to display a management screen for managing music (or other audio content) and conversations with the other users.

Another aspect of the present invention provides an ability to handle calls and/or incoming voice messages according to specific settings assigned to a friend (caller). This provides a system for friend-specific permissions that enables sound signals to be handled according to the user's preferences. For example, a broadcast message can go either directly to the ear (i.e. speaker or earphone) or to an inbox, depending on who sends it, and depending on the user's availability status. Duplex calls can also be initiated without the need to accept first, but this permission can be specific to certain friends.

The present invention also provides a novel mobile interface that presents (on a single UI) multiple user-selectable modes of communication for each friend or contact. The UI optionally also presents the status of how outgoing messages will be handled by the receiving friend.

This invention may thus be used in digital voice communication, e.g. VoIP calls, between one device and another, and especially between mobile devices. Music content may also be managed in response to user input to control the relative volume of the music as compared with the voice call.

Another aspect of the present invention is a computer-readable medium comprising instructions in code which are stored in a memory of a mobile device and executable by a processor of the mobile device to cause the mobile device to display a first user interface element for controlling a volume of music, display a second user interface element for controlling a volume of a voice communication, in response to user input received via the first user interface element, adjust the volume of the music and in response to user input received via the second user interface element, adjust the volume of the voice communication.

Another aspect of the present invention is a computer-readable medium comprising instructions in code which are stored in a memory of a mobile device and executable by a processor of the mobile device to cause the mobile device to display a user interface element that adjusts a relative volume of music compared to a volume of a voice communication; and in response to user input received via the user interface element, adjust the relative volume of the music and voice communication.

Another aspect of the present invention is a computer-readable medium comprising instructions in code which are stored in a memory of a mobile device and executable by a processor of the mobile device to cause the mobile device to establish a persistent communication connection with another communication device; activate silence suppression in order to substantially reduce an average bit rate during silence by more than 90%; present a user interface element to mute or unmute a voice signal for the persistent communication; and receive user input via the user interface element to mute or unmute the voice signal for the persistent communication connection.

Another aspect of the present invention is a method of establishing a communication link between a first headset and a second headset, the method comprising detecting a proximity of the first and second headsets; and automatically establishing the communication link between the first and second headsets in response to detecting the proximity of the first and second headsets.

Another aspect of the present invention is a method of establishing a communication link between a first headset and a second headset, the method comprising determining a first line of sight using a position-determining subsystem and a gyro in the first headset; determining a second line of sight using a position-determining subsystem and a gyro in the second headset; automatically establishing the communication link between the first and second headsets in response to detecting that the first and second line of sights point toward each other for more than a preset amount of time.

Another aspect of the invention is a computer-readable medium comprising instructions in code which are stored in a memory of a mobile device and executable by a processor of the mobile device to cause the mobile device to display a visual layout providing user interface elements enabling users to add, arrange, and delete groups of friends and communications channels from the visual layout, wherein the visual layout presents different types of communications channels including persistent, dynamic, and proximal.

Another aspect of the invention is a system comprising a first set of headphones worn by a first user wherein the first set of headphones comprises either an FM receiver or a Wi-Fi receiver for receiving broadcast music; a second set of headphones worn by a second user wherein the second set of headphones comprises either an FM receiver or a Wi-Fi receiver for receiving broadcast music; communications hardware enabling duplex voice communication through the headphones; and a music transmitter to broadcast the music to the headphones.

Another aspect of the invention is a method of interacting with mobile device users in a public establishment, the method comprising: determining that the mobile device users are located at the public establishment; sending a game request to another mobile device user; receiving a game request acceptance from the other mobile device user; wherein the game promotes interactions between users by requiring that one user communicate by either text or voice with another user in order to play the game.

Another aspect of the invention is a method of interacting with mobile device users connected to a private network, the method comprising: determining that the mobile device users are connected to private network; sending a game request to another mobile device user; receiving a game request acceptance from the other mobile device user; wherein the game promotes interactions between users by requiring that one user communicate by either text or voice with another user in order to play the game.

The summary is intended to present only the most significant inventive aspects that are now apparent to the inventor and is not intended to be an exhaustive or limiting recitation of all inventive aspects. Other inventive aspects of the disclosure may become apparent to those of ordinary skill in the art.

BRIEF DESCRIPTION OF THE DRAWINGS

Further features and advantages of the present invention will become apparent from the following detailed description, taken in combination with the appended drawings, in which:

FIGS. 1a through 8c depict a graphical user interface (GUI) for one embodiment of a mobile application.

FIGS. 1a through 1j depict the "Assistant" feature.
FIG. 7a illustrates a set of audio settings that would encourage use of persistently running, silenced voice connections in a number of use cases, especially when used simultaneously with other audio containing apps.

FIG. 7c depicts the container for the Friend Availability component of the planner that was described in FIGS. 1d, 1e, and 1f.

FIG. 7d depicts the container for the bar map illustrated in FIG. 6a.

FIG. 7e illustrates that multi-level commercial establishments can contain multiple layout maps, linked through user interface buttons as illustrated in FIG. 6a.

FIG. 8c depicts an embodiment of "Offline Mode".

FIG. 10c illustrates a simple bar map, analogous to that already described in FIG. 6a.

DETAILED DESCRIPTION OF EMBODIMENTS

Figure 1A:
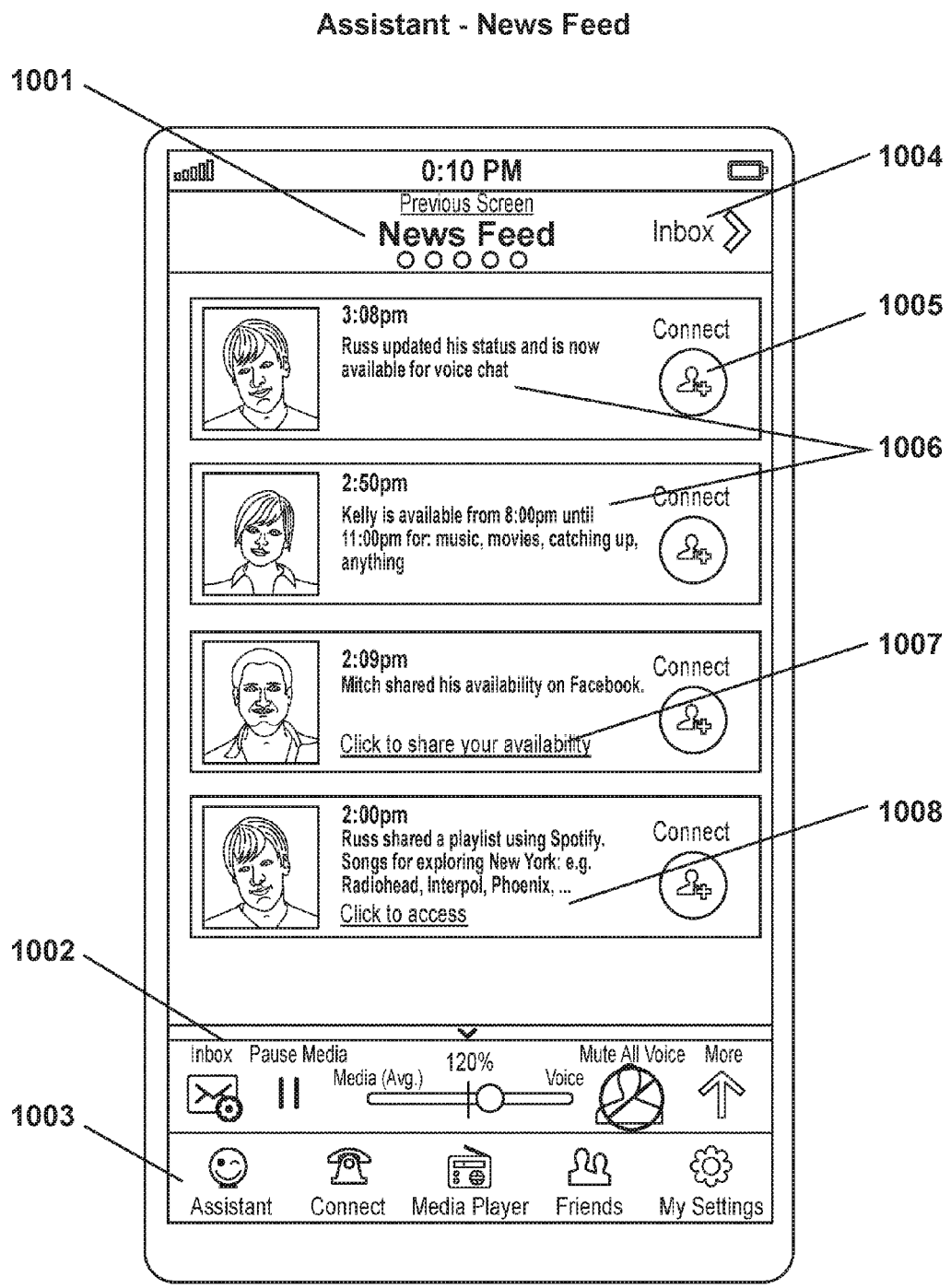

In general, aspects of the present invention provide the following innovative features:

UI designed for Persistent Connections: a novel UI design enables simple muting and unmuting of persistent connections; this obviates the need to dial, let the phone ring, and to wait for session initiation or call connection. The interface is specifically designed to take advantage of silence suppression and audio mixing capabilities to encourage people to leave connections open in the background—something that is not feasible by running software like Skype in the background, for example. In other words, the UI presents a user interface element to mute and unmute a conversation or a persistent connection with another communication device. In one embodiment, multiple persistent connections may be managed by the computer readable medium. In such a case, the UI presents a mute and unmute button or user interface element for each conversation or persistent connection. In one specific embodiment, the unmute capability may be disabled when there is at least one other unmute button activated for another conversation.

Media mode: the interface uses the friends' music as a status indicator (e.g. is it playing, paused), providing more insight than existing statuses like "Online" or "Active 10 minutes ago". The mode is optional, both for privacy and battery conservation reasons.

Virtual Room: The persistent connections may be expanded or adapted to provide virtual rooms purpose-designed for enterprise/education/productivity, or for mobile applications or collaboration. A virtual room would facilitate group communications by providing the group and individual communication functionality as described above and in FIG. 7k.

Connect Screen: A connect screen consolidates a combination of the above features on a single screen for user convenience. The connect screen includes relevant information and options all in one place (normally multiple applications or multiple screens would be required). One aspect is the adjacent pairing of PTT and Duplex mode. Another aspect is the inclusion of indicator lights, showing whether PTT will go to Inbox or direct, and whether Duplex will be direct (e.g. unmuting a persistent connection) or require a traditional "phone call" dial and answer method.

Planner: There are four aspects to the novel planner concept. Aspect 1 is by including a planner with a communications app. More conversations, both spontaneous and planned, are encouraged by unifying the planner's elements with a communications app, especially a VoIP based communications app. The ability to schedule calls and alert users when their friend's availability/status changes shed some insight on the synergies between planning and communication. Aspect 2 is the group search function that automatically recognizes when there are multiple people available. Aspect 3 is an "Availability For" and "Availability To"—differentiated by friend/circle and purpose. (See planner drawings) Aspect 4 is used in conjunction with a planner widget, readily available when thinking about calling someone (see FIG. 2b.)

Combination of planner with suggestions and communication: group communication is central to organizing outings and planning events. Existing events-planning websites and other suggestions lack the voice communication and planning mechanisms which wrap the entire process together and make it easier for people to initiate and follow through with group planning.

Live Streaming Method: Live streaming as a method of expanding the audience for live events by enabling real-time communications during the broadcast. Live streaming is not a new concept, but the concept of enabling friends to communicate via voice/video in real time is. The communication aspect of live event streaming is critical to encouraging people to pay for live broadcasts because consumption of many types of media is more enjoyable with friends. Live streaming communications creates the impression of "doing things together". This method encourages much larger audiences than would otherwise be reached through existing online streaming channels.

Relative Volume Slider(s): the slider is a user interface element that is responsive to user input to mix VoIP and background music using simple user control. See FIG. 8b. In a first embodiment, the UI presents a single relative slider as one example of the user interface element. The second embodiment provides the "ducked volume control" which allows the user to visually set the difference between normal background audio level and the ducked level which is activated whenever voice (or another audio source) is detected.

Auto Ducker: this provides a novel technique to mix VoIP and background music. This may be combined with Voice Activity Detection which is an improvement over existing ducking which utilizes the push of a button (e.g. Duck when push to talk, or when push button to establish call). A further refinement would include the ability to duck a specific frequency range, generally the voice frequency range.

Adjustable Speech Recognition Setting: would be used to improve voice detection and work in conjunction with the auto ducker. It would also be used to improve noise cancellation in noisy environments.

Media cancellation: Because existing noise-cancellation mechanisms assume noise is ambient and unpredictable, prediction and cancellation can be improved by considering the source of the noise, which is often the same as the device that can cancel it (e.g. a phone playing music that comes through a car's speakers with which the phone is paired or connected). In one sense, media cancellation would be similar to echo cancellation, in the sense that a known signal is subtracted at a point where it is not desired, such as a microphone. The architecture of the code required to determine the signal to cancel, however, would be particular to the embodiment of the system comprising audio signals from media and voice signals together.

Voice & Audio Clip: Traditional audio clips are one of two things: a clip inserted from an existing audio file, or a recording of the microphone. Embodiments of the invention are designed to enable the simultaneous recording of background streams with voice over as detected through the microphone, in real time, splitting the audio streams into two pieces but recording them simultaneously and having an option to process each individually before superimposing into a single signal.

Other methods or implementations of this technology may include:

Method for initiating voice communication through headset: Phone contact

Method for initiating voice communication through headset: NFC

Method for initiating voice communication through headset: Proximity (GPS/IPS—sensors could be on headset, on phone, or separate hardware)

Method for initiating voice communication through headset: Line of sight: Gyro based Method for initiating voice based communication through headset: magnetometer (or compass)

Method for initiating communication through headset: augmented reality (see description above)

Method for initiating sound overlay: Gyro based line of sight (see silent disco use case description above)

Method for establishing a 2-way call connection: first looking at receiving party's settings and then deciding whether the operation is an "unmute" or "session initiate" procedure.

Method for establishing a PTT connection: first looking at the receiving party's settings and then deciding whether the operation is an "unmute 1 way communication" or "record voice audio clip" procedure.

Automatically detect and manage voice settings as shown by way of example in FIG. 7a.

Method for initiating and controlling Voice Commands, and shutting off listening during 2-way conversation until predetermined time (e.g. 5 seconds) of silence is detected. This provides a method of controlling voice navigation during 'voice-based communication', as opposed to other voice navigation programs where the user would not otherwise need to speak.

Method for combining voice and music in the silent disco headset hardware—e.g. soldering or connecting the communication hardware directly to the speaker, such that an FM transmitted signal is one lead and communication hardware is a second lead.

Method that connects the calendar to "auto-accept incoming calls and PTT messages" . . . e.g. If the user sets a recurring "Available To" for friends and family, then the user can select an option to change the auto-accept settings for those friends, during those times.

Various embodiments of these aspects of the invention are described below with reference to the drawings. These various embodiments may be implemented as part of different system architectures. It will also be appreciated that the voice and data connections shown in these embodiments may be wired or wireless.

FIGS. 1a through 8c depict a graphical user interface (GUI) for a mobile application embodied as a non-transitory, tangible or fixed computer-readable medium in accordance with one embodiment of the present invention. This embodiment is exemplary only, and could be easily adapted to a desktop or web application, or another mobile application designed for different screen sizes and gestures. Furthermore, the GUI design and layout of buttons, graphics, and text, are only one of many possible software embodiments that derive their utility from the same underlying concepts. The figures are grouped according to the GUI design of this mobile application, where each group of figures corresponds with a "section" of the app that contains similar functionality. An important aspect of the invention is that each of these sections are interconnected so that they function seamlessly together and input from one section can provide additional utility in another. Furthermore, the functionality in each section is driven by a database that is common to all sections. Communications applications are essentially network goods by nature (i.e. more friends=more utility), and many of the features depicted in each section are also network goods. But the unified communications system is not only a network good in the sense that a larger user base provides more utility. It is also a network good in the sense that combining certain features in a unique way provides more utility through synergies between the features. For example, a planning application will derive far more utility when it is tied to the same user base as a texting and calling application, since planning involves communication. When the planning app has a separate user base, friends using the planning app may have to resort to multiple modes of communication, depending on what communications app each friend has available. Another example of the synergies obtained through a unique combination of features is exemplified by the mixing of VoIP based communications (the "Connect" section represented in FIGS. 2a through 2h) with music (one function of the "Media Player" section represented in FIGS. 4a through 4d). Containing these two seemingly disparate functions within one application, establishing quick links between them, and providing audio settings for their use together increases the likelihood that users will be willing to run persistent VoIP communications in the background while listening to music, and to use other music based features such as sharing music (i.e. because users can continually see what their friends are listening to when they are considering communicating with them, as shown in FIG. 2a). Tying related features together provides simplicity and efficiencies in planning, communication, and other social functions that result in an increased probability and frequency of users engaging with these functions. In FIGS. 1a through 6a, the sections of the application are primarily linked together through a menu bar (1003) and a shortcut bar (1002), which are further described in FIGS. 8a and 8b. While many configurations of the menu and shortcut bars are possible, the point is only to illustrate that the GUI can be specifically designed to increase the likelihood that the features will be used together by making it easy for the user to link between them and realize the utility of using them together. Within each "section", navigation is achieved by clicking the "Forward Screen Toggle" (1004) and "Backward Screen Toggle" (1033) as shown in FIG. 1c. This could also be done by swiping left/right on touch screens, or any of several other methods. The layout and navigation methodology depicted in FIGS. 1a through 8c is only exemplary. FIGS. 7a through 7l do not depict a separate "section" of the app. Rather, they are "containers" that are already represented in other figures, but cannot be shown all at once in the context of a mobile application due to mobile device screen size limitations. Generally only a part of these containers will be represented at once on a mobile device's screen, and the user can scroll through the entire container. Each group of figures is described in more detail below.

Figure 1B:
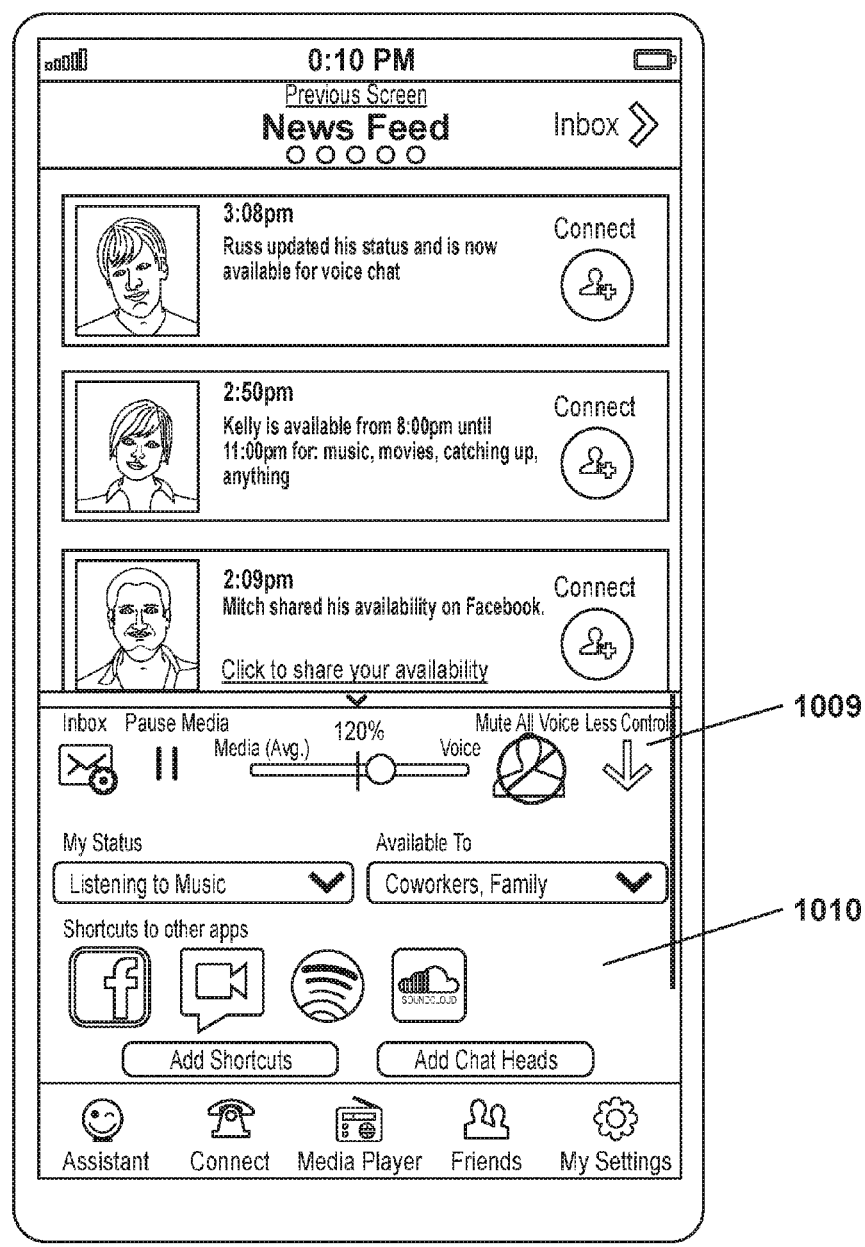
Figure 1C:
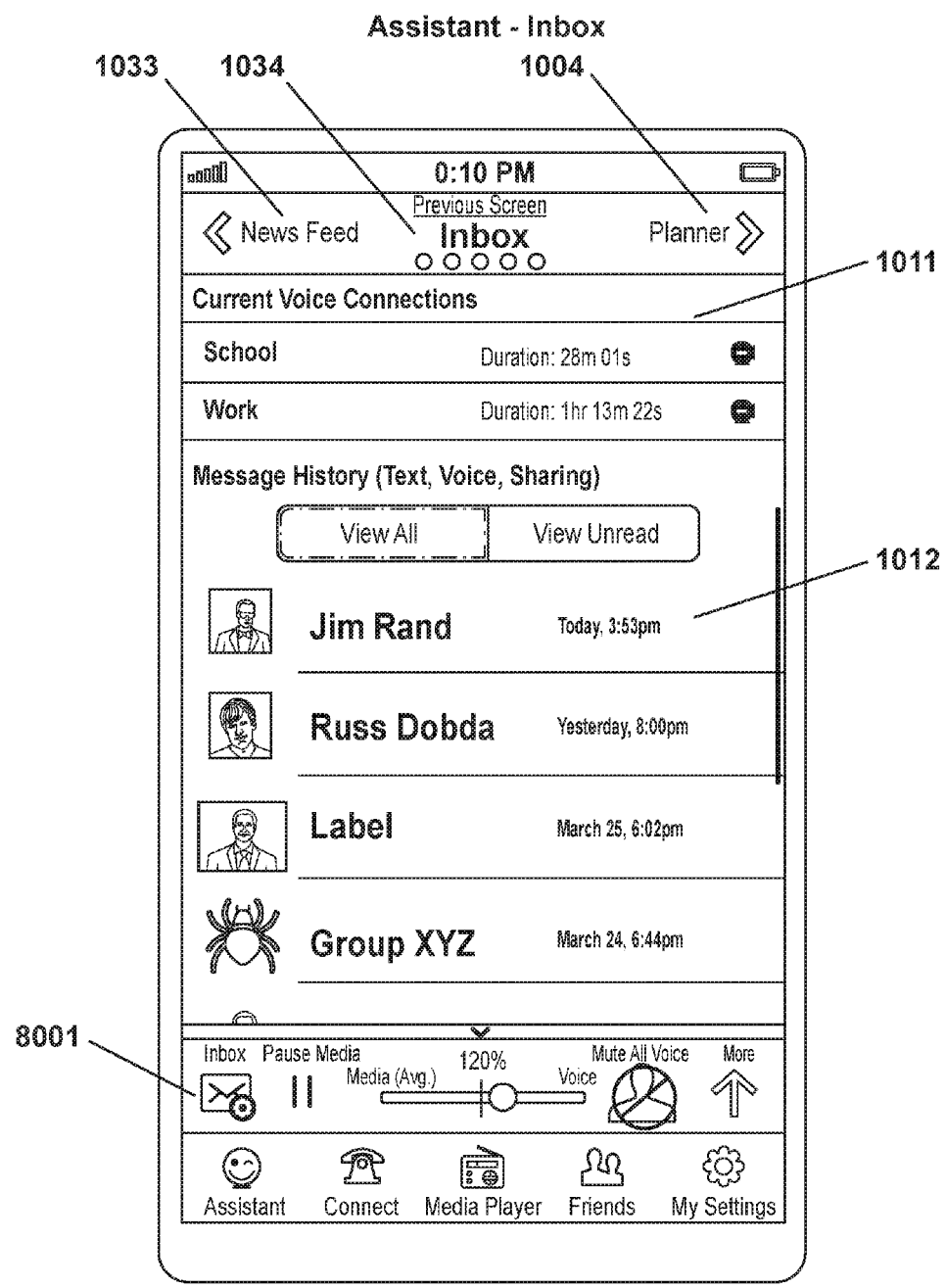
Figure 1D:
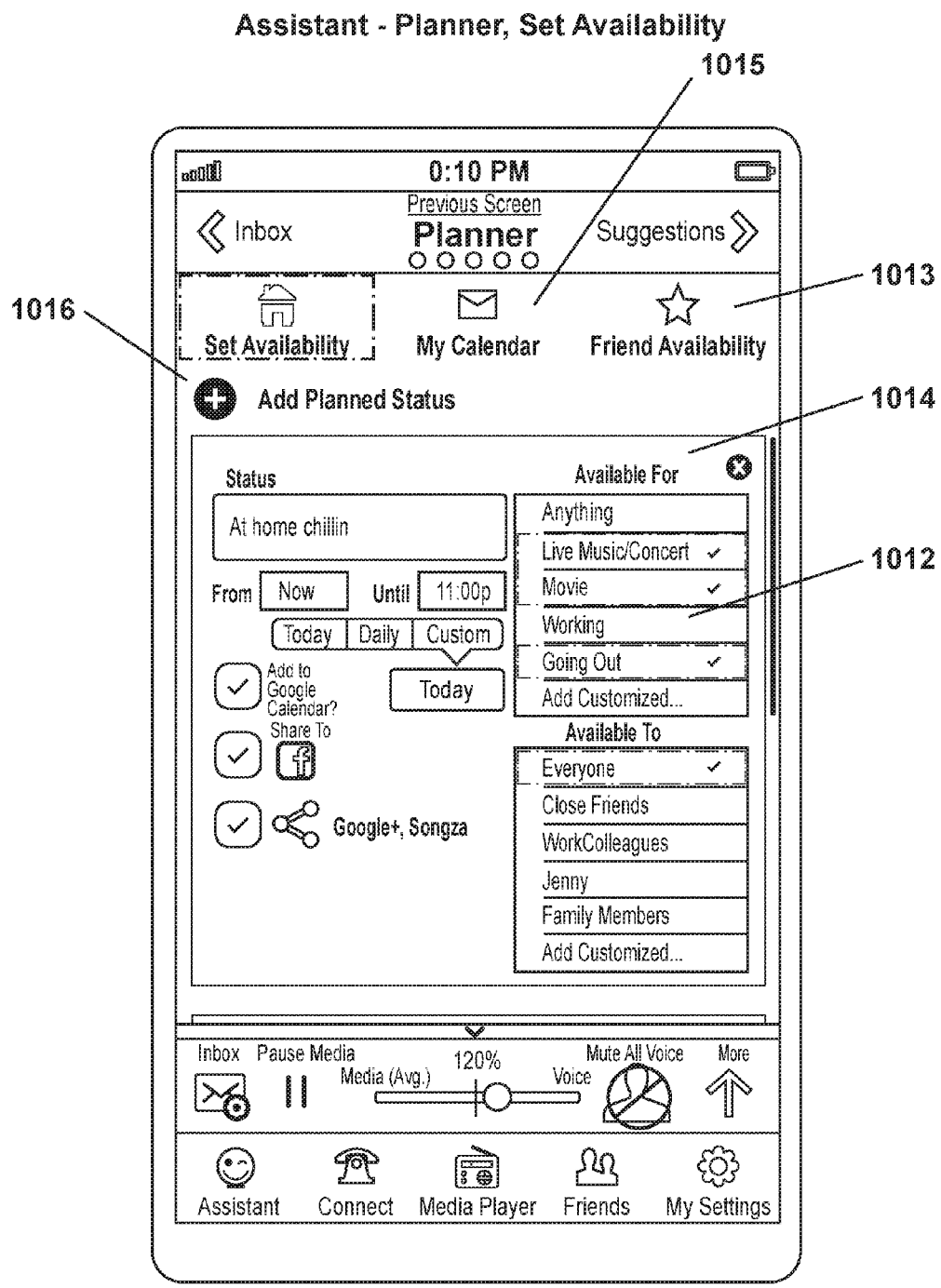
Figure 1E:
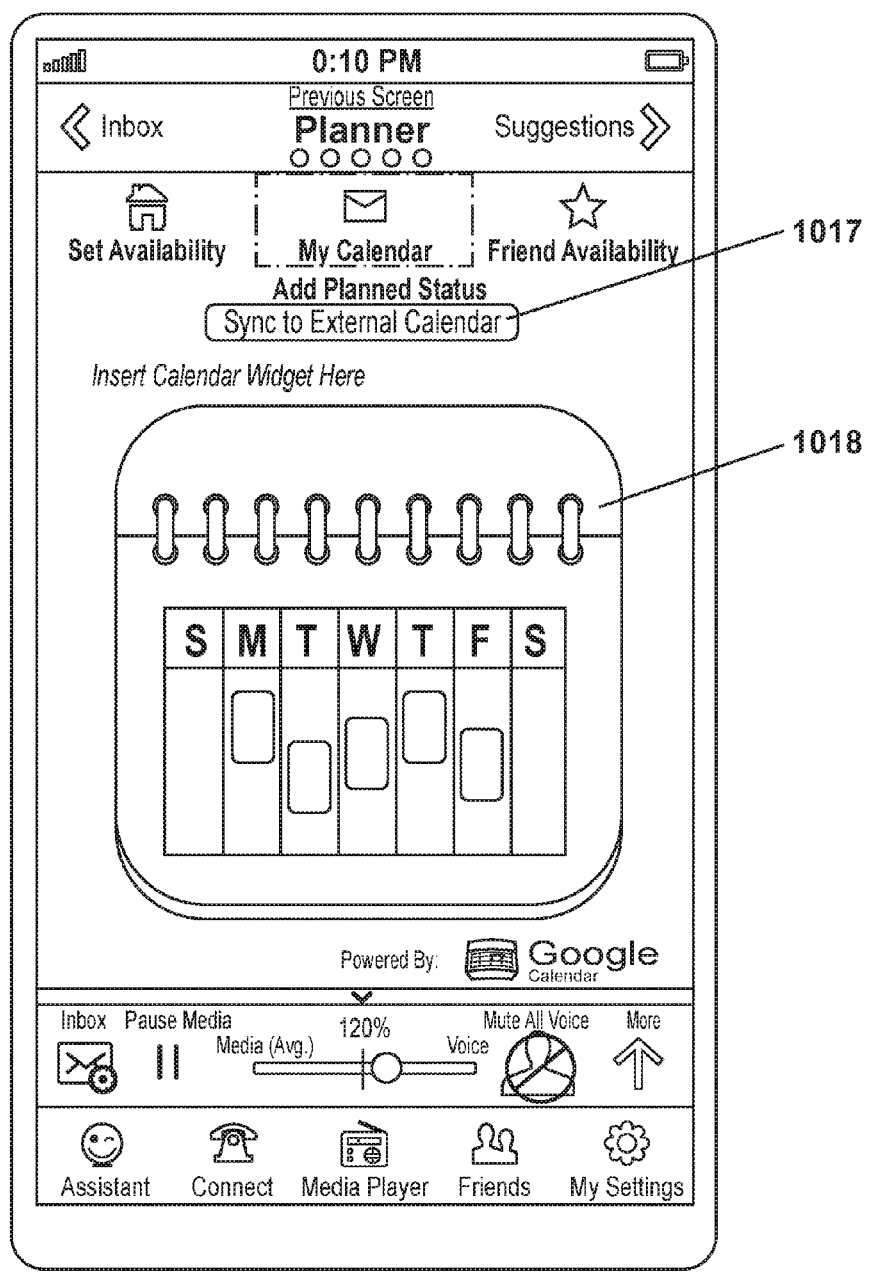
Figure 1F:
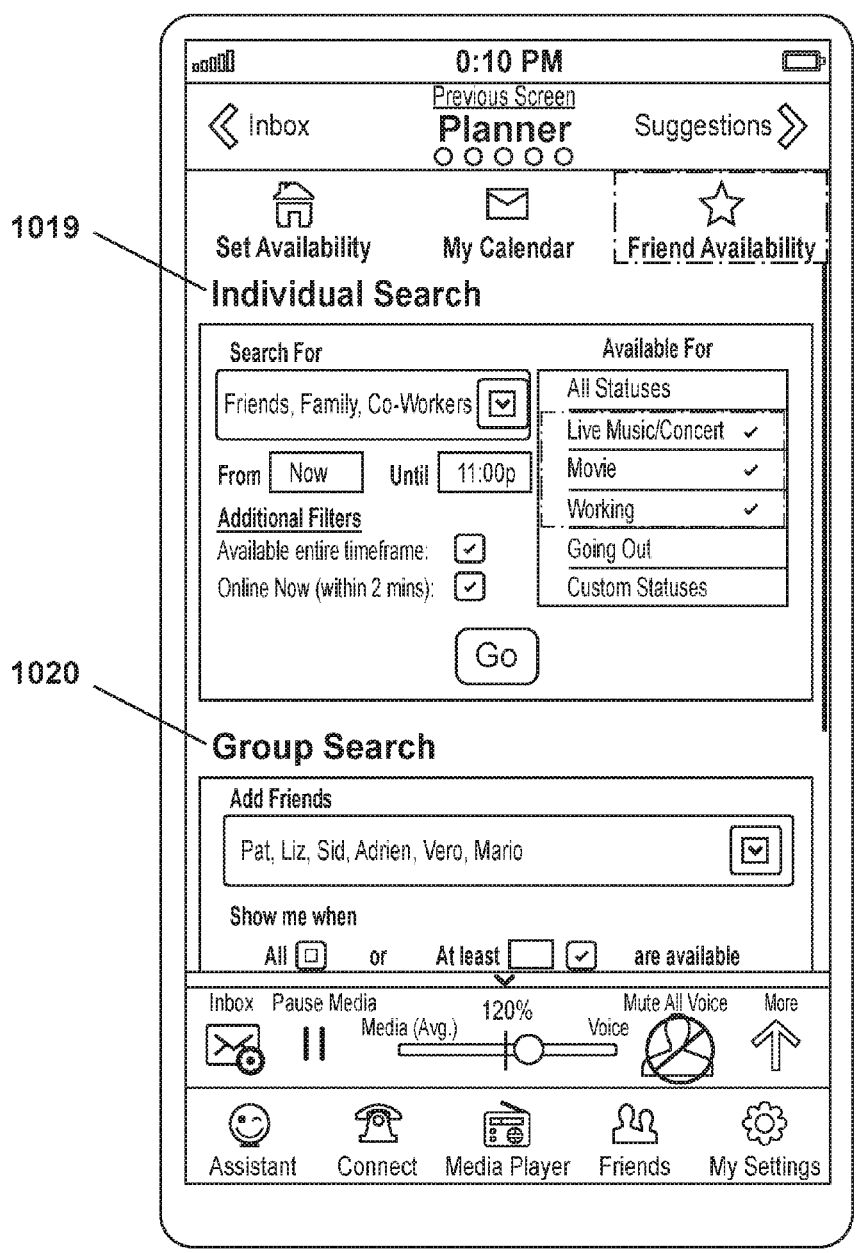
Figure 1G:
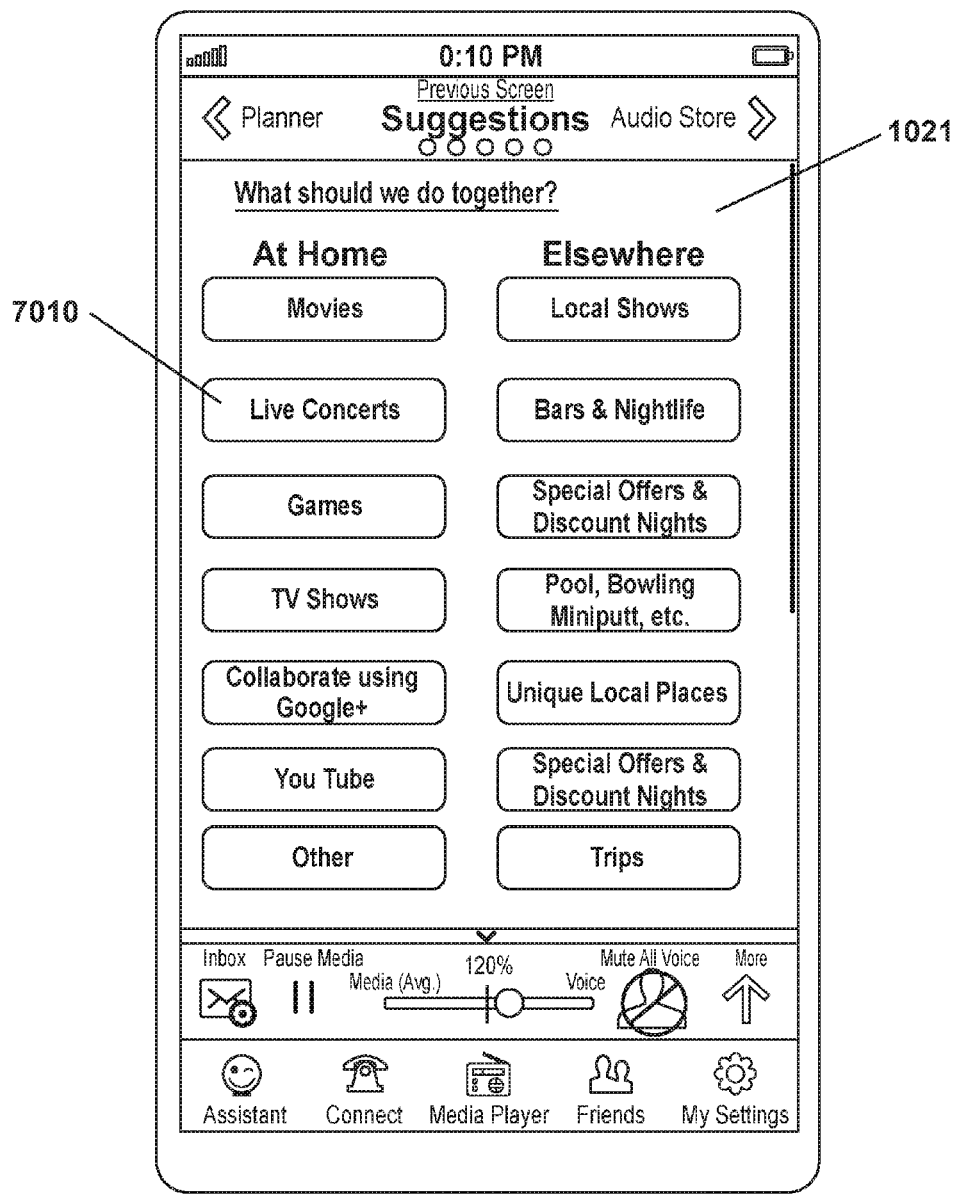
Figure 1H:
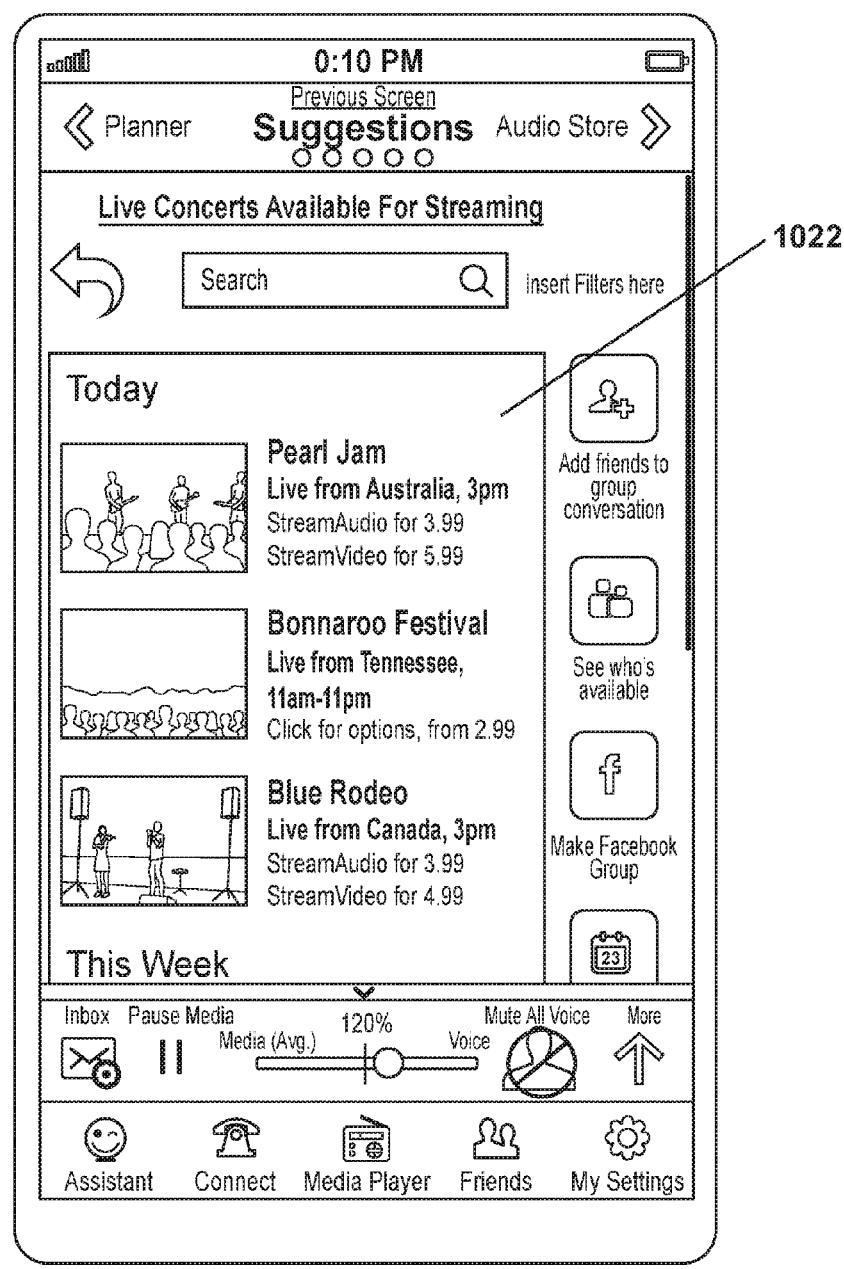
Figure 1I:
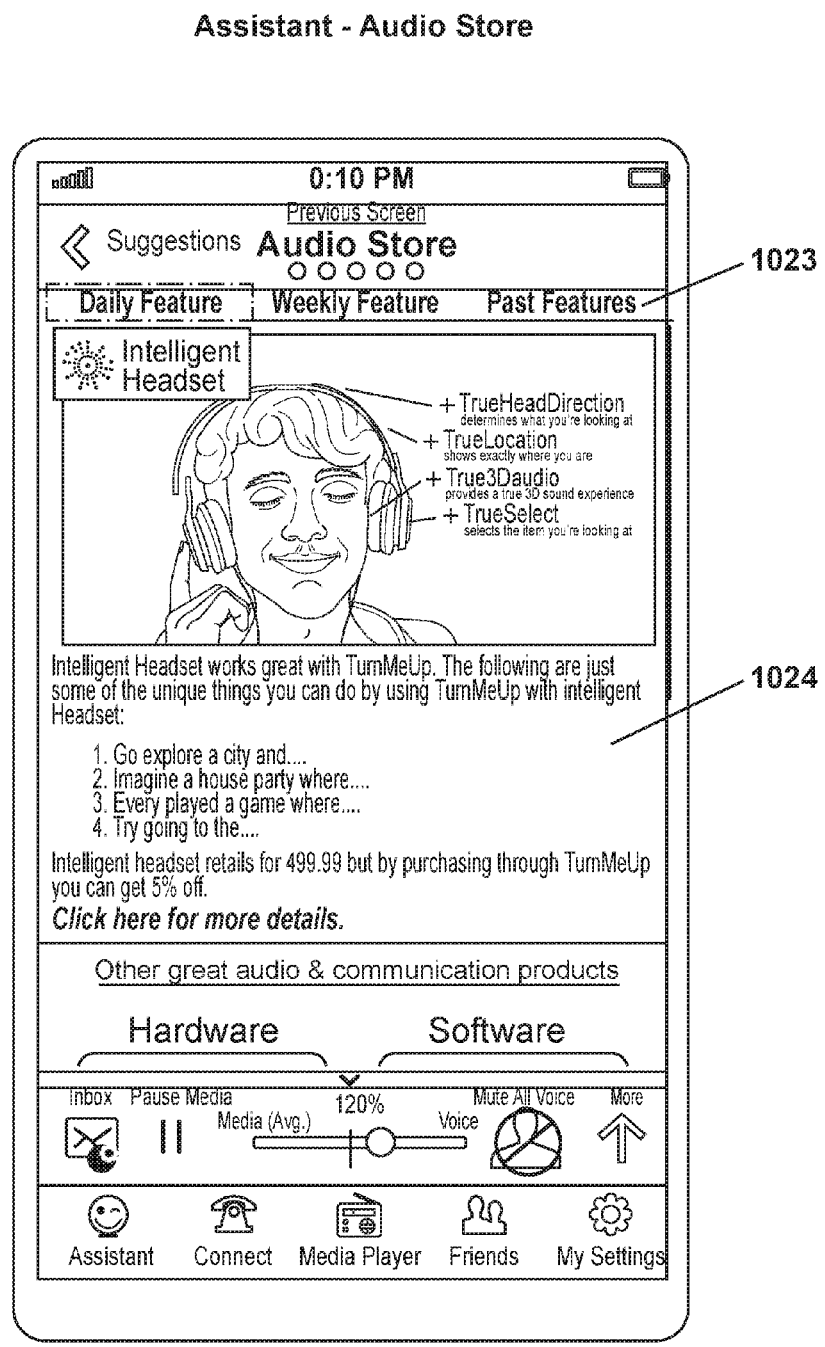

FIGS. 1a through 1i are part of the "Assistant" section. The Assistant section is designed to help users decide when to communicate with one another. FIG. 1a depicts a News Feed, as indicated in the Title Bar (1001), which helps for spontaneous communication and information sharing as in traditional text based social networks. The information shared, however, will be communication focused, and in particular relate to sharing friends' availability for voice based communication as shown in element 1006. Element 1007 shows that users will be able to manually share their availability as entered in the Planner (FIG. 1d). Element 1008 shows that some news feed items may be particular to encouraging music sharing. Simple shortcuts can also be provided directly in the news feed to encourage voice communication (1005). In the embodiment depicted in FIGS. 1a through 8c, element 1005 would be used to add a friend to the "Connect" screen (FIG. 2a), where most communications take place. The shortcut bar (1002) and menu bar (1003) referenced in FIG. 1a can be accessed from all screens, and are described further in FIGS. 8a and 8b. FIG. 1b shows the New Feed with the menu bar in an expanded state (1010), which can be easily collapsed (1009). FIG. 1c depicts an inbox, which is essentially an interface for accessing and managing current and historical communications. Element 1034 is a page indicator that helps the user to keep track of the UI architecture, and is used in conjunction with the "Forward Screen Toggle" (1004) and "Backward Screen Toggle" (1033). Because multiple connections can be running in the background, the inbox provides a quick reference for managing current connections (1011) and can be easily accessed through a link in the shortcut bar (8001). Past communications can also be referenced in a list. Each list item (1012) can be clicked to access a history of communication with that entity (i.e. person or group). Doing so would access a screen similar to that shown in FIG. 1j. A history of recorded audio messages (1025), text based messages (1026), and call history (1027) would be displayed. The ability to continue communicating at present is also depicted with a PTT button (1029), a 2-way button (1030), a text button (1031), and a sharing button (1032). A status indicator also provides information relevant to deciding whether it is a good time to establish communication (1035). The inbox can be accessed by clicking element 1028. FIGS. 1d, 1e, and 1f depict a planner that is designed to help automate communication plans. The planner has a menu bar that is split into 3 categories: "Set Availability", "My Calendar", "Friend Availability". In FIG. 1d, the "Set Availability" tab is active. Clicking on My Calendar (1015) will toggle a calendar view shown in FIG. 1e, and clicking on Friend Availability (1013) will toggle the view shown in FIG. 1f. Users can plan to automatically update their status and availability for chosen periods of time by clicking on the "Add Planned Status" button (1016). This will add an item to the container (1014) with further options. FIG. 7h depicts these options and the container in more detail. FIG. 1e is intended to provide a graphical representation (1018) of the status items added on the Set Availability tab. It is also intended that the graphical widget (1018) could be integrated with external calendars (1017). FIG. 1f shows that users will be able to search for friends' availability manually. The search can be on an individual (1019) or group (1020) basis. These search features are depicted in more detail in FIG. 7c. FIG. 1g depicts a suggestions component within the Assistant section. The suggestions are generally designed to help users consider things to do together with friends. This type of planning requires communication, and is often dependent on friends' availability, hence suggestions are a natural extension to the mobile application's other planning and communication features. They are categorized into "At Home" and "Elsewhere" to distinguish the nature of activity: "At Home" items normally involve consuming media together through the application, and therefore make use of the audio mixing features and settings of the application. These suggestions will generally be enjoyed using the Media Player, which is further described in FIGS. 4a through 4d. "Elsewhere" suggestions do not require use of the Media Player, but allow users to review suggestions together while they are connected in a voice conversation, facilitating efficient planning, especially when used in conjunction with the planner features depicted in FIGS. 1d, 1e, and 1f. Clicking on individual suggestions will provide further details. As an example, clicking on element (7010) will result in the device's screen displaying further options depicted in the container (1022) shown on FIG. 1h. Suggestions are described in additional detail in FIG. 7j. FIG. 1i depicts an online Audio Store. The mobile application in this embodiment contains many audio related provisions and would likely appeal to music lovers. The application could be utilized with and even improved through use with other hardware and software. The Audio Store is designed to advertise these hardware and software companions through Daily and Weekly featured items (1023) that provide a description of how the featured item can interact with the mobile application. The Audio Store is described in more detail in FIG. 7b.

Figure 2A:
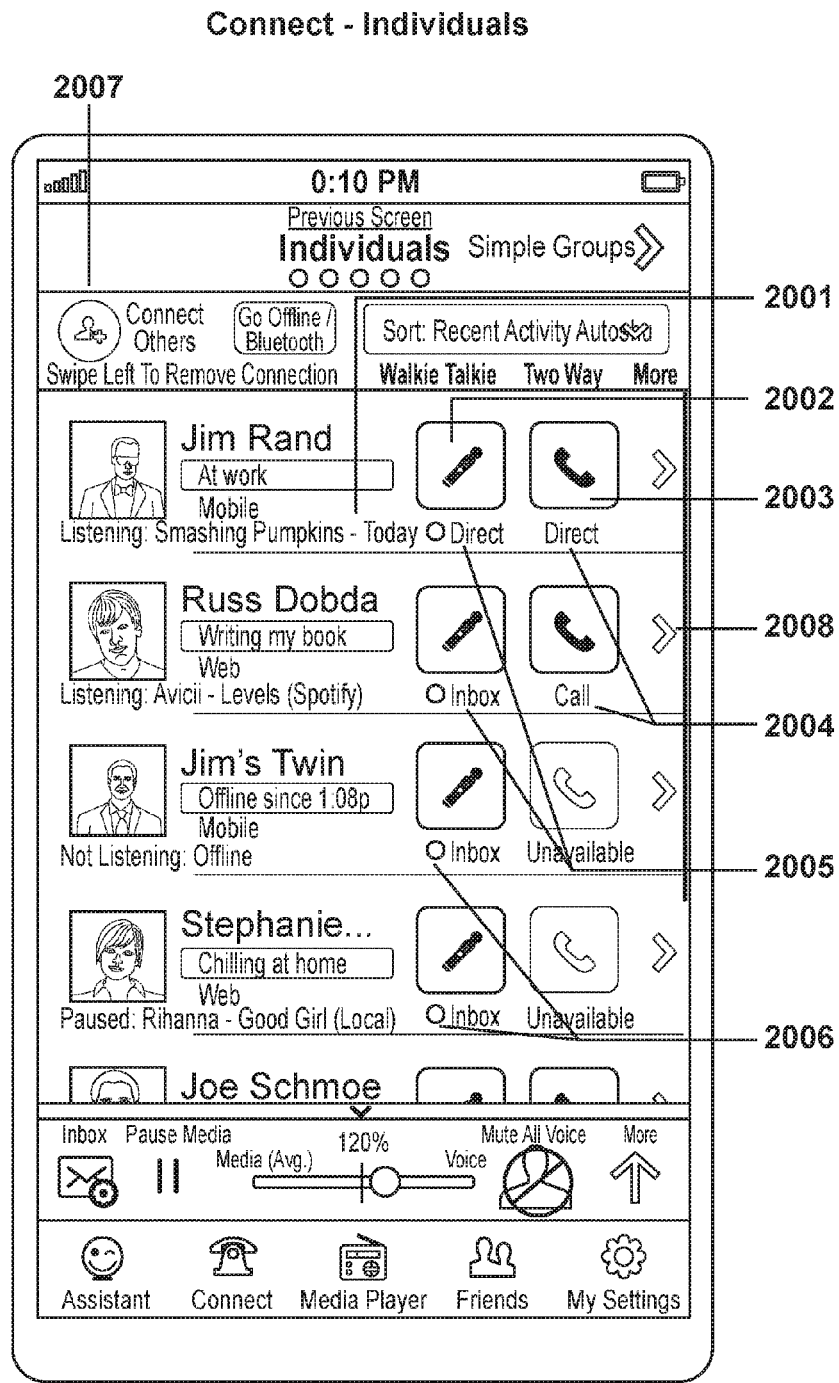
FIGS. 2a through 2h depict the "Connect" feature.
Figure 2B:
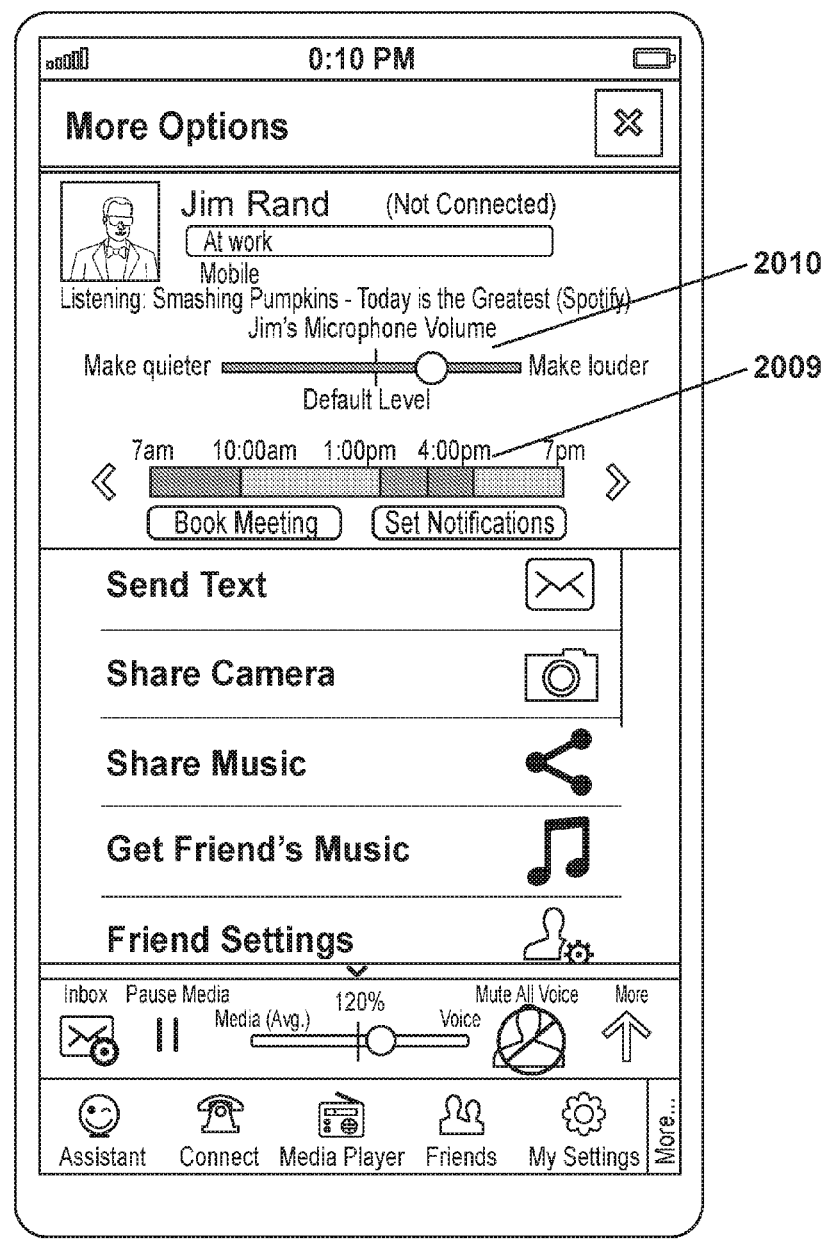
Figure 2C:
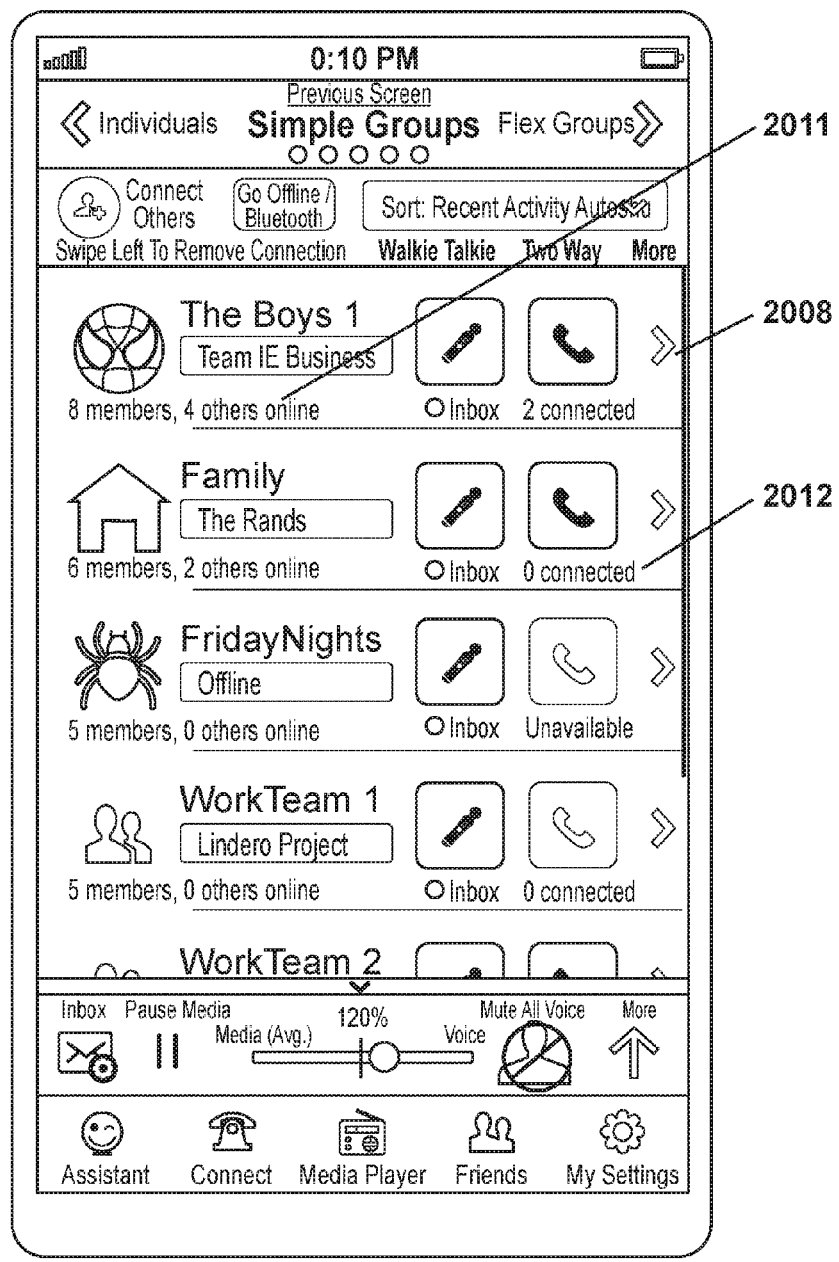
Figure 2D:
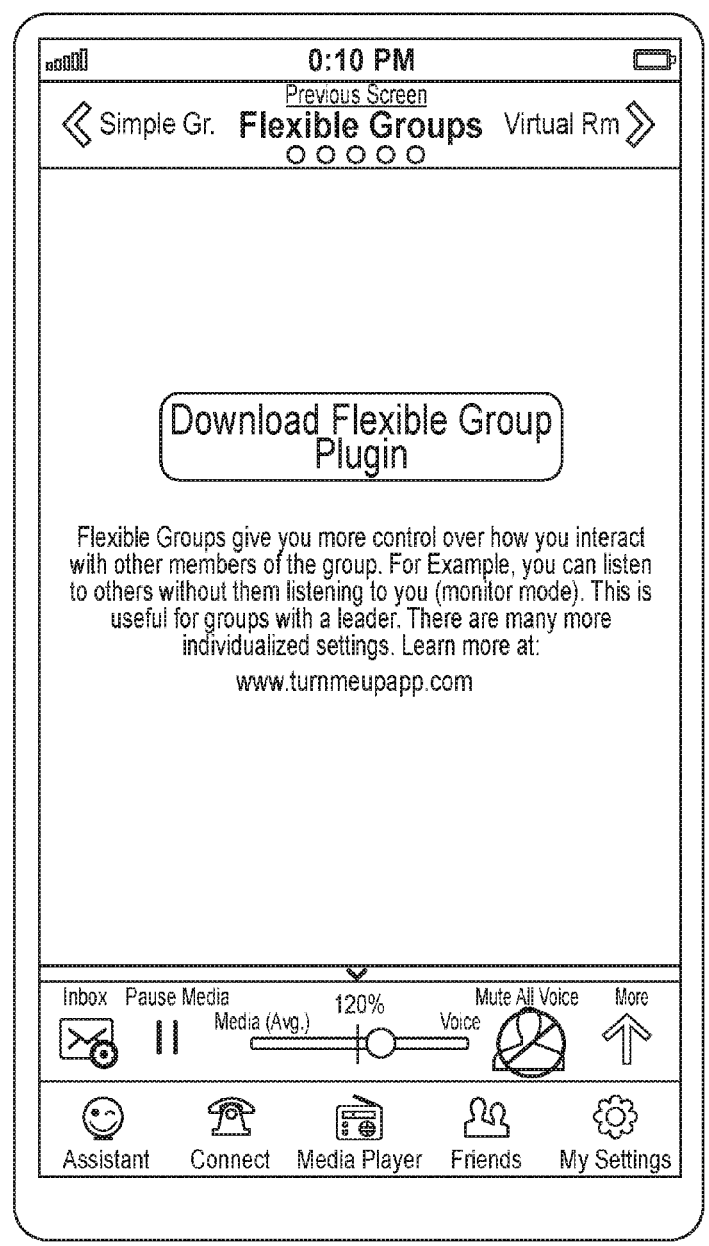
Figure 2E:
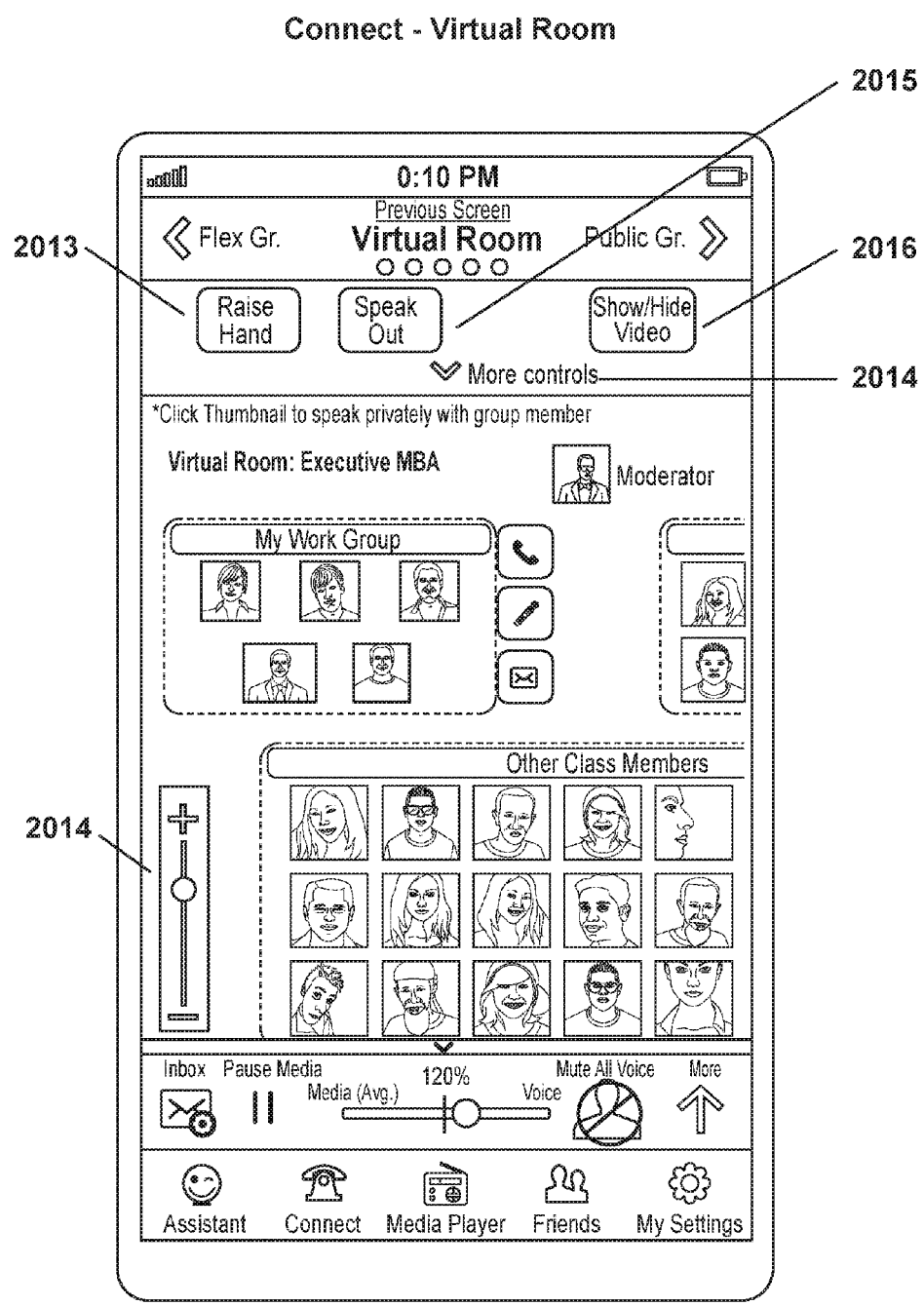
Figure 2F:
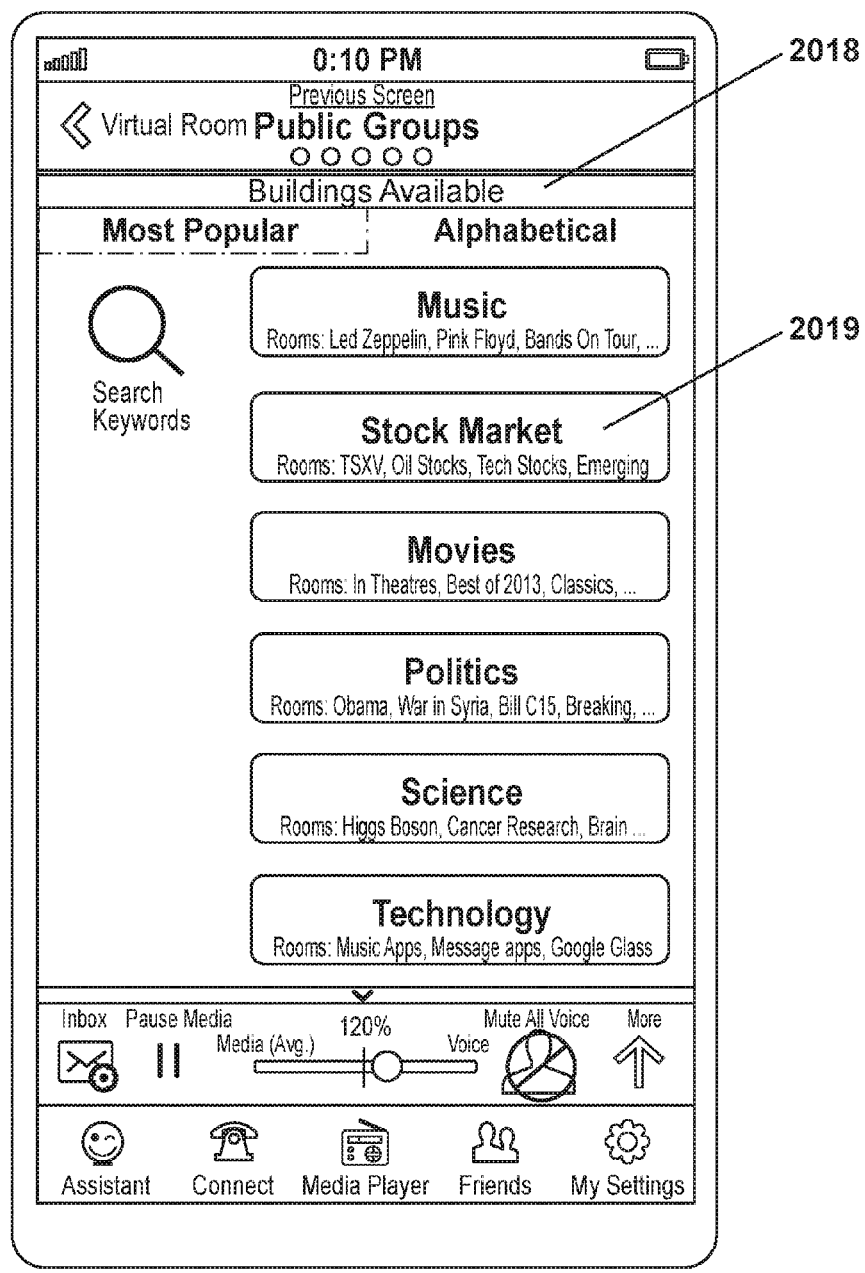
Figure 2G:
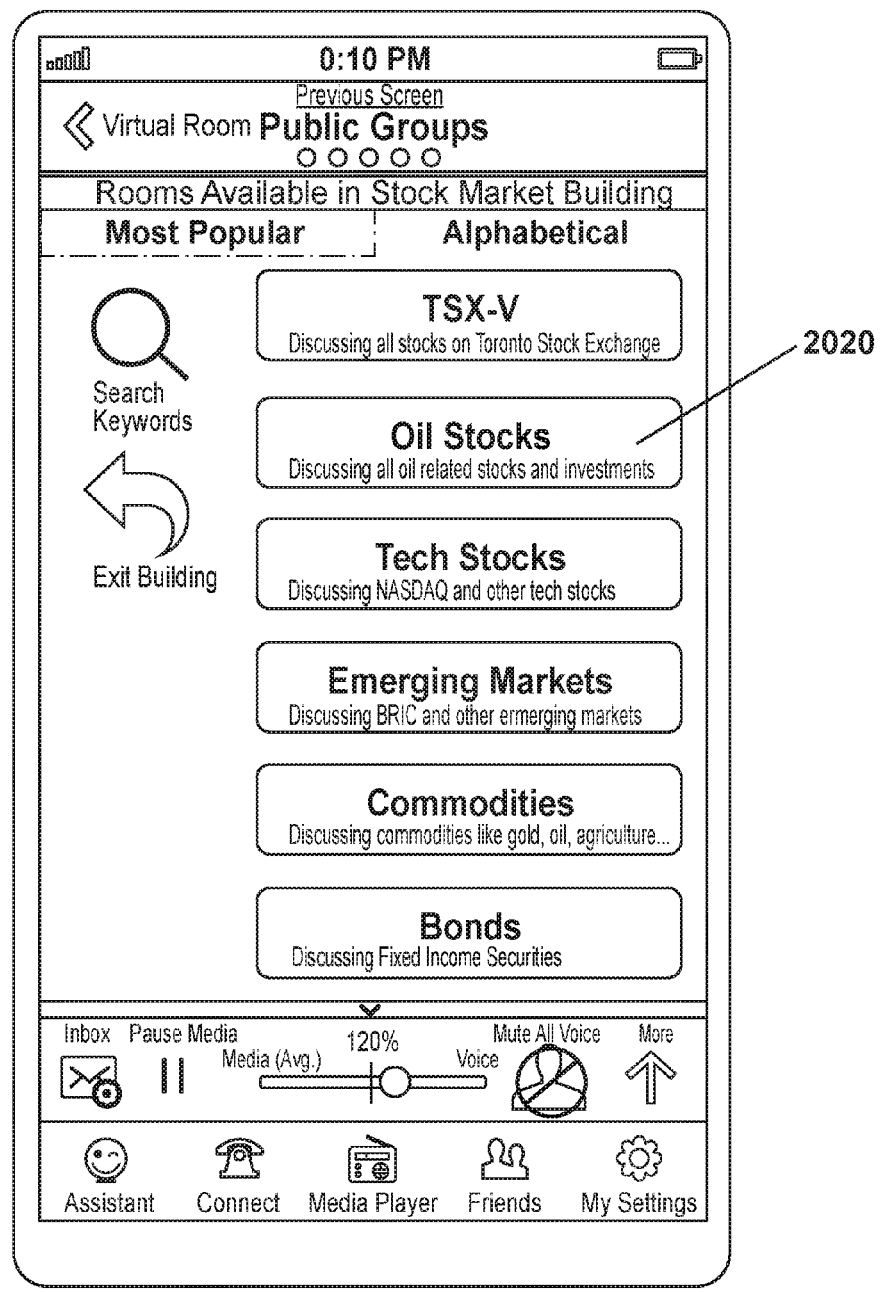
Figure 2H:
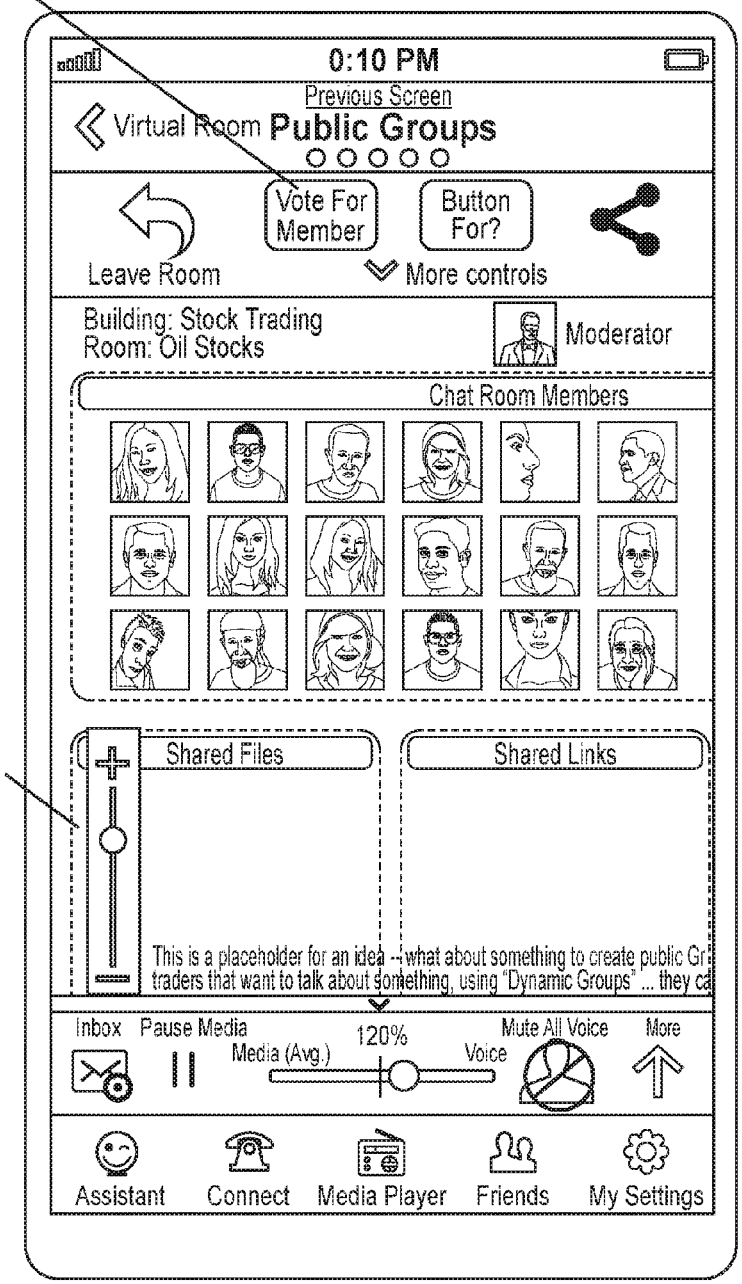

FIGS. 2a through 2h are part of the "Connect" section. The Connect section is where the majority of communications are controlled. FIG. 2a depicts controls for communications with individuals. When the user anticipates connecting with a friend, he/she will add the friend to the connect screen through the "Connect Others" button (2007), or through other provisions in the application. Two columns of buttons can be seen in FIG. 2a, with one set of buttons activating Walkie Talkie/PTT mode (2002) and the other set activating 2-way mode (2003). The PTT indicators (2005) show either "Direct" or "Inbox" values. Duplex indicators (2004) show either "Call" or "Direct". Additional specifics regarding these indicators is provided elsewhere in this document. Status Lights (2006) indicate whether the friend is currently online (green) or offline (red). When the friend has Media Mode enabled, details of his or her music can be shared through the media mode indicator (2001). Providing this information in the context of the "Connect" section not only facilitates simple music sharing, but also provides insight into friends' statuses and availability (e.g. the user likely has headphones on and might be immediately ready for communication). Clicking the more button (2008) gives access to more options such as sharing text, photos/video, music sharing features, and friend settings. The Planner Widget (2009) works in conjunction with The Planner depicted in FIGS. 1d, 1e, and 1f. It is a quick visual representation of that friend's availability, and enables simple scheduling and notifications to be set based on the friend's availability. Three categories have been considered, but more are possible: Green=Available; Red=Busy; Gray=Unscheduled. An individual volume adjustment is provided to manage differences in friends' hardware. FIG. 2c depicts controls for communications with groups, and is similar to FIG. 2a. Small differences would include the need to change the media mode indicator to reflect information applicable to the group, such as the number of group members and the number currently online (2011). The 2-way mode indicator would also be modified to include information relevant to the group such as the number of people currently connected in a voice channel (2012). The more button (2008) would yield additional options relevant to group communications, and would be similar in appearance and function to FIG. 2b with group specific modifications including individual member volume control and a group availability display. Whereas the embodiment depicted in FIG. 2c is relatively simple, FIG. 2d illustrates that group communications can be made flexible through a downloadable plugin. One embodiment of this plugin is illustrated in FIG. 7l which depicts a scrollable container with flexible communication channels. FIG. 2e depicts a Virtual Room which allows users to create and communicate with groups using a visual interface that simplifies switching between modes of communication. Zooming in and out of the visual interface would be enabled through pinching and a zoom bar (2014), while scrolling would use standard touch screen gestures. Quick functions could be made easily accessible on a control bar (2017). The Raise Hand (2013) button would request permission to speak from the group moderator. The Speak Out (2015) button would enable participants to speak at any point without requesting permission, assuming the moderator had enabled appropriate settings. The show/hide video button (2016) would access standard video chat functionality. FIG. 2f illustrates the concept of Public Groups, which are essentially voice based public chat rooms. Rooms could be organized into "Buildings" (2018) sharing a similar theme. Clicking on a button for one of the buildings (2019) would provide access to a list of rooms within that building. FIG. 2g provides an example for the "Stock Market Building". Clicking one level further (2020) would enter a chat room, as depicted in FIG. 2h. Similar to the Virtual Rooms, Public Groups would have a zoomable (2014), scrollable interface. A key aspect of public chat rooms would be the ability to vote on comments made by users (2021). The voting mechanism would earn users ratings, and these ratings could be used to automatically screen or filter users. FIG. 7i provides additional details on the potential layout of a voice-based chat room.

Figure 3A:
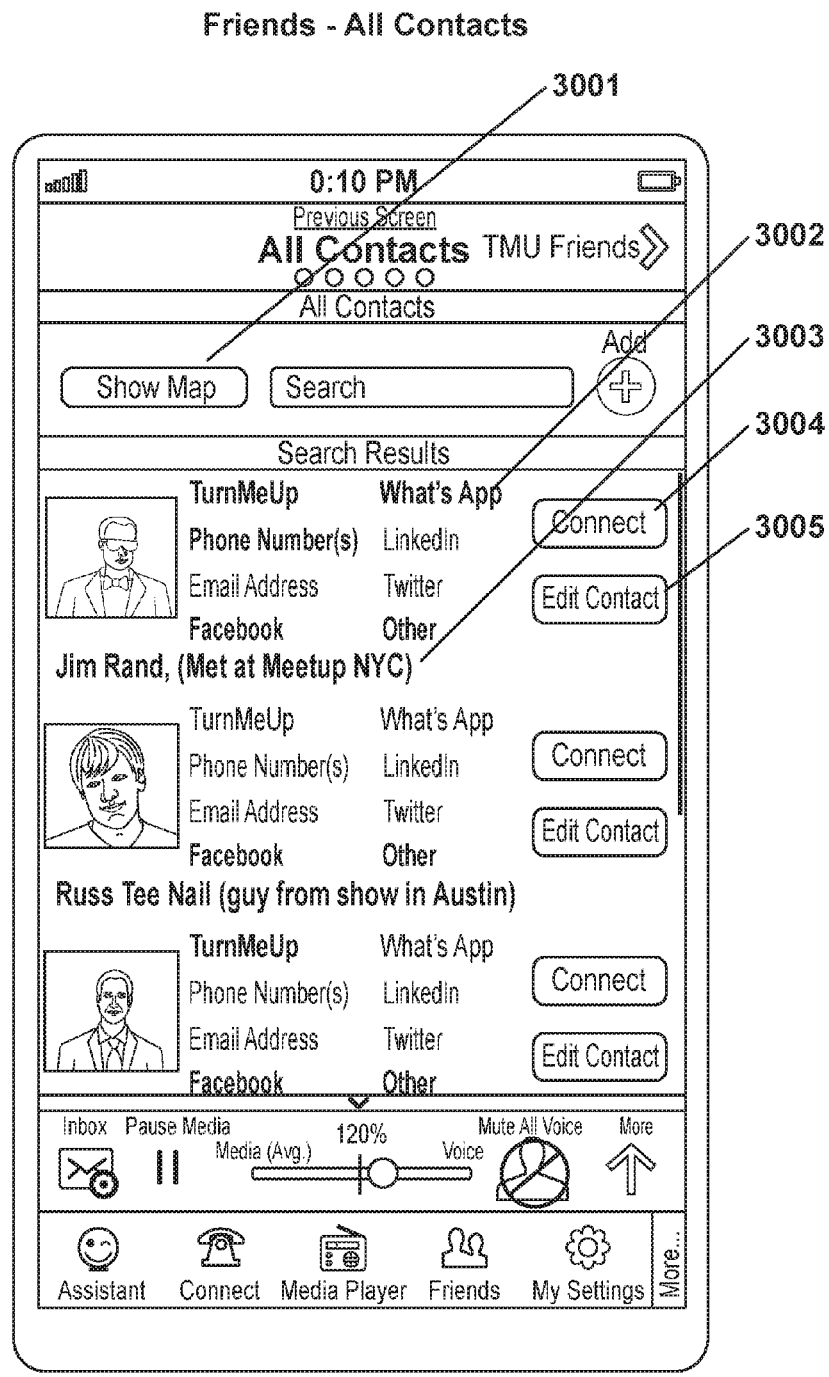
FIGS. 3a through 3e depict the "Friends" feature.
Figure 3B:
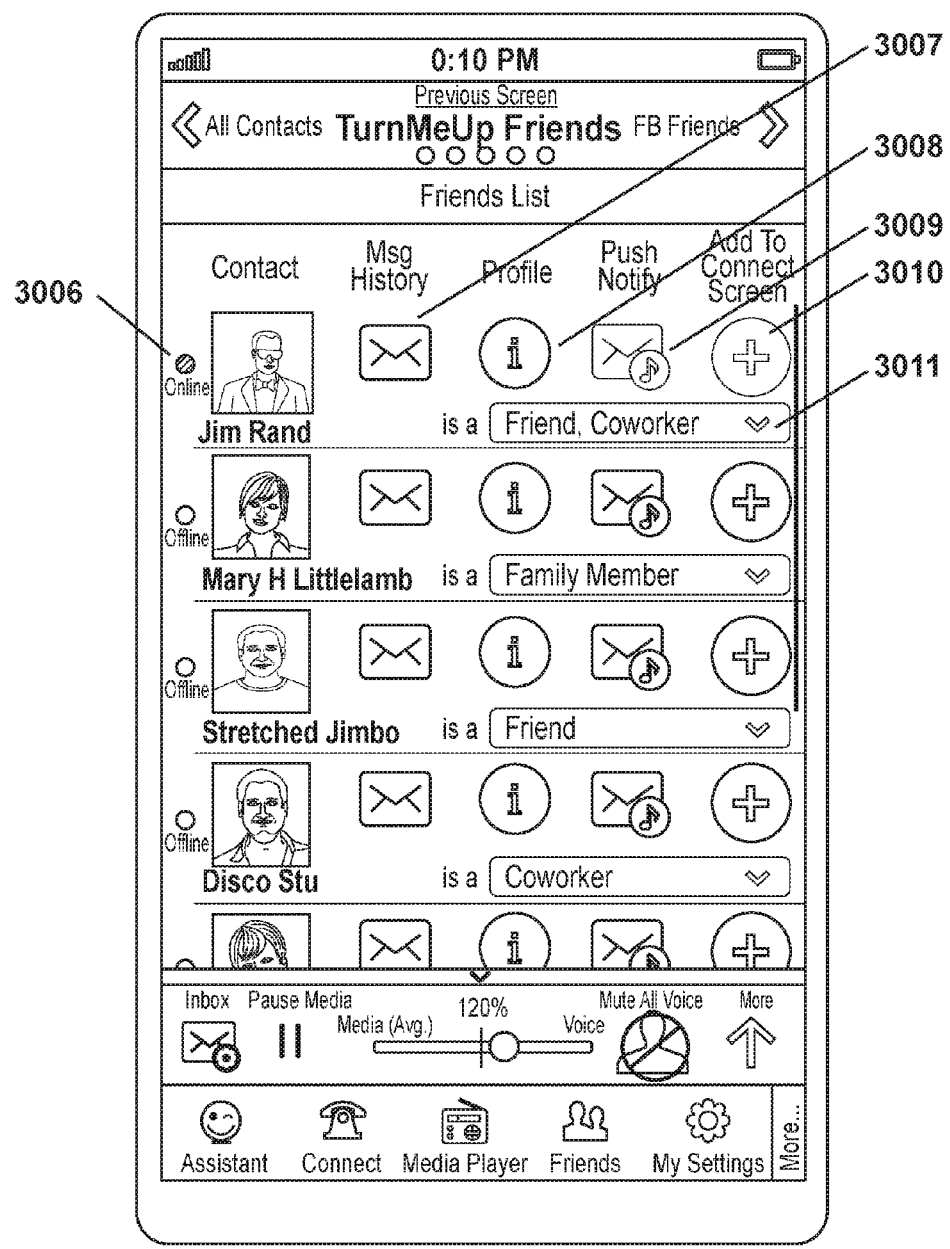
Figure 3C:
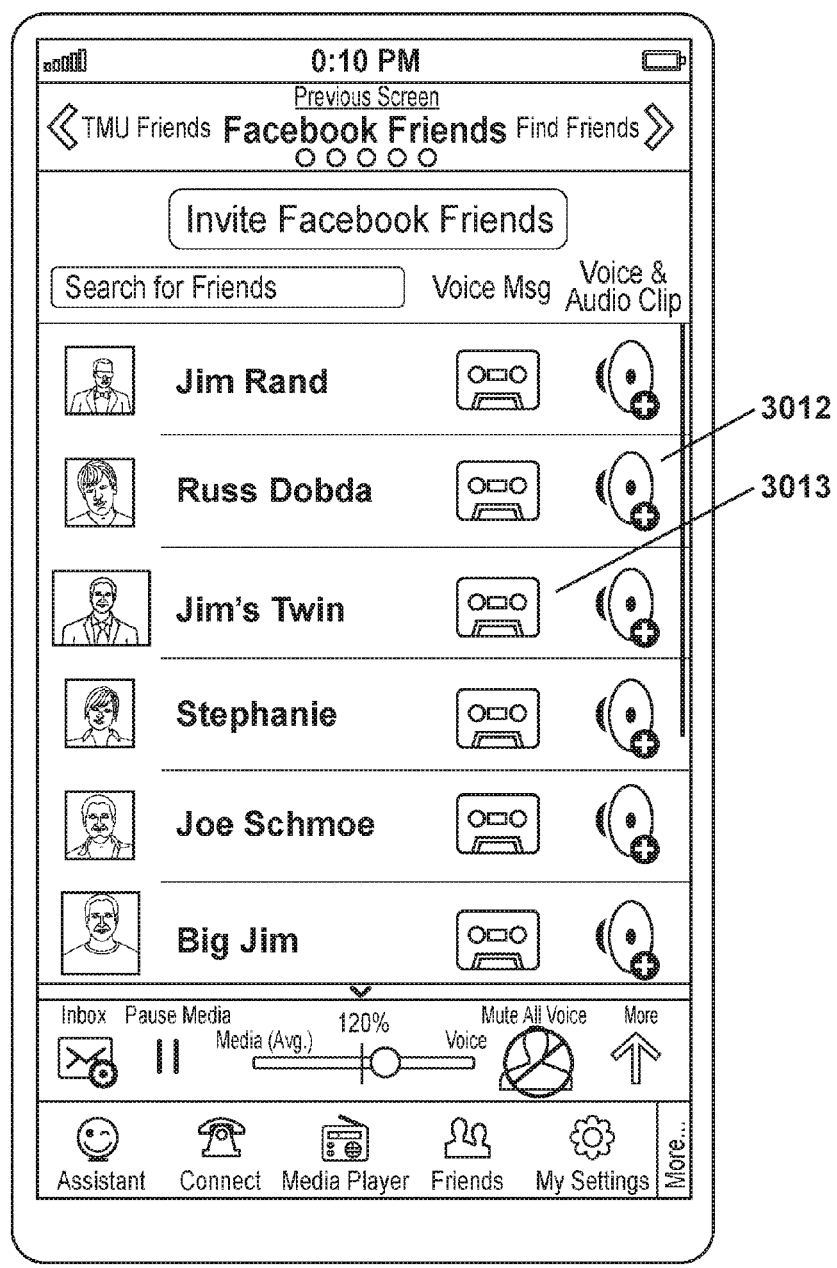
Figure 3D:
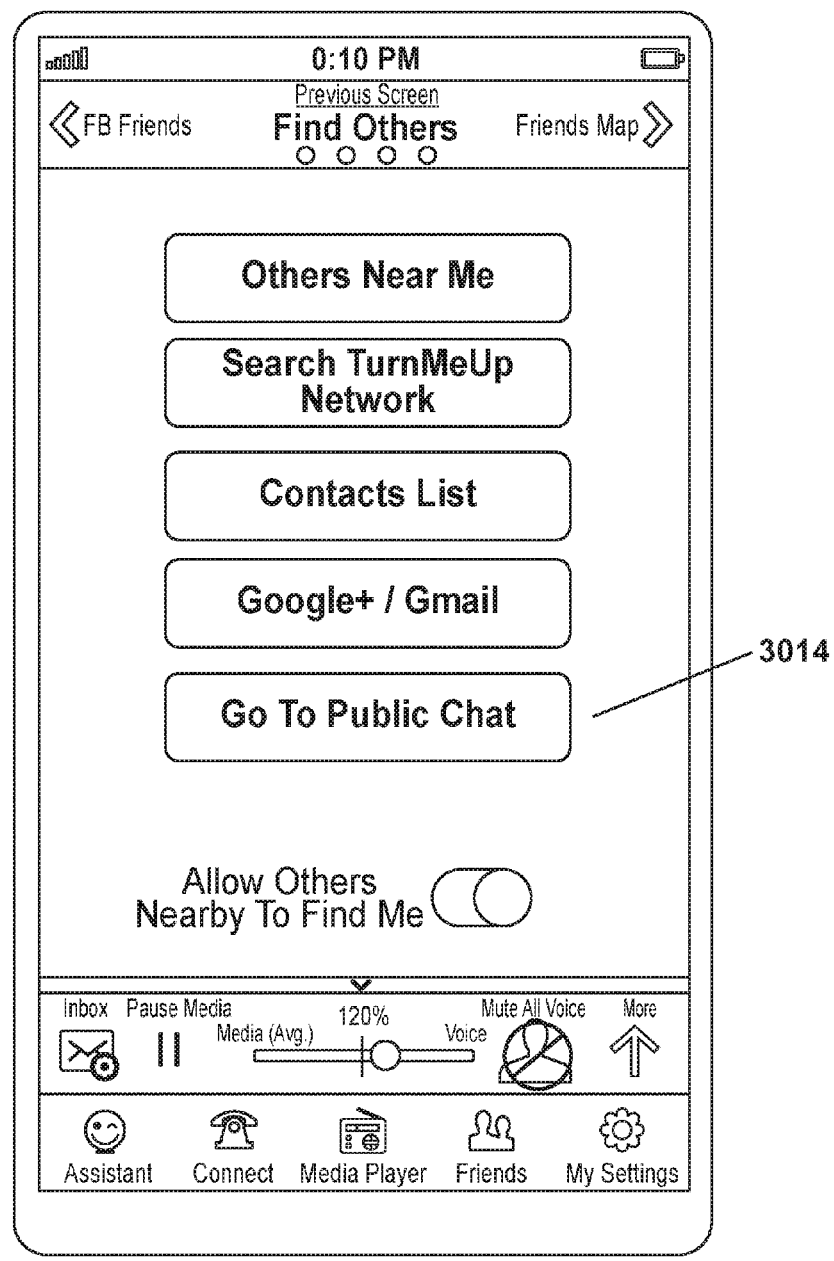
Figure 3E:
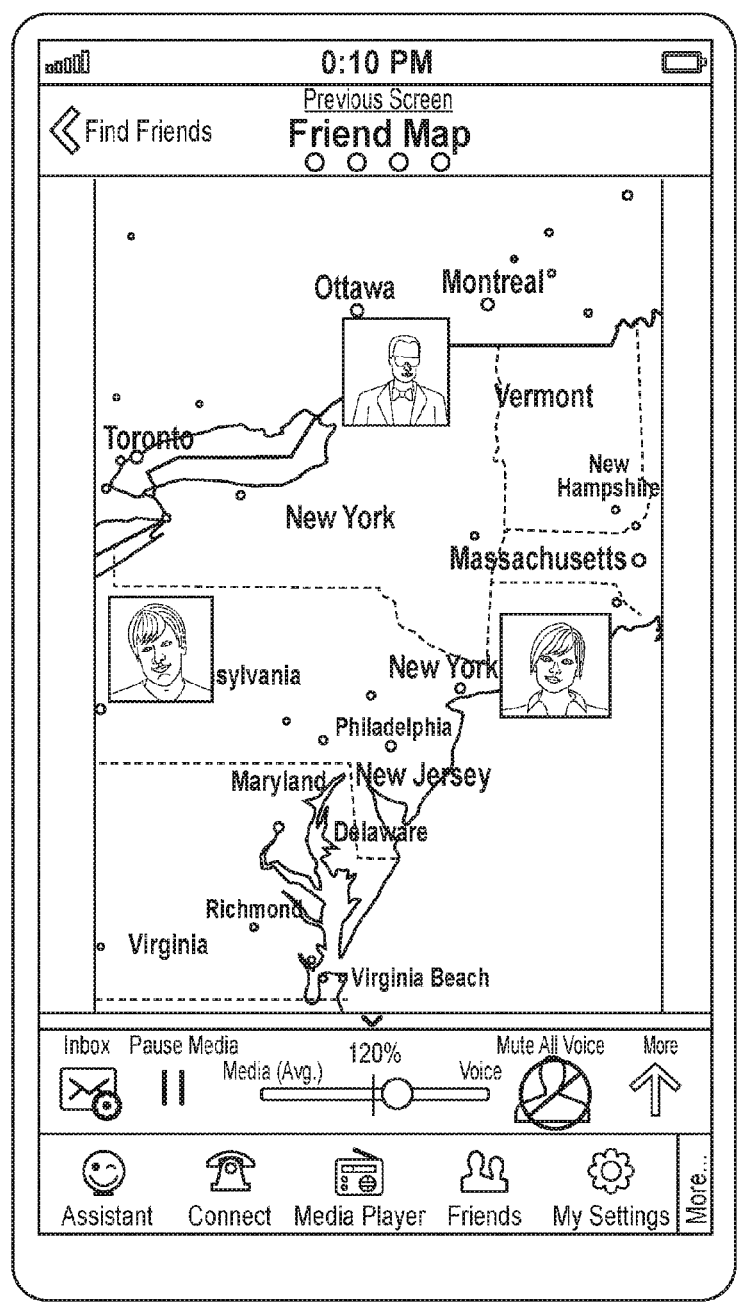

FIGS. 3a through 3e are part of the "Friends" section. The Friends section is a comprehensive contacts list. FIG. 3a depicts a list including all known contacts. Integration with 3rd party applications would help to consolidate contacts within this list. The list indicates what information is known for each contact, including associated 3rd party applications (3002), by highlighting known data and associations in a different color. Contacts for which location information is known can be displayed on a map (3001) as illustrated in FIG. 3e. Additional notes are also shown for each contact (3003), and can be entered by clicking the "Edit Contact" button (3005). Clicking the "Connect" button (3004) adds the user to the Individual Connect screen shown in FIG. 2a. FIG. 3b illustrates a contact list specific to other application users. Additional information and communication options are available between application users, including the current status of other application users (3006) which can help users decide whether to add the friend to the Connect screen (3010) in FIG. 2a. Adding friends to the connect screen would result in additional communication between the users in order to continue updating status items (including Media Mode) in real time, hence it may not make sense to connect a large number of friends to the Connect screen at any given time. When users are "Offline", the "Push Notify" button (3009) provides a mechanism for alerting the user that someone wishes to contact them. Different mechanisms are possible depending on the operating system for the devices being used, but an example might be a notification that becomes visible when the device "wakes up". Alternatively, it may be an alert with a sound. Element 3007 provides a link to the communication history with that user, as described in FIGS. 1c and 1j. The profile button (3008) would access a user profile containing user-specific data and preferences. The friend categorization list (3011) is used to apply categories to each contact. It is used in conjunction with the Planner and other settings to easily apply preferences and searches to specific groups of contacts. FIG. 3c depicts a friends list specific to Facebook, assuming integration is not disallowed. This embodiment allows users to leave voice messages (3013) or mixed voice and audio clips (3012) on their friends' timelines or in messages. The mixed voice and audio clip records from the user's microphone and background audio simultaneously, ultimately producing a Voice-Over clip in real time. FIG. 3d depicts options for finding friends on other networks. The Public Chat button (3014) would open the Public Groups feature described in FIGS. 2f through 2h. FIG. 3e is a placeholder illustrating a concept in which a map could be utilized to illustrate the location of contacts. There are existing 3rd party services that do this already, and the application might tie into these services.

Figure 4A:
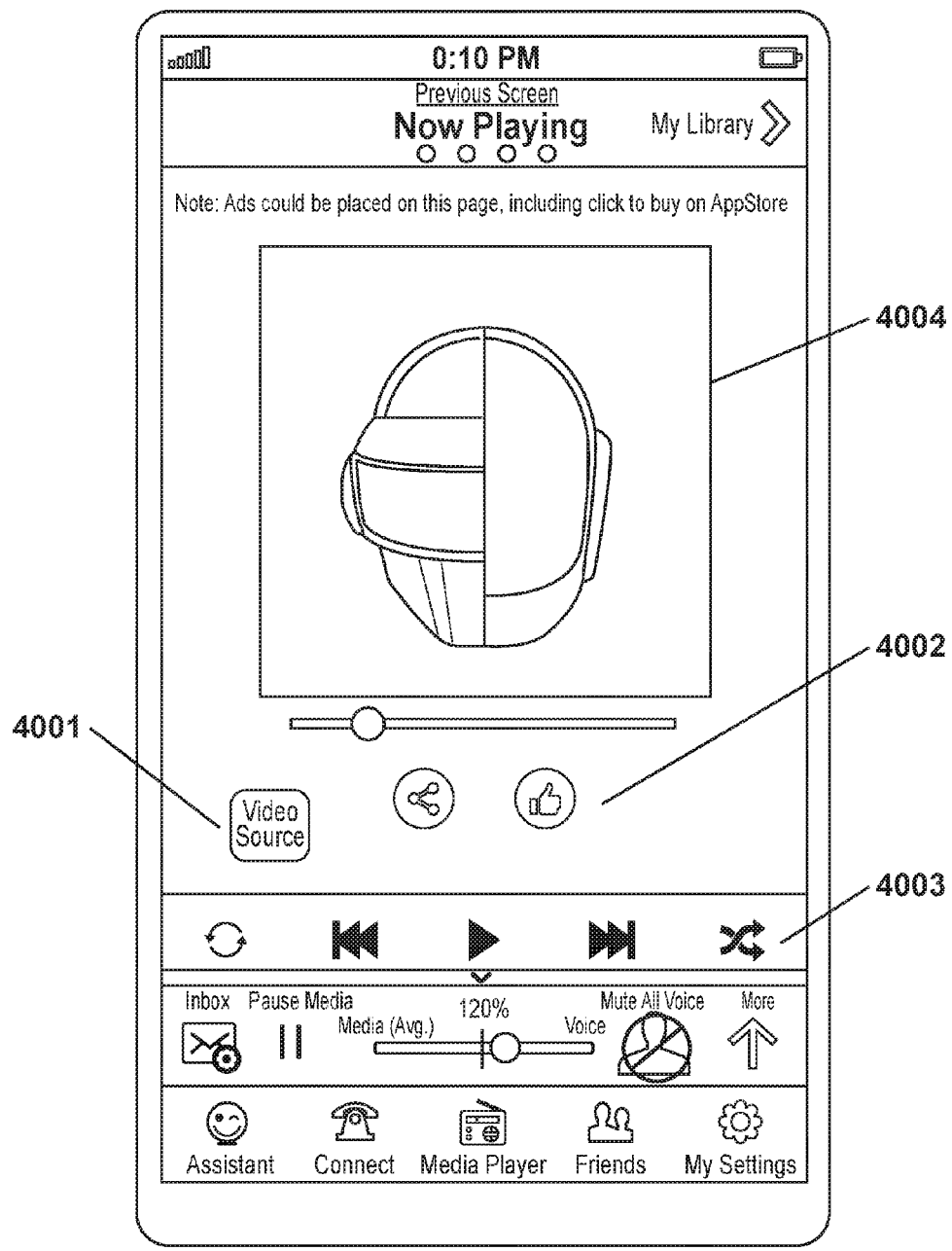
FIGS. 4a through 4e depict the "Media Player" feature.
Figure 4B:
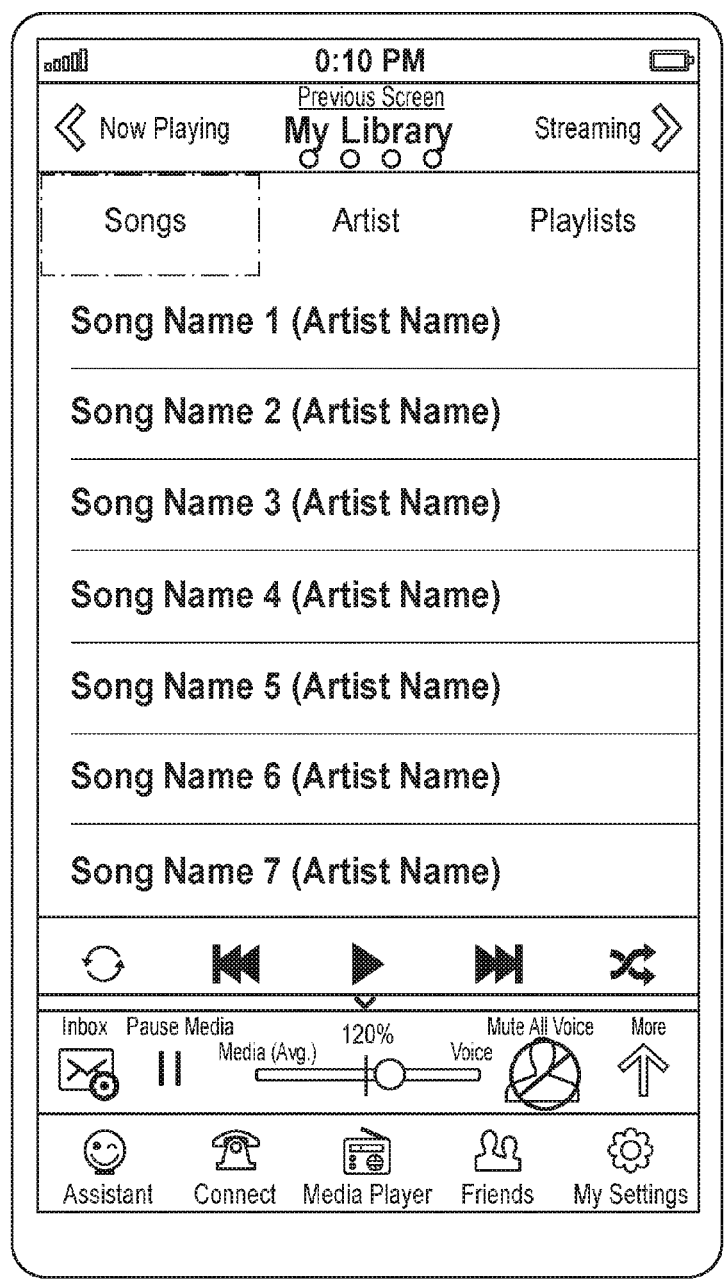
Figure 4C:
Figure 4D:
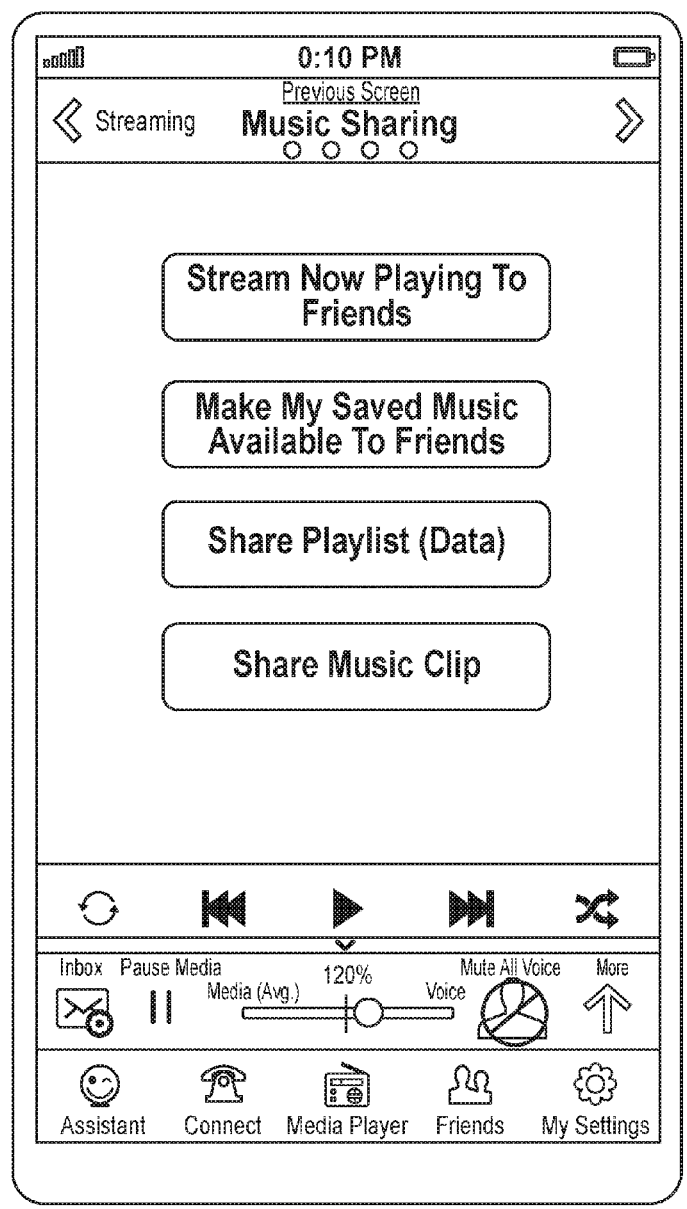
Figure 4E:
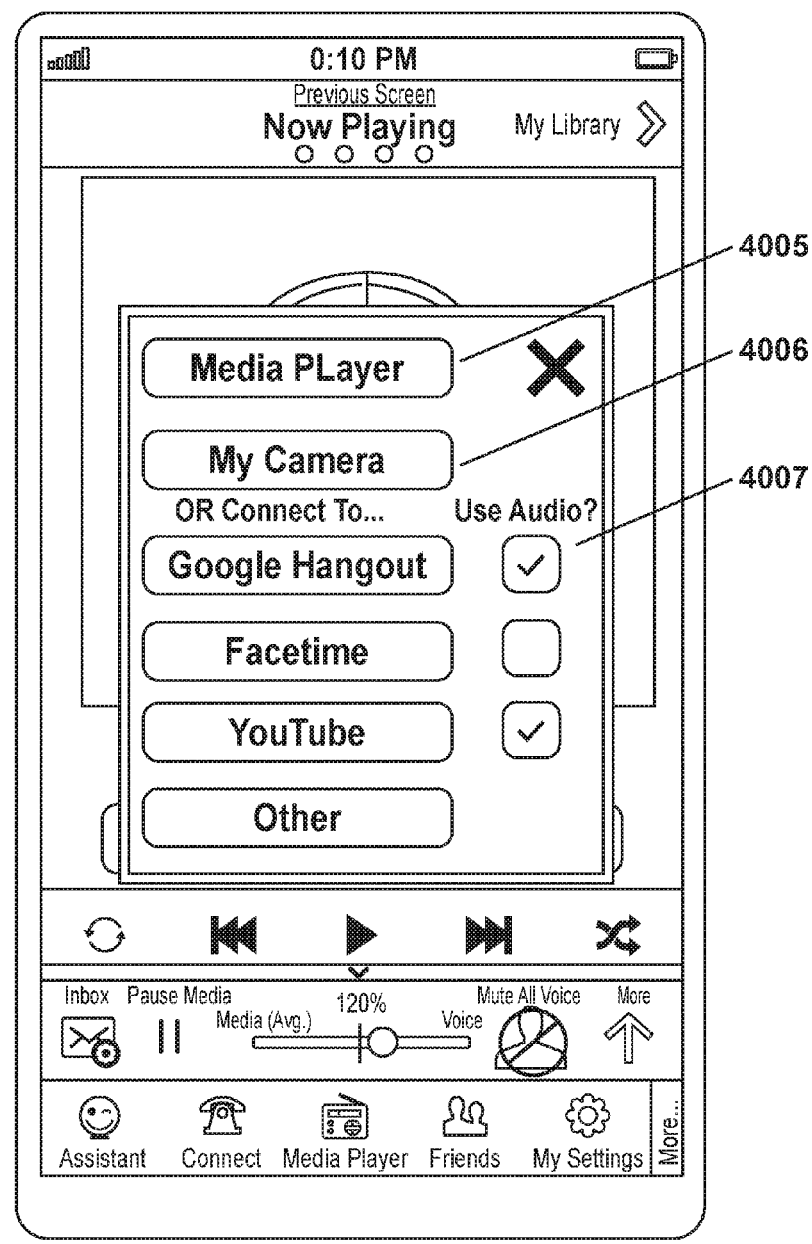

FIGS. 4a through 4e are part of the "Media Player" section. The Media Player section plays audio and video streams from a variety of potential sources. FIG. 4a depicts a media player with typical controls (4003) and social features (4002). The Video Source button (4001) can be accessed to provide several options for the media display (4004). Some options are depicted in FIG. 4e. Selecting the Media Player button (4005) would display media dependent on a music source (e.g. a graphic that is consistent with the artist and song being played). The My Camera button (4006) would display a video chat feature native to the application. Video chat could also be connected via 3rd party services such as Face Time or Google Hangout. Whether or not to use audio from these services could be optional (4007), such that audio services native to the application could be used instead, where desired. This might be desired where silence suppression and voice detection services are desired. FIG. 4b depicts a music library that can be sorted according to song, artist, or playlist, drawing from music saved locally on the device. FIG. 4c shows that the application is designed to connect to third party music streaming services where permitted. FIG. 4d illustrates that various music and media sharing options may be provided in the application.

Figure 5A:
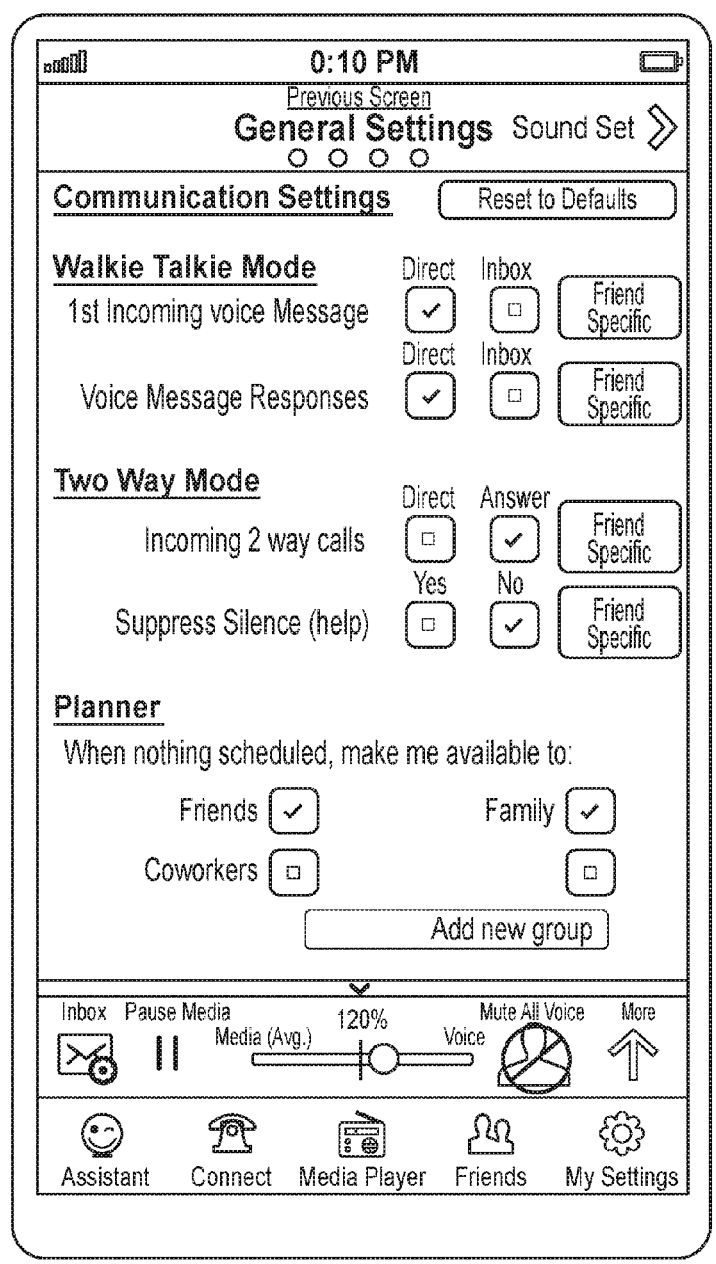
FIGS. 5a through 5d depict the "My Settings" feature.
Figure 5B:
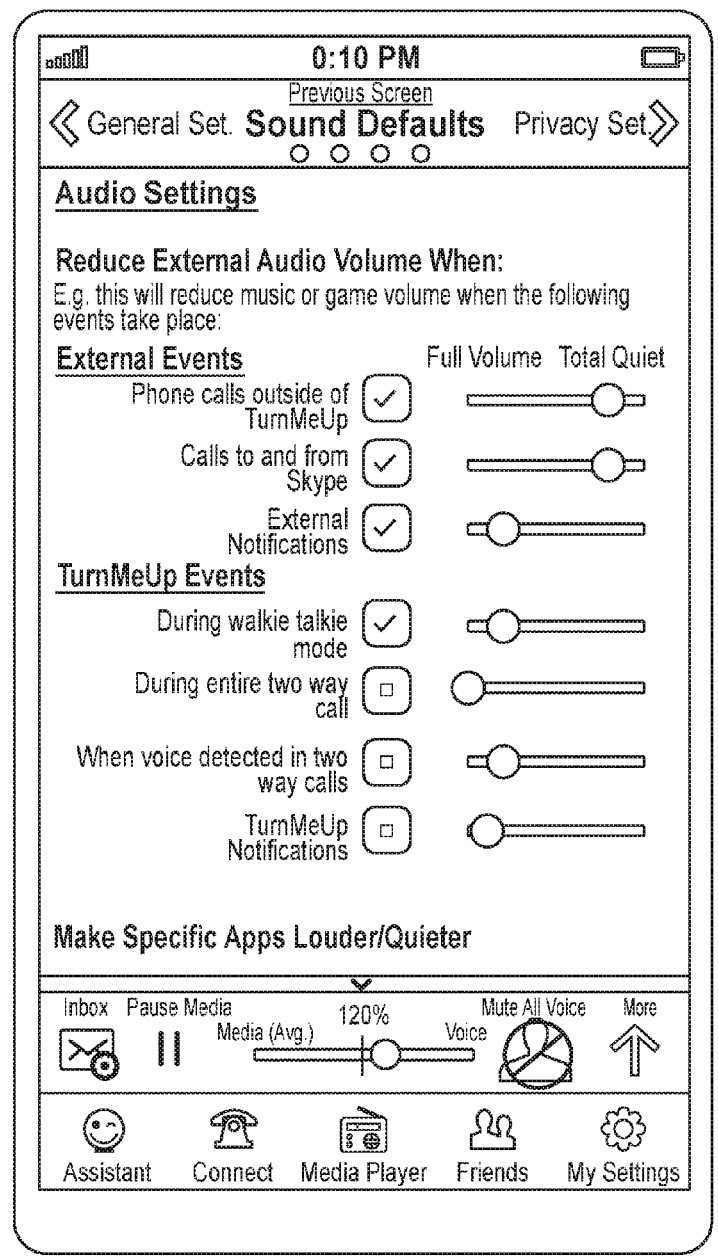
Figure 5C:
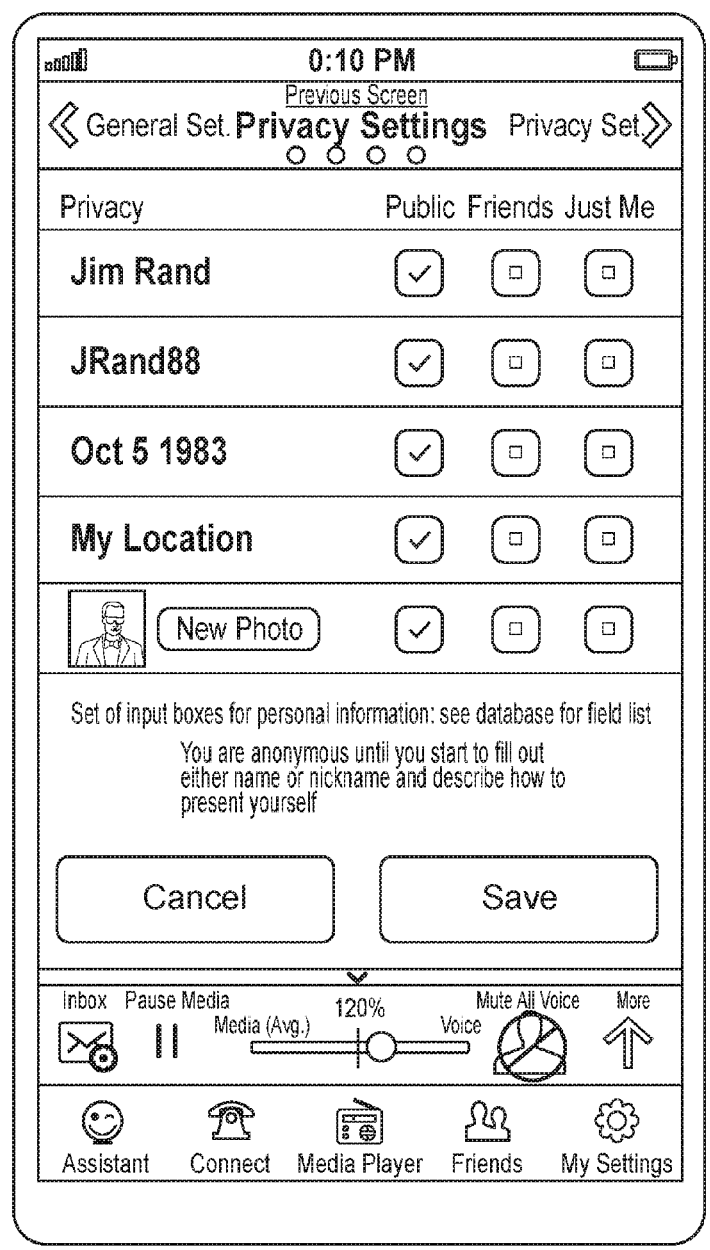
Figure 5D:
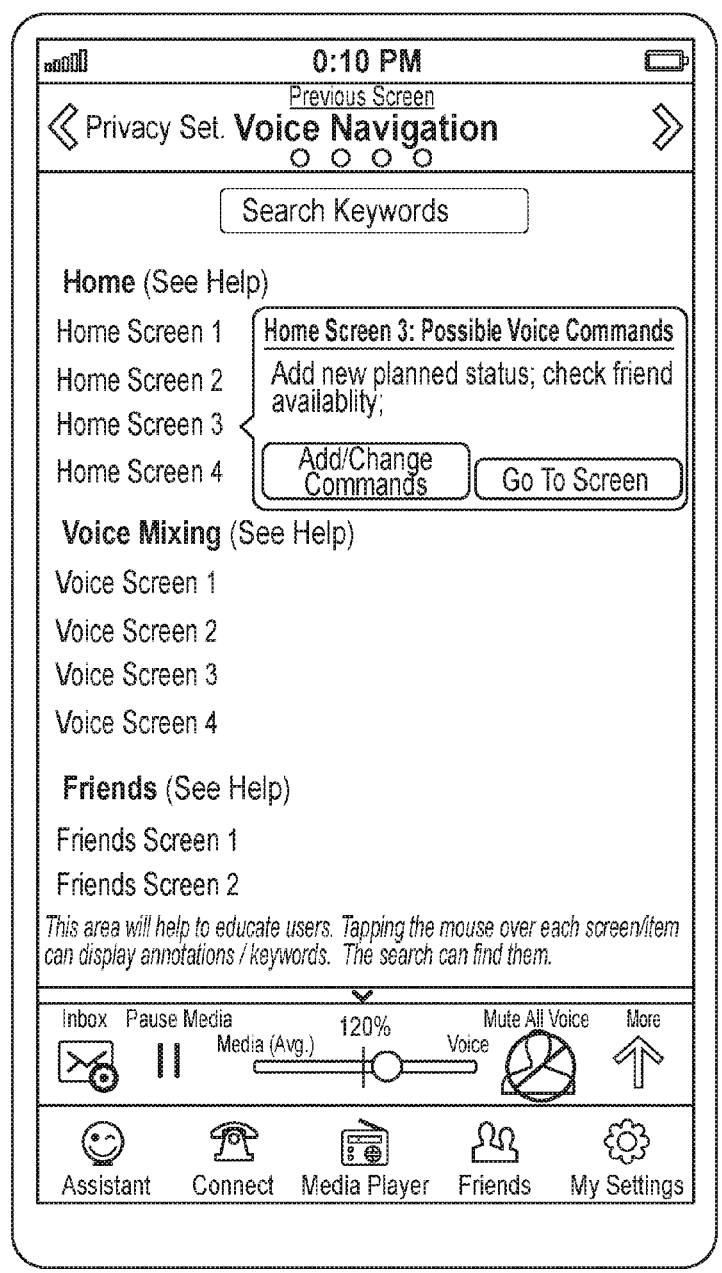

FIGS. 5a through 5d are part of the "My Settings" section. The My Settings section groups a number of settings categories into one section. FIG. 5a depicts a General Settings screen which is further described in FIG. 7f. FIG. 5b depicts an Audio Settings screen which is further described in FIG. 7a. FIG. 5c illustrates that privacy settings may be made available to manage sharing of information. FIG. 5d illustrates that Voice Navigation provisions may be made. Users will be able to add voice commands for common functions such as connecting friends to the Connect screen, initiating and responding to voice messages and 2-way communication, managing music and external calls, and other functions.

Figure 6A:
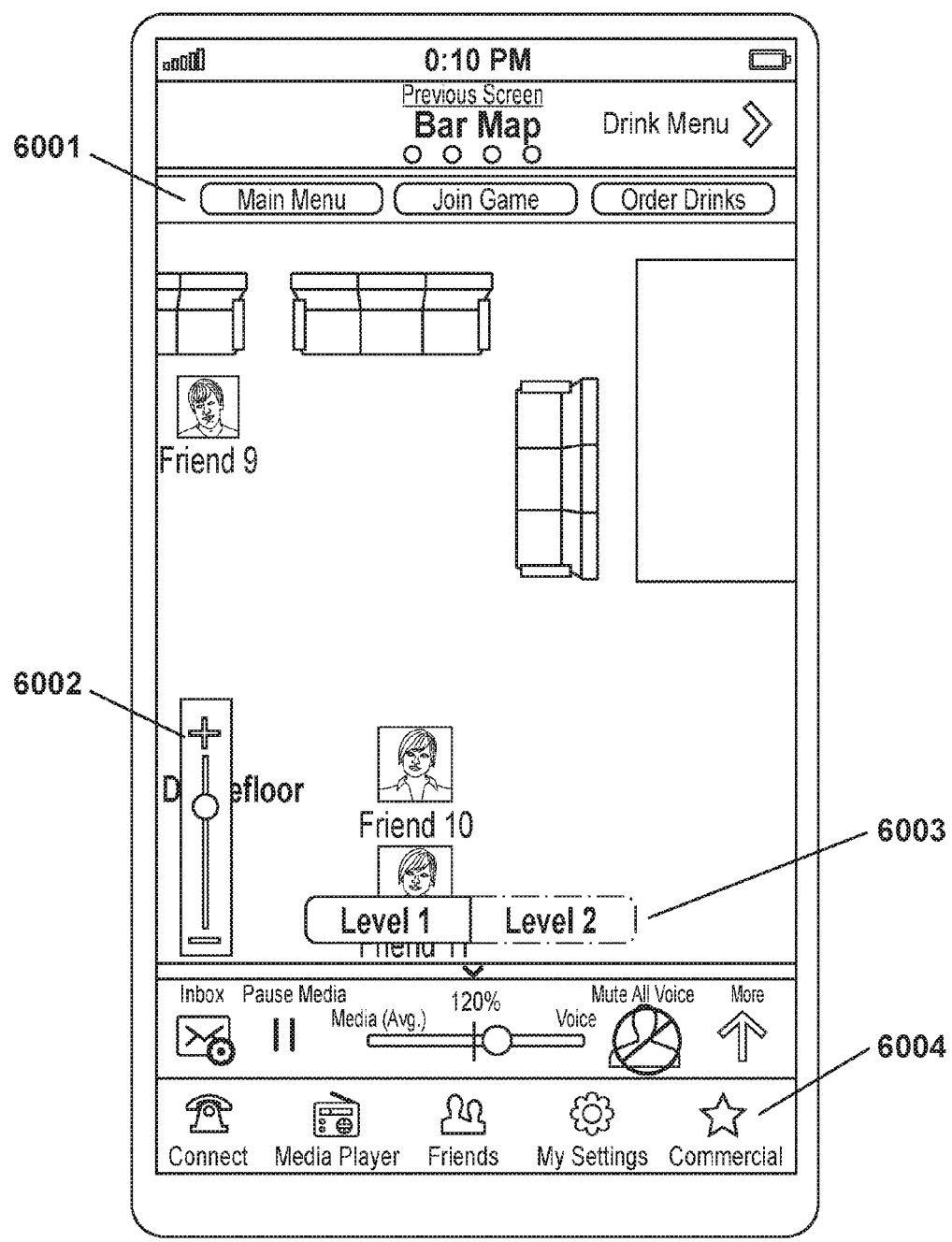
FIG. 6a depicts a map for a bar.
Figure 7D:
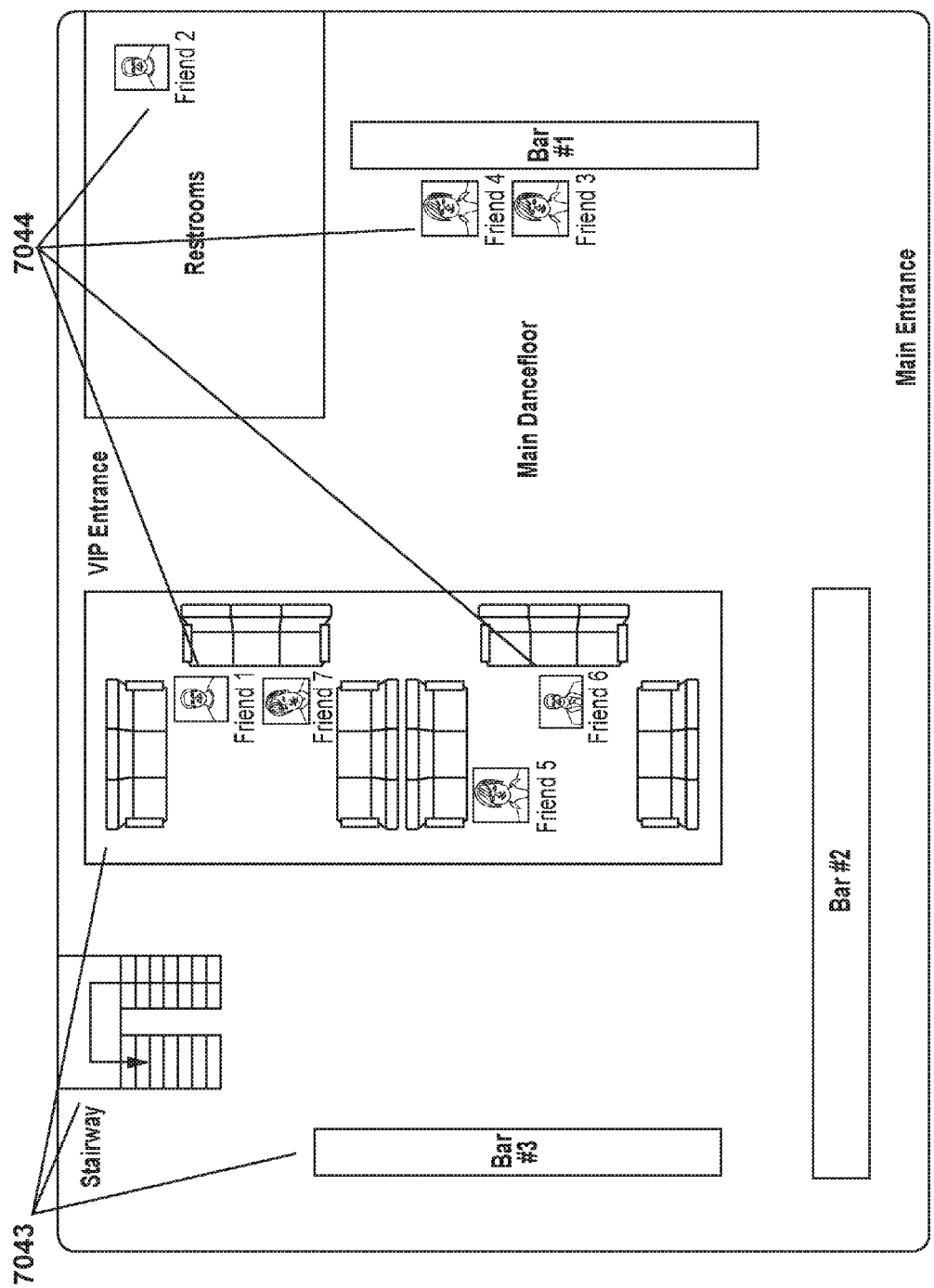
Figure 7E:
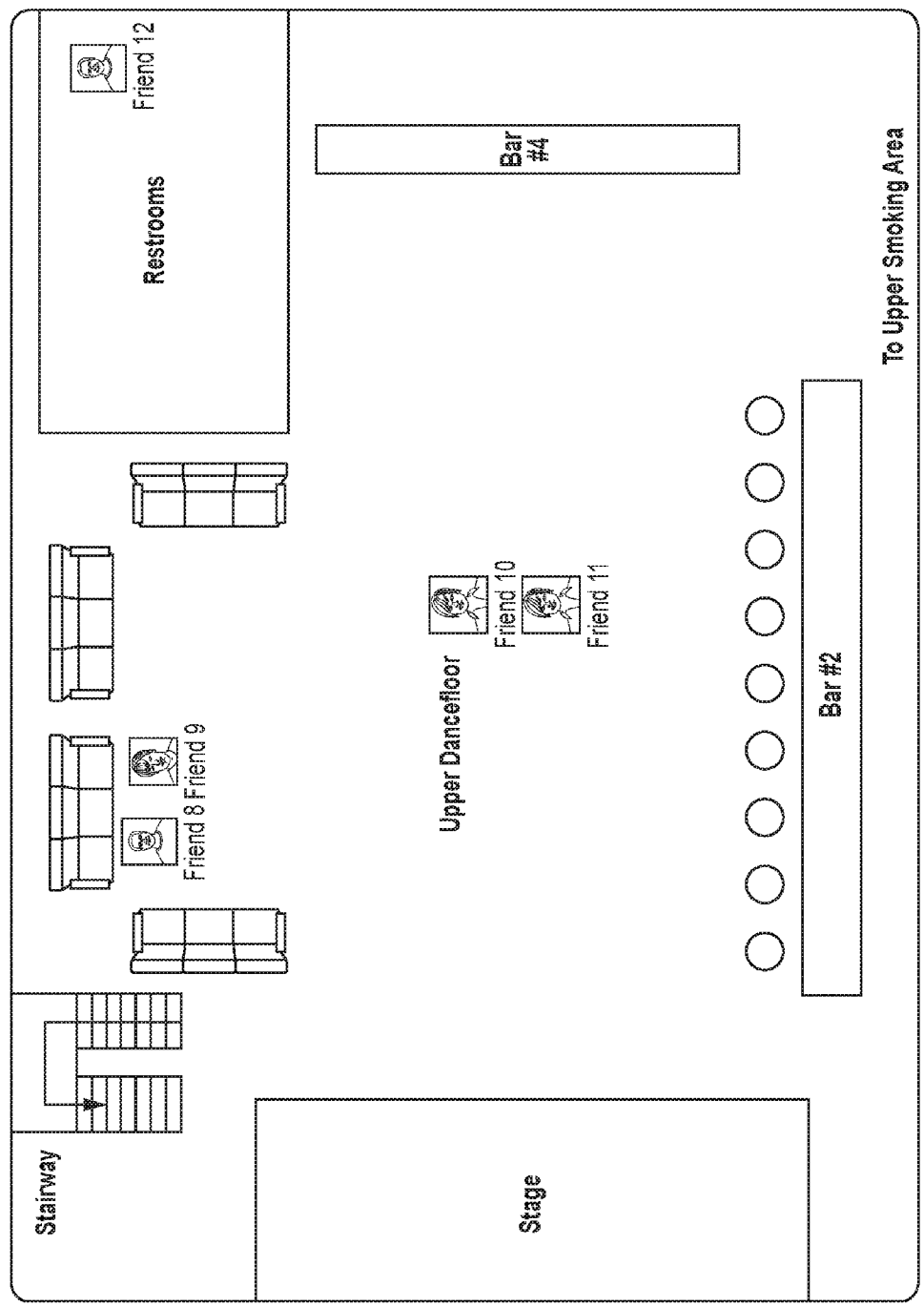
Figure 8A:
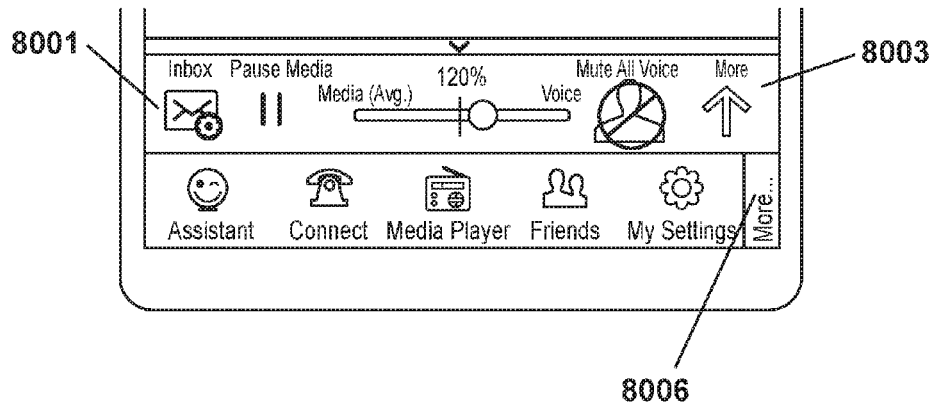
FIG. 8a depicts an embodiment of the menu bar in both a normal and an expanded state.
Figure 8A:
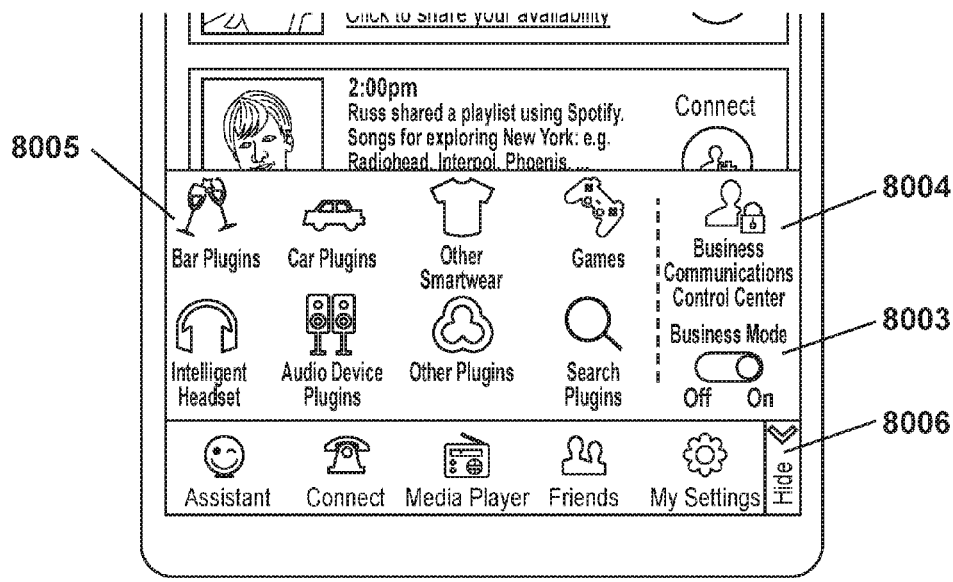

FIG. 6a depicts a map for a bar or other commercial establishment. The map may be scrollable in all directions. FIG. 7d depicts the complete lower level map, while FIG. 7e depicts the upper level. Toggling between the upper and lower levels could be achieved using a button overlaying the map (6003), while zooming in and out would be enabled through pinching and a zoom bar (6002). Depending on the commercial establishment, different plugins might be available to provide users with a more interactive experience. In the context of a bar, for example, options to join a game, order drinks, or other options could be made available (6001). Commercial implementations of the invention could be stand-alone, or integrated into software that is designed for many use cases outside of the commercial establishment. Linking the commercial features to the generic application could be through the main menu bar as shown in FIG. 6a (6004), as shown in FIG. 8a (8005), or another way.

FIG. 7a illustrates a set of audio settings that would encourage use of persistently running, silenced voice connections in a number of use cases, especially when used simultaneously with other audio containing apps. Users would be able to control when audio is ducked (7027) and by how much (7012). For example, during phone calls to/from external lines, it might be desirable to fully duck a call (7013). Depending on the level of integration with 3rd party VoIP services, it might be possible to control this same setting for calls made with the 3rd party VoIP app (7014). Control over audio is not necessarily restricted to calling, it could also be for external notifications (7015), among other things. It is likely that for many use cases, the user would prefer not to duck music as much during voice conversation, such as when running with friends, for example. Audio ducking preferences could be adjusted independently for different event communication types including walkie talkie mode (7016), during entire 2-way calls (7017), only when voice is detected in 2-way calls (7018), and for notifications from within the application (7019). Depending on the level of integration with 3rd party applications, it would also be possible to amplify or reduce the amplitude of 3rd party audio signals when they are running simultaneously with the application. For example, it may be that the default level of music and voice work very when listening to music through one music application, but not with another. FIG. 7a depicts settings that enable the user to manually adjust amplification levels for commonly used media applications such as iTunes (7020), Spotify (7021), and YouTube (7022), as well as other sounds including notifications within the app (7023) and outside of the app (7024), and an adjustment for all other sounds (7025). It could also be that the user wishes to detect human speech in other applications, and amplify only the speech component of these applications. For example, while studying or working and listening to music, the user may wish to watch an instructional video and have the voice of the speaker automatically amplified to a level where it is audible over top of the music, without needing to manually adjust volume levels. Settings for this could be provided as illustrated in element (7026).

Figure 7B:
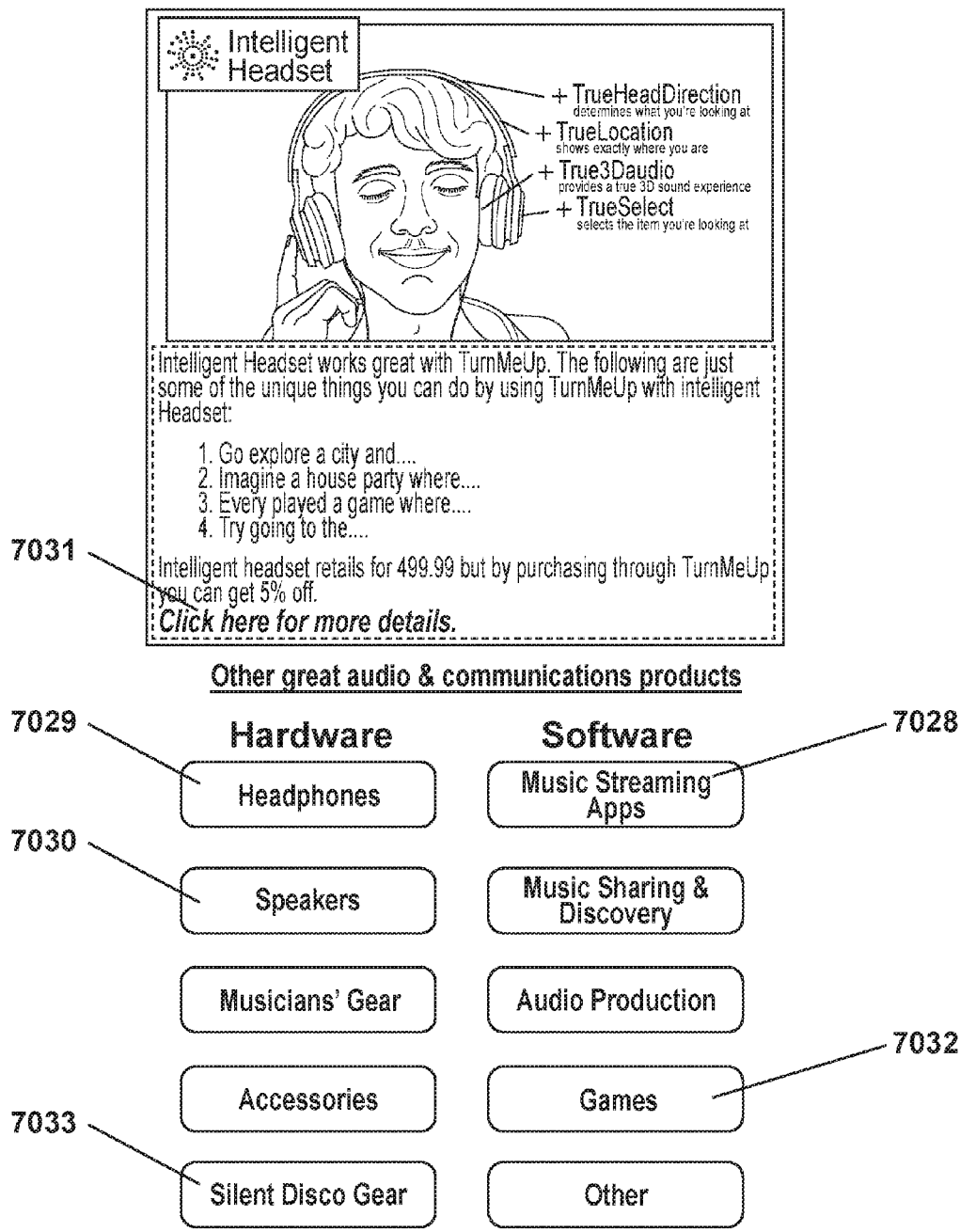
FIG. 7b depicts the container for the Audio Store that was shown in FIG. 1i.

FIG. 7b depicts the container for the Audio Store that was shown in FIG. 1i. Some hardware that could be used in conjunction with the application to facilitate novel use cases include headphones, speakers, musicians' gear, audio accessories, and silent disco gear. Clicking the headphones button (7029), for example, would provide a list of headphones and special features that are able to make use of software features within the application. For example, buttons on headphones could be used as shortcuts to certain functionality within the application. Likewise, certain noise cancellation features may make a number of use cases more viable, especially where noise cancellation features are built into the microphones on the headphones. Buttons on speakers (7030) could also be used in a similar way, and in conjunction with the "Media Cancellation" feature described earlier, would enable interesting use cases of the application inside the home, a car, or other places in which loudspeakers might be used. Users might also be encouraged to purchase (or rent) silent disco gear (7033) to facilitate unique house parties. Integration with 3rd party software could also enhance user experience, and users could be made aware of compatible software through the Audio Store. Music streaming apps (7028) that provide Application Programming Interfaces (APIs) or Software Development Kits (SDKs) could be made compatible; likewise, an SDK or APIs could be made for 3rd party developers to integrate with the software of this invention at their own will. This would be particularly useful for game developers (7032), as the number of games that could benefit from real time communication is large. Communications for gaming on fixed systems exists, but this invention would provide a simple means for adding communications to mobile games. Partnerships with 3rd party hardware and software providers might dictate that a certain product be featured for a limited time, with easy access to purchase the product online (7031).

FIG. 7c depicts the container for the Friend Availability component of the planner that was described in FIGS. 1d, 1e, and 1f. Users can search for specific categories of friends (7034) or for specific groups of friends (7039). When performing a search to see which individuals are available, it would be beneficial to know what the friends are "Available For" (7038). For example, friends may be willing to consume media together from home, such as a live concert, music, or a movie, but be unwilling to go out. Users are able to make these preferences known by setting their own availability as illustrated in FIG. 1d. Users may wish to see who is available to do something now, later, or for a specific time frame (7035). It may be that for specific activities, such as a movie, a minimum timeframe is required (7036). The searching party may also wish to make specific plans now, and restrict his or her search to friends that are likely to respond immediately (7037). A group search (7039) attempts to make planning of group activities much easier by automatically searching the calendars of each friend and attempting to match periods where some or all of the friends are available. This would help the user conducting the search to suggest times for getting together with a high likelihood of acceptance. Manually, this is much more difficult. From the set of friends selected, a user can set criteria that a minimum number friends (7040) be available within a specific timeframe and for a minimum amount of time (7041). A choice to "match unscheduled time" (7042) would determine whether the search restricts results to periods where the friends had specifically set their status to available, or whether it includes periods in which the friends had not put anything into their calendars.

FIG. 7d depicts the container for the bar map illustrated in FIG. 6a. Common elements would be available to create a layout that easily matches that of the commercial establishment using the application. These elements might include blocks, stairs, and furniture (7043), for example. The layout would be drawn in relation to the Indoor Positioning System (or GPS) used to facilitate the location tracking of users (7044). FIG. 7e illustrates that multi-level commercial establishments can contain multiple layout maps, linked through user interface buttons as illustrated in FIG. 6a.

Figure 7F:
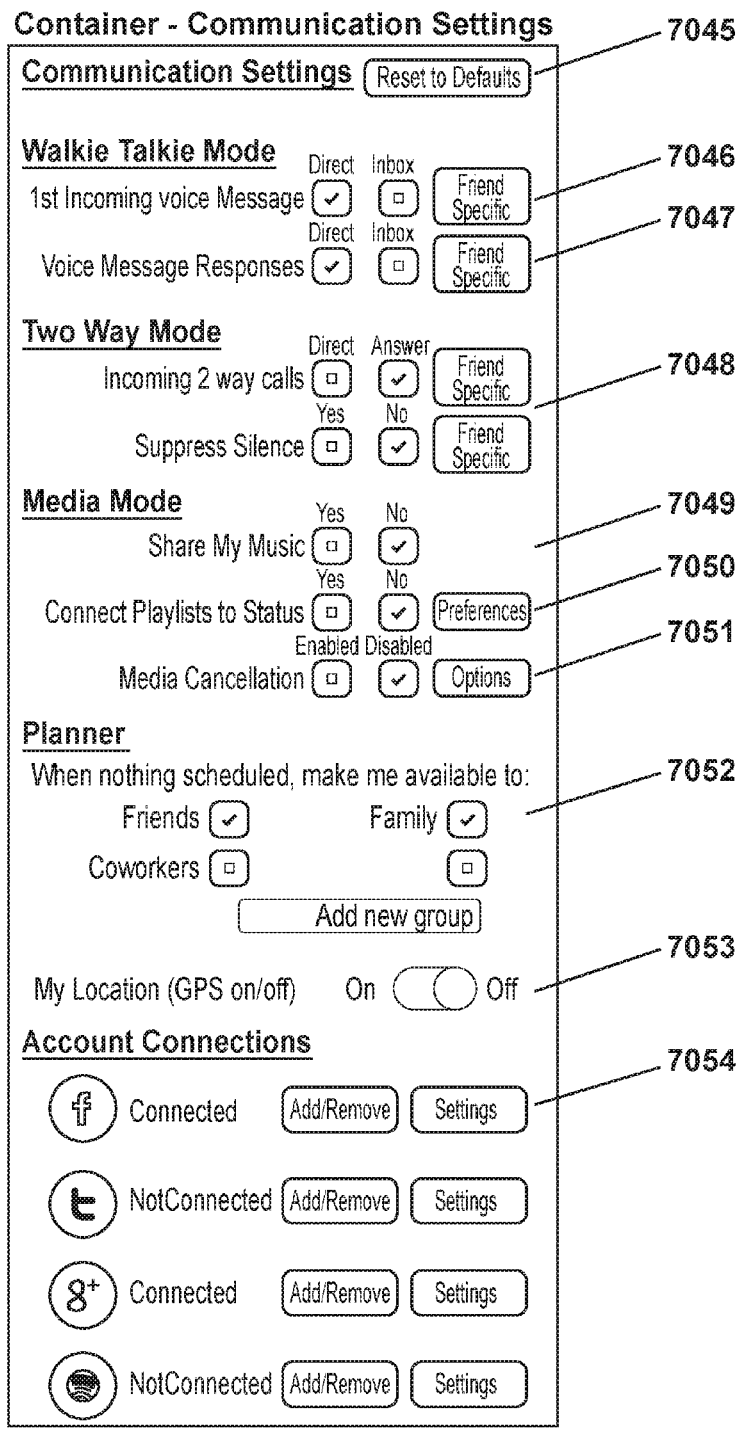
FIG. 7f illustrates the incorporation of user selectable communication settings that facilitate flexible communication modes, thereby facilitating many novel use cases for a single communications app.

FIG. 7f illustrates the incorporation of user selectable communication settings that facilitate flexible communication modes, thereby facilitating many novel use cases for a single communications app. For example, in Walkie-Talkie mode, incoming voice messages may be direct or could be saved as audio clips and delivered to an Inbox. This setting could also be made friend specific (7046). Voice message responses could be defined by the application as voice responses to incoming voice messages within a defined timeframe (either hard coded or user adjustable). Treating voice message responses differently from initial messages provides an ability to easily converse in real time after initial contact has been made. Thus, it is likely that users would prefer incoming responses to be direct, even if the first incoming message is directed to an inbox. Hence, a separate setting could be provided (7047). 2-way communications are handled differently, and users can opt to answer incoming call requests automatically or intentionally, and this setting can be different for each friend (7048). For certain friends, or in public establishments where it is desirable to establish communications instantaneously, 2-way connections could be established automatically. At work, on the other hand, the user may wish to require intentional answering for most colleagues. 2-way calls would also have an option to suppress silence (7048) through Voice Activity Detection. In many cases this would be desirable, but the option to turn it off would provide flexibility for "comfort noise" and situations in which the Voice Activity Detection technology is unable to function correctly. Default settings would simplify use of the application, while help guides could be used to explain settings for advanced users. Media mode features include the choice to publish "what I'm listening to" (7049), which could show up in friends' news feeds and with their status (see FIG. 2a) where further music sharing options will be available. Element 7050 depicts a setting to "Connect Playlists to Status". This feature is intended to allow playlists with certain "moods" to be matched to statuses that match those moods. For example, a user might set a recurring status for "walking to work", or set his/her status to "at the gym". Each of these statuses could be linked to a playlist within or outside of the application. Element 7050 captures this concept, and the "preferences" button would link to further options to set it up. Media cancellation (7051), described earlier, could be optional because it might introduce a processing delay until signal processing technologies improve. Element 7052 captures a setting to automatically set one's availability for periods that are not specifically planned by the user. This preference would make the user appear as available to specific categories of friends (e.g. Friends, Family, Coworkers, etc.) in availability searches conducted by others, as described in FIG. 7c. Another setting includes the ability to share location (7053) for the purpose of appearing in location-based searches (e.g. Find people nearby). Connecting to 3rd party accounts would also be optional (7054), and generally serves to share information with other social networks.

Figure 1J:
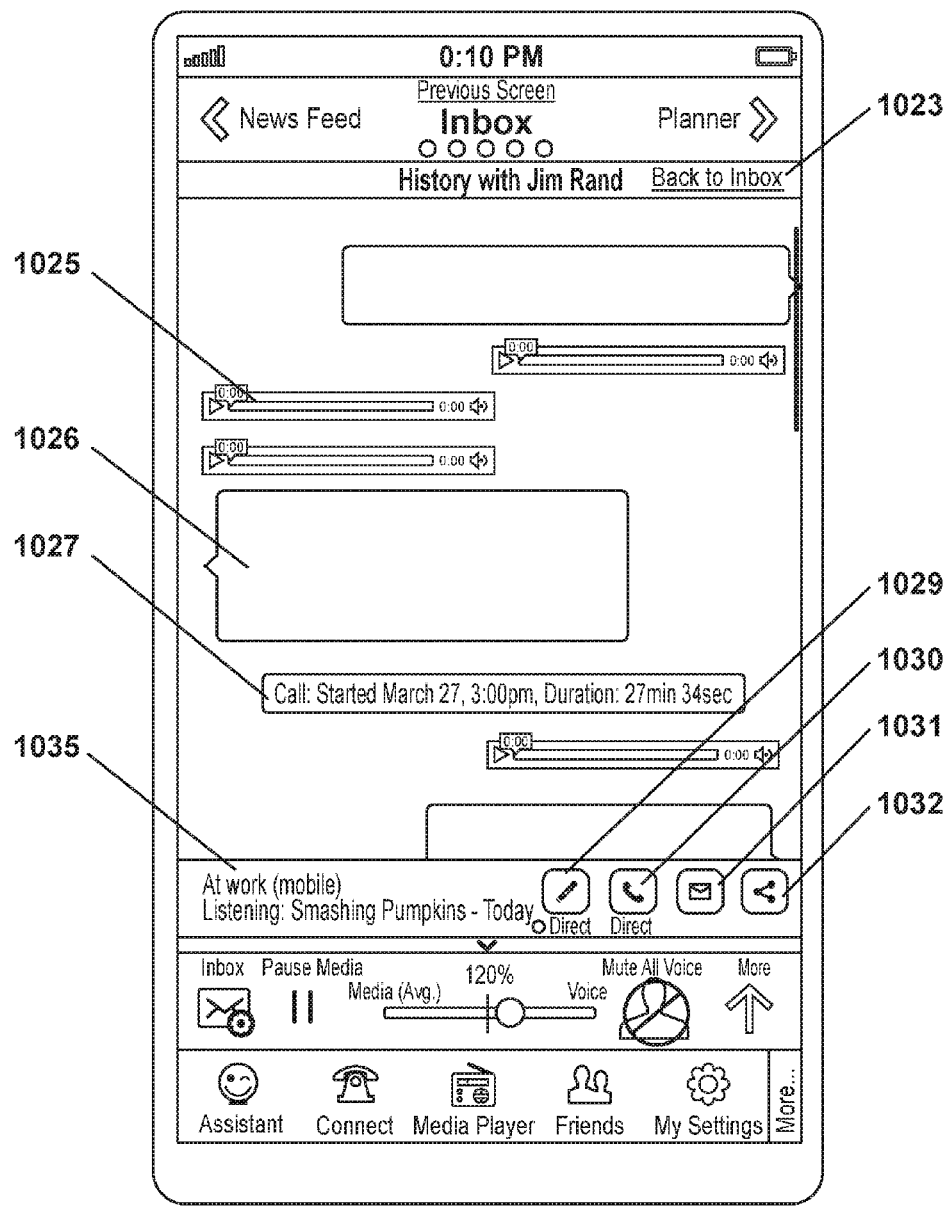
Figure 7G:
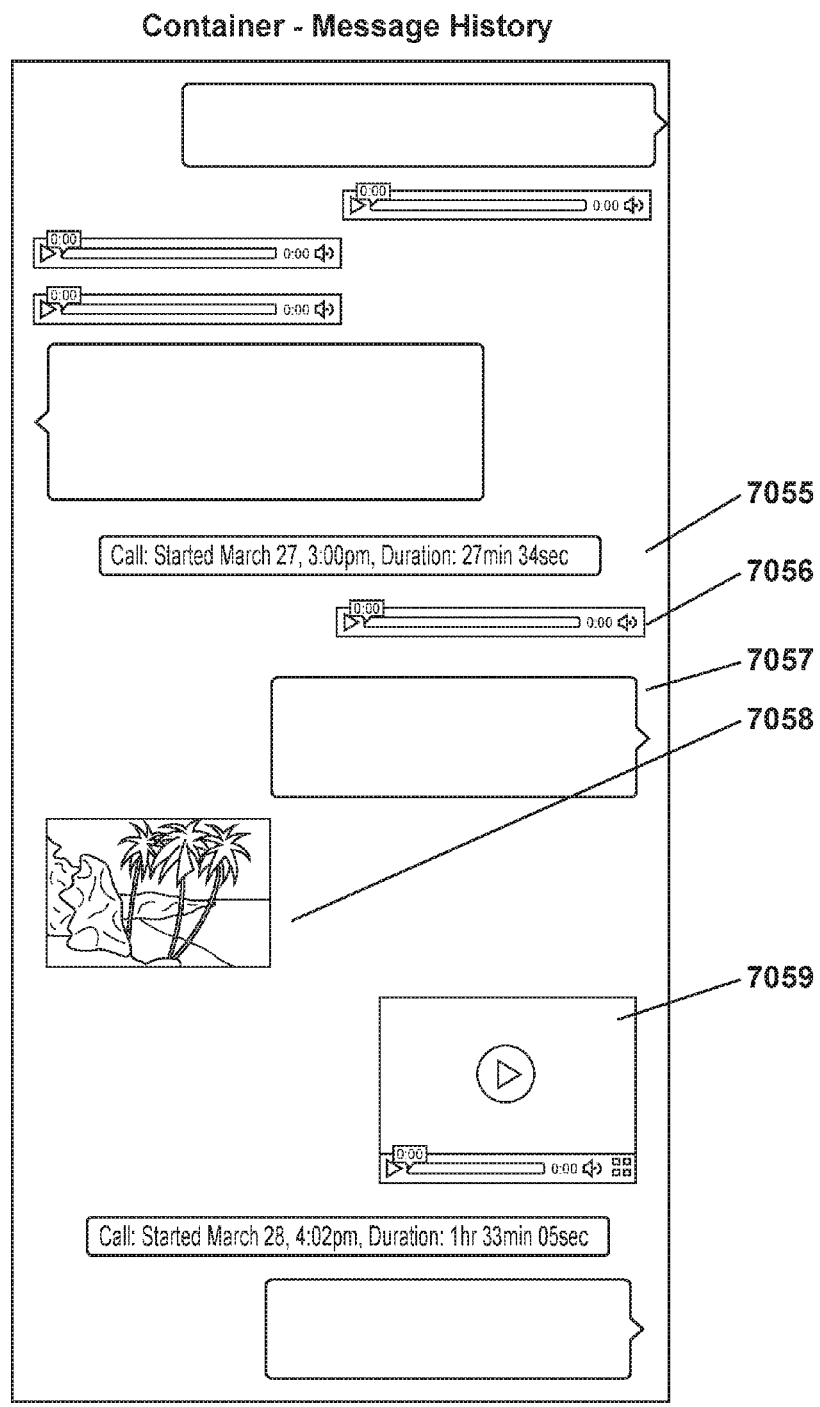
FIG. 7g illustrates the container for the Inbox message history described in FIG. 1j.
Figure 7H:
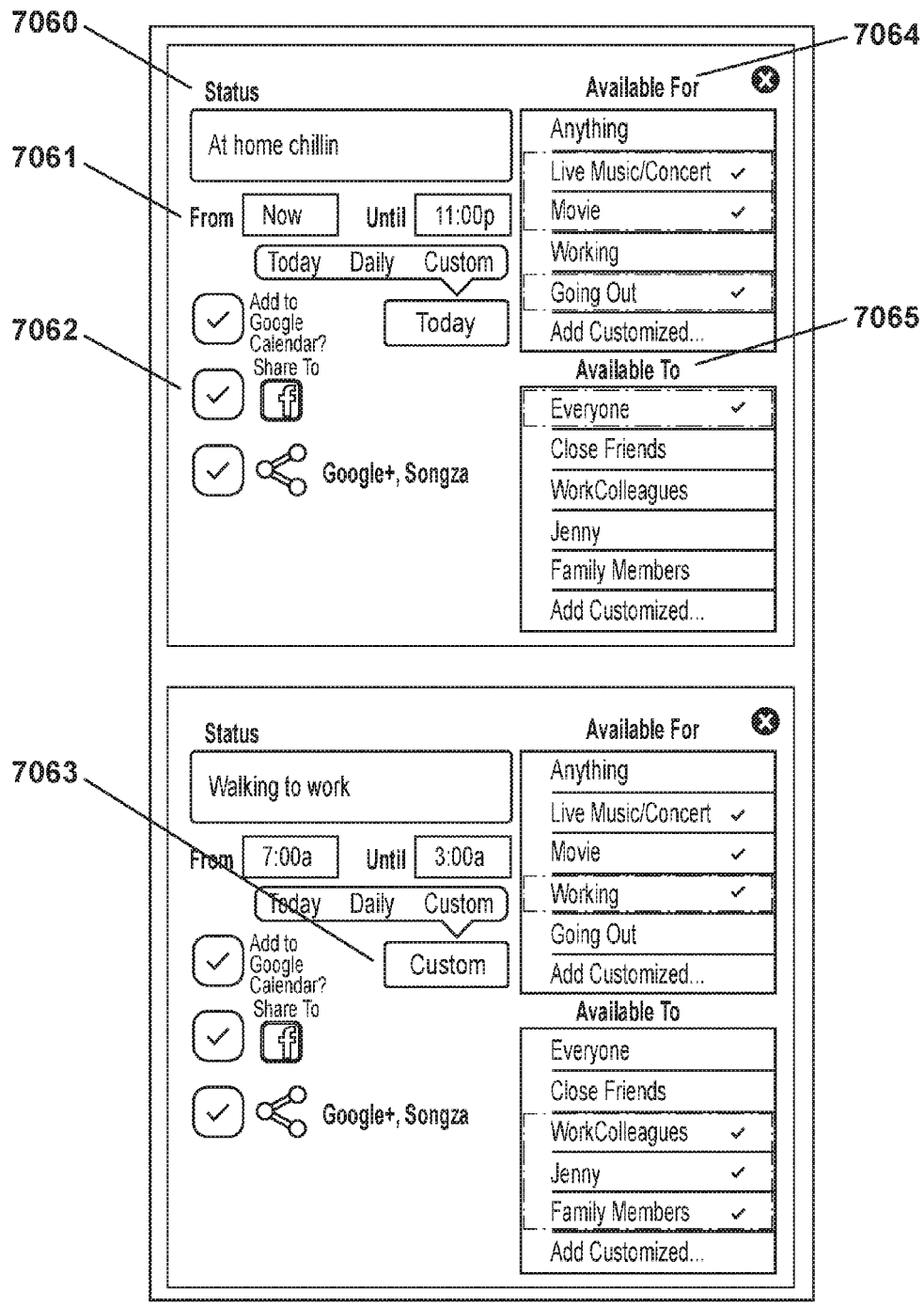
FIG. 7h depicts the container for the Set Availability component of the Planner illustrated in FIG. 1d.
Figure 7I:
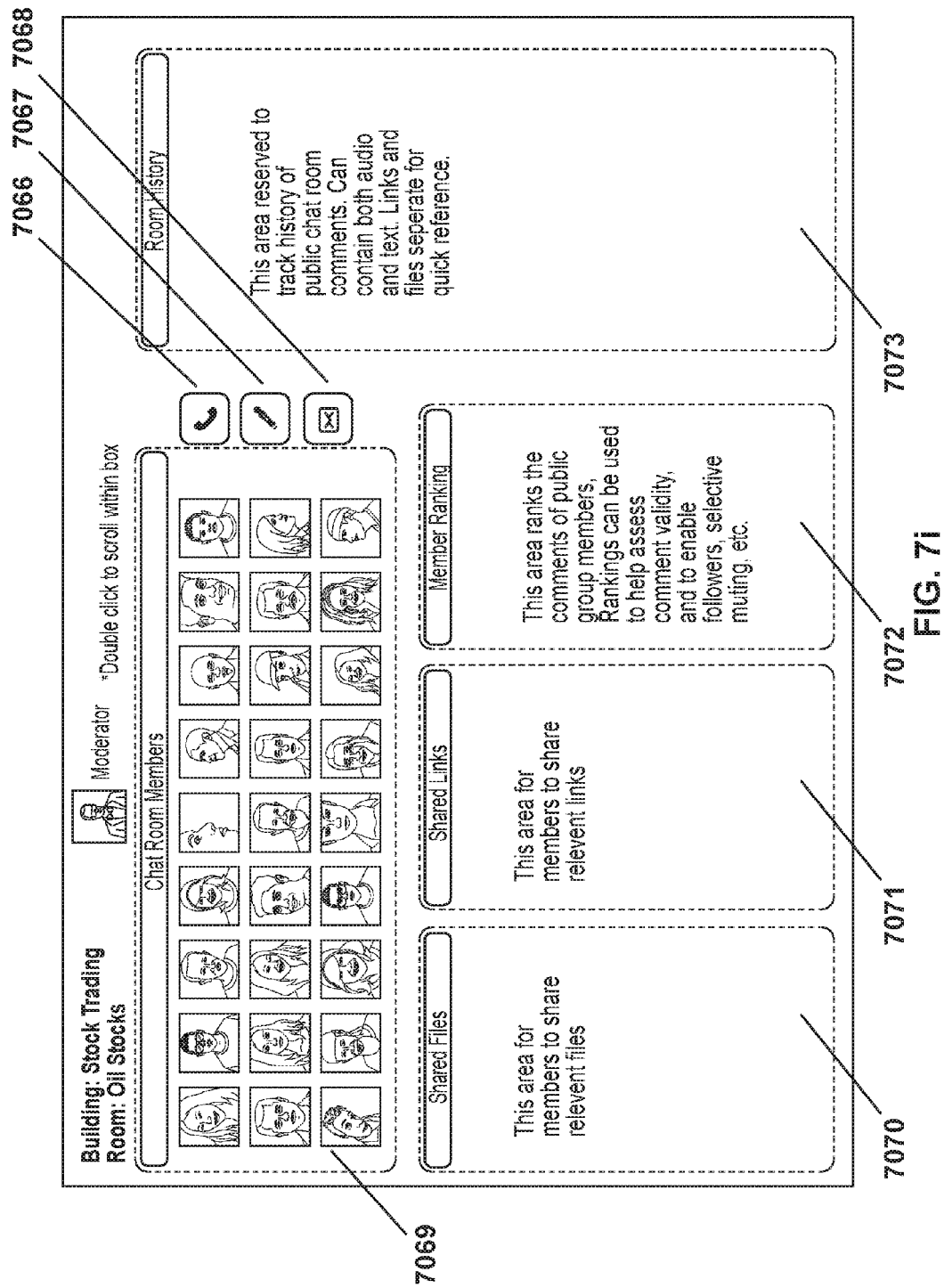
FIG. 7i depicts the container for the Public Group feature illustrated in FIG. 2h.

FIG. 7g illustrates the container for the Inbox message history described in FIG. 1j. A history would include the ability to reference past communications such as 2-way calls (7055), Walkie Talkie (PTT) messages (7056), Text (7057), Photo sharing (7058), and Video Sharing (7059).

FIG. 7h depicts the container for the Set Availability component of the Planner illustrated in FIG. 1d. The user is able to enter a status (7060) as well as whether this status is one time, or recurring (7063). A timeframe can be chosen (7061), and the status can also be shared to external networks (7062). The user is able to make himself searchable to others during this period, and can be visible to certain groups of friends (7065) for specific types of activities (7064).

FIG. 7i depicts the container for the Public Group feature illustrated in FIG. 2h. Users will be able to click on individual chat room members (7069) for a list of communication options that would apply to that individual. Additionally, users can access communication options for the entire group, such as 2-way (7066), PTT (7067), and text messaging (7068). Separate segments are also envisioned for quick reference to shared files (7070), links (7071), and other history (7073). A member ranking feature (7072) is envisioned to help hide unwanted comments or to block users selectively based on their rankings. These features could be used to facilitate voice-based communications among strangers, providing enough control to avoid noise or unwanted communications from malicious or annoying users.

Figure 7J:
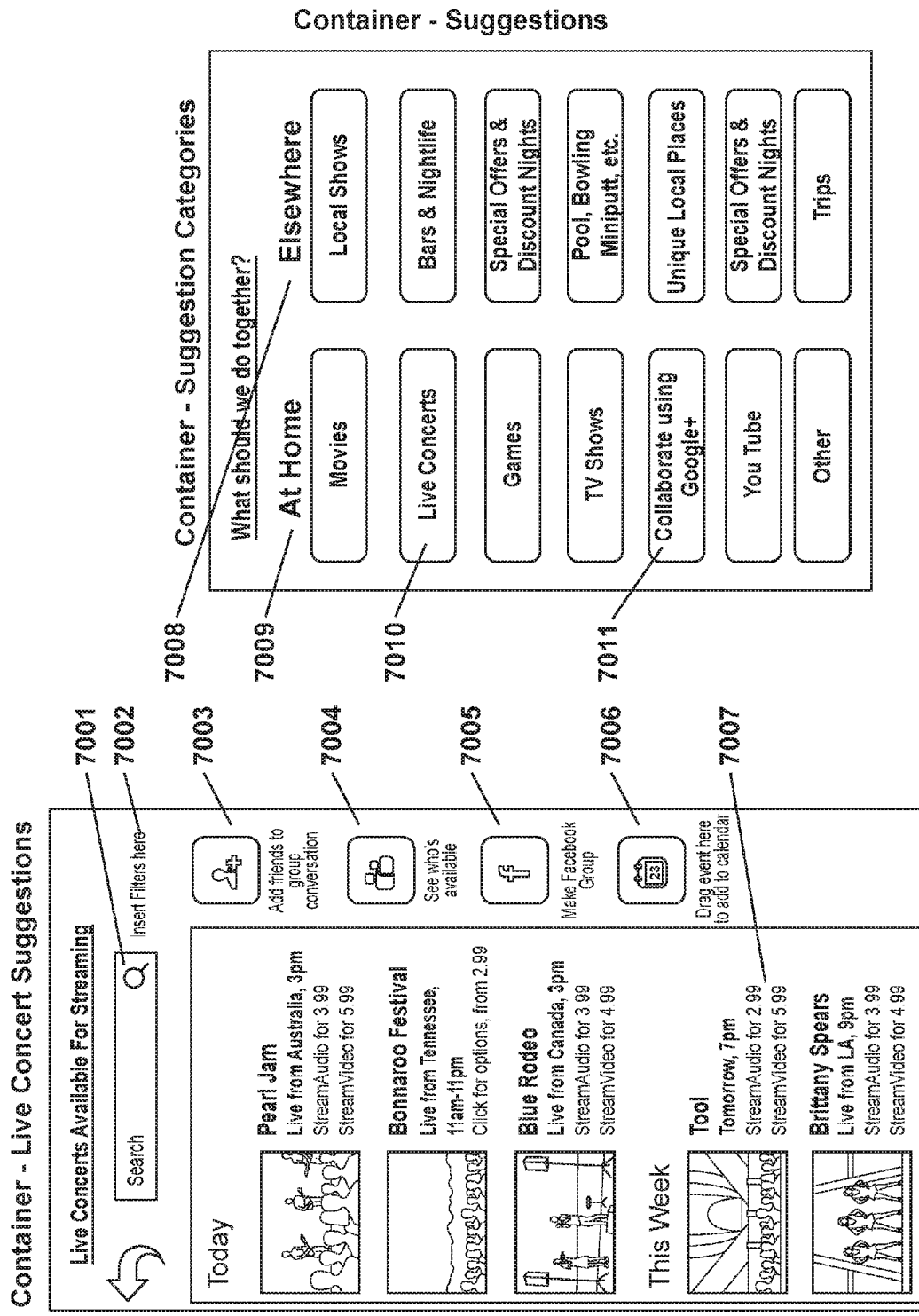
FIG. 7j depicts the containers for the suggestions features shown in FIGS. 1g and 1h.

FIG. 7j depicts the containers for the suggestions features shown in FIGS. 1g and 1h. Suggestions are categorized into activities that can be done from home (7009) or elsewhere (7008). As described earlier, "At Home" activities generally involve voice-based collaborating while using the application's media player as opposed to activities that are done outside of the application. One example is enjoying a streaming live concert (7010) together. The audio and video could be streamed (7007) while users remain voice-connected for the entire duration of the concert. One user might take the initiative to search for an interesting live concert (7001), filtering options (7002) by date, time, genre, among other things. This user could then invite friends (7003) to collaborate on what concert to watch, or see who's available (7004) at the time of the concert. The user might also plan and publish a get-together on external networks (7005), or save it to his/her calendar for a later time (7006). Another example of collaborating through the media player might be to tie into existing 3rd party services (7011). Google Hangouts, for example, allow users to view You Tube videos or share screens with one another, while still allowing Push To Talk functionality. Links could be provided to these services to avoid needing to rebuild this functionality within the application, and would also help to link user bases between this application and 3rd party applications.

Figure 7K:
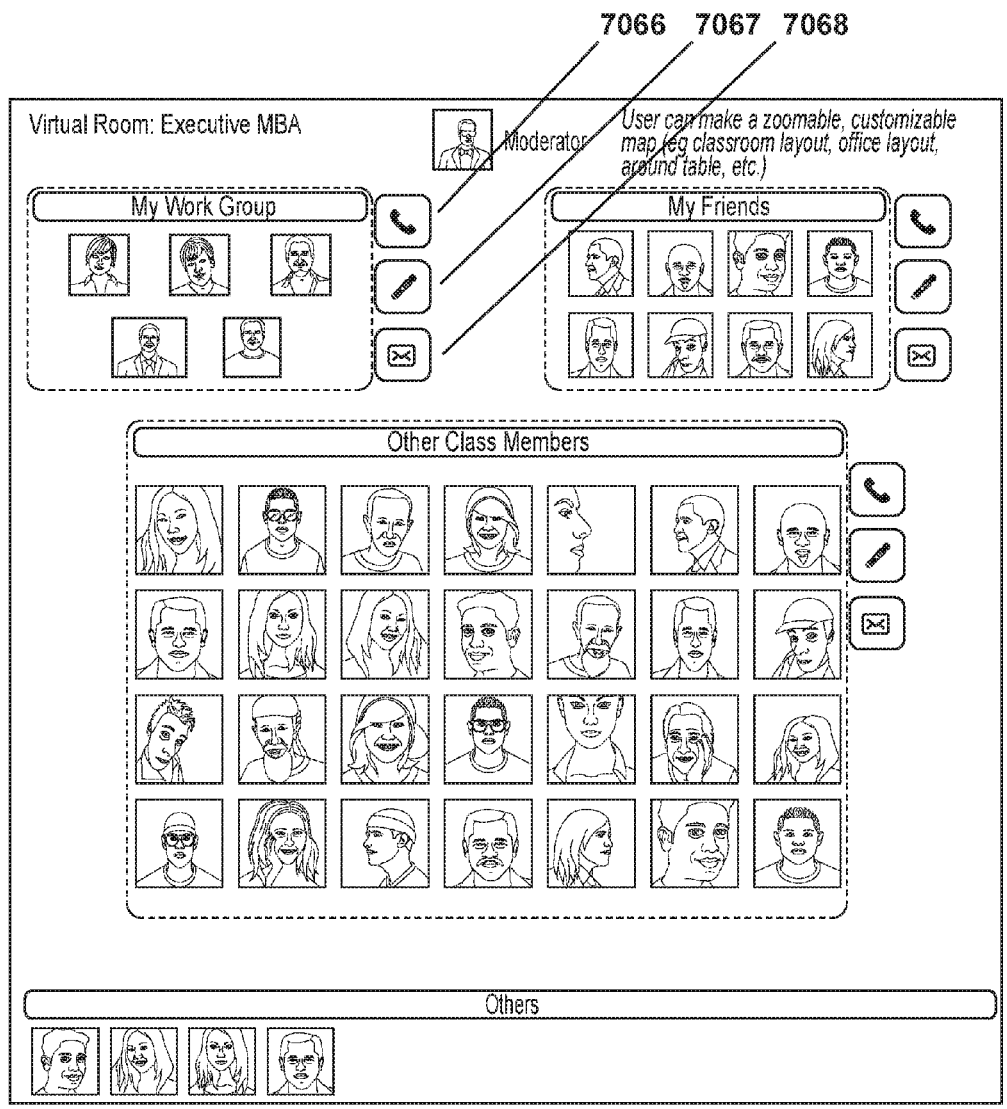
FIG. 7k depicts the container for the Virtual Room feature shown in FIG. 2e.
Figure 7L:
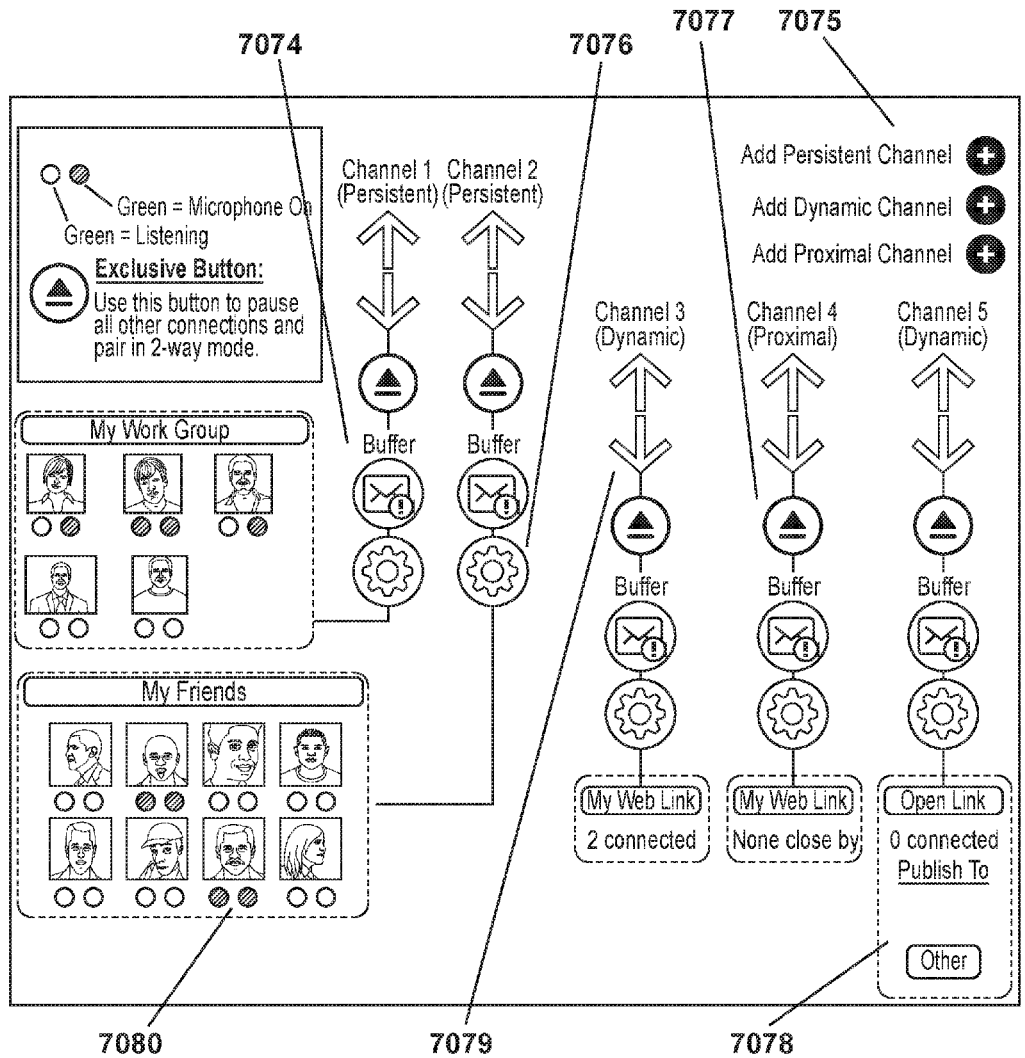
FIG. 7l depicts a scrollable container with flexible communication channels.

FIG. 7k depicts the container for the Virtual Room feature shown in FIG. 2e. This container may be scrollable from a mobile device in all directions. Users can create their own groups and arrange them however they like on the screen. Users can access communication options for the entire group, such as 2-way (7066), PTT (7067), and text messaging (7068). They can also click on individual group members for a list of communication options that apply to that individual member.

FIG. 7l depicts a container for an embodiment of the Flexible Groups feature identified in FIG. 2d. Different embodiments are possible, but would generally offer similar communications flexibility that can be controlled from a user interface. The figure illustrates a visual layout that would help users to establish and control different communications modes in a flexible way. This container would be scrollable from a mobile device in all directions, and users would be able to add, arrange, and delete groups and channels from the layout. Different types of communications channels are possible (7075), including persistent, dynamic, and proximal (as described earlier). Each channel could have a buffer with an easily accessible history (7074), as described earlier. Channel and buffer settings (7076) could also be made easily accessible. An "Exclusive Button" (7077) could be used to pause all other connections for an exclusive conversation with a particular person or group. Dynamic channels could be used to create links (7078) that are accessible to non-users of the application; links could be made available on websites or via outlets such as Facebook, Twitter, Google Plus, and others. This way the creator of the channel could easily invite others, regardless of whether they are already users of the same application. Users can click arrows (7079) to establish communication in each direction. Up arrows represent incoming voice (user can hear others) while down arrows represent outgoing voice (others hear user). Green might represent on, and gray could represent off. Similarly, indicator lights (7080) could be used to indicate whether certain individuals within the group have their microphones on, and whether they are listening. For example, the left light could be green to indicate that a user is listening to other activity on the channel, while red would indicate that the user is not listening. The right light, when green, would indicate that the user's microphone is on. Provision could be made to access options for each individual, allowing selective muting and volume control, for example.

FIG. 8a depicts an embodiment of the menu bar in both a normal and an expanded state. Clicking the "More" button (8002) activates the expanded state, from which a number of options are available. The "bar plugins" (8005) section can be accessed, for example. Other options depicted in the figure include car plugins, other smartwear, games, intelligent headset, audio device plugins, other plugins, and a search feature. A provision for business mode (8003) is also provided, as well as the ability to apply business mode settings (8004). Business mode is further described elsewhere in this document. Clicking the "Hide" button (8006) will collapse the menu bar to its normal state. The menu bar and a brief overview of how it links each section is described above under Relationship of FIGS. 1a through 8c.

Figure 8B:
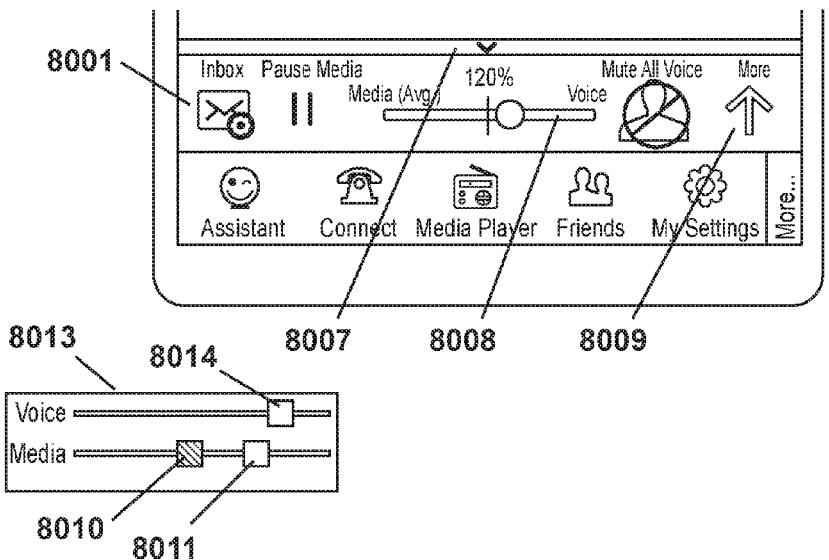
FIG. 8b depicts an embodiment of the shortcut bar in both a normal and an expanded state.
Figure 8B:
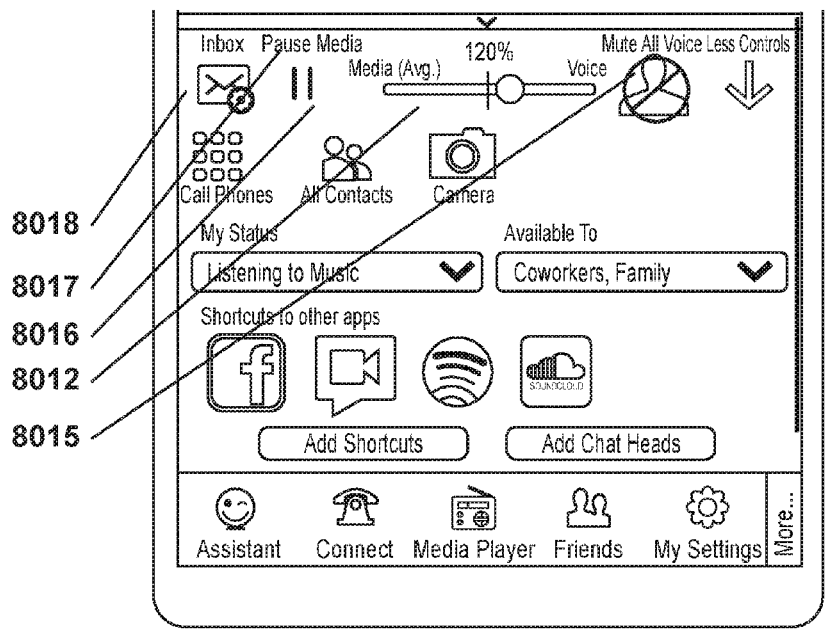

FIG. 8b depicts an embodiment of the shortcut bar in both a normal and an expanded state. Clicking the "More" button (8009) activates the expanded state, while clicking it a second time will collapse back to the normal level. Element 8007 can be used to hide the shortcut bar entirely. The relative volume slider (8008) can be used to adjust the relative level of voice vs. overall background audio (e.g. average level of music, games, videos, etc.). An alternative relative volume slider is depicted separately (8013). The voice and media volumes bars are separate, but side by side and background processing will ensure that the relative loudness is proportional. The alternative relative volume slider is shown in a state where the voice volume (8014) is slightly louder than the media volume (8011). It is also shown in a state where the "auto-ducking" feature is used, such that background audio will be ducked below its normal level (8010) when voice is detected, creating a larger spread between the voice and media volume during conversation. The expanded state of the shortcut bar shows examples of quick links that would provide easy access to commonly used functions, including a dialer (8018), a button to pause and fast forward media (8017), contacts list access (8016), camera access (8012) for use with photo/video sharing and augmented reality features, and a "Mute All Voice" button (8015).

Figure 8C:
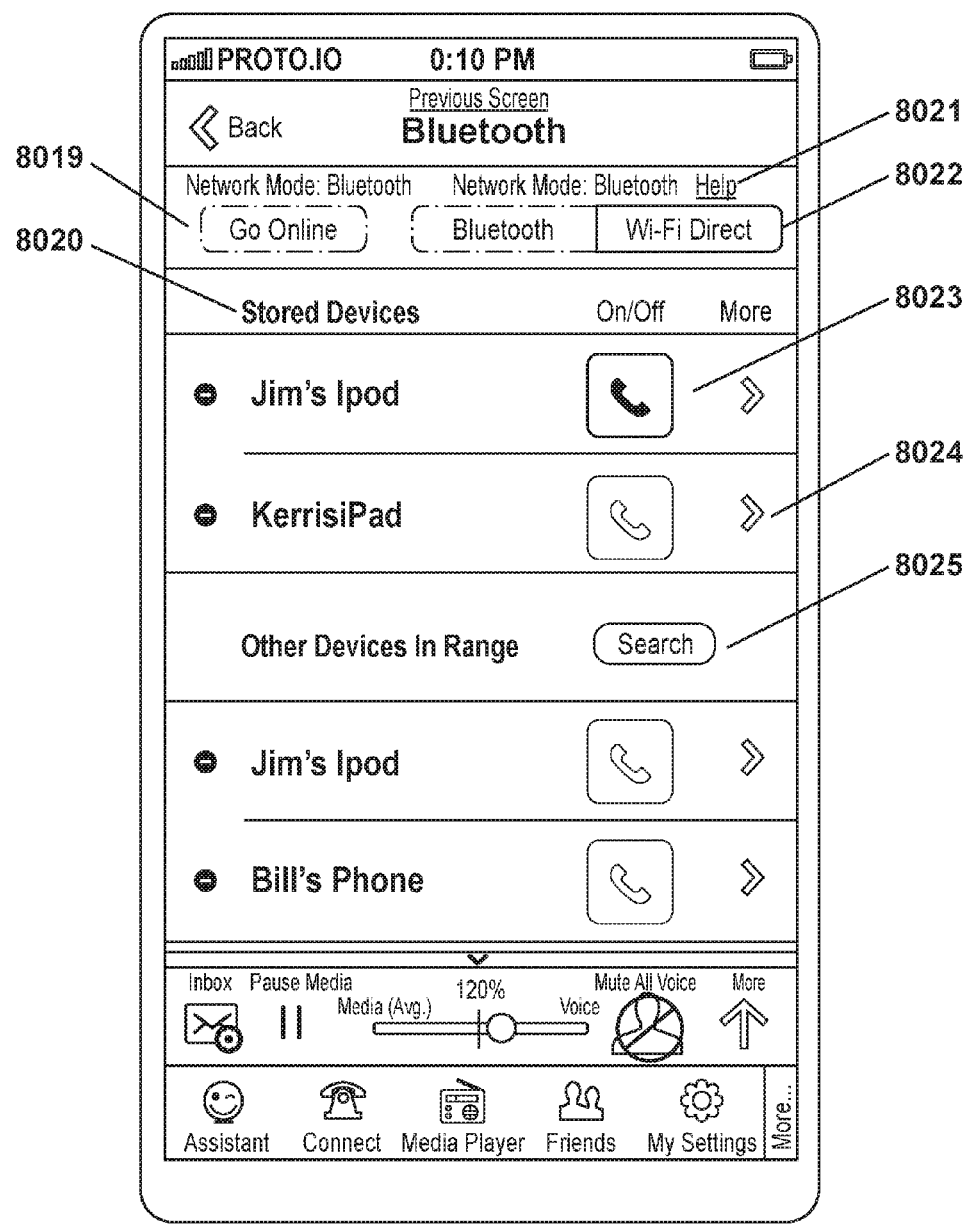

FIG. 8c depicts an embodiment of "Offline Mode". This mode is operable without external networking gear or an internet connection, and "Online Mode" could be toggled with a button as in element 8019. The connection mode would be either Bluetooth based or another P2P connection, and could be selected by the user (8022). Bluetooth may use less battery, for example, but have shorter range. The P2P connection may also be necessary in order to operate the application with certain Bluetooth headsets. Connecting and disconnecting friends within range could be done through an On/Off button (8023), and friends could be recalled from storage (8020) or searched (8025). Additional options such as music and file sharing could be made available through the more button (8024).

Figure 9A:
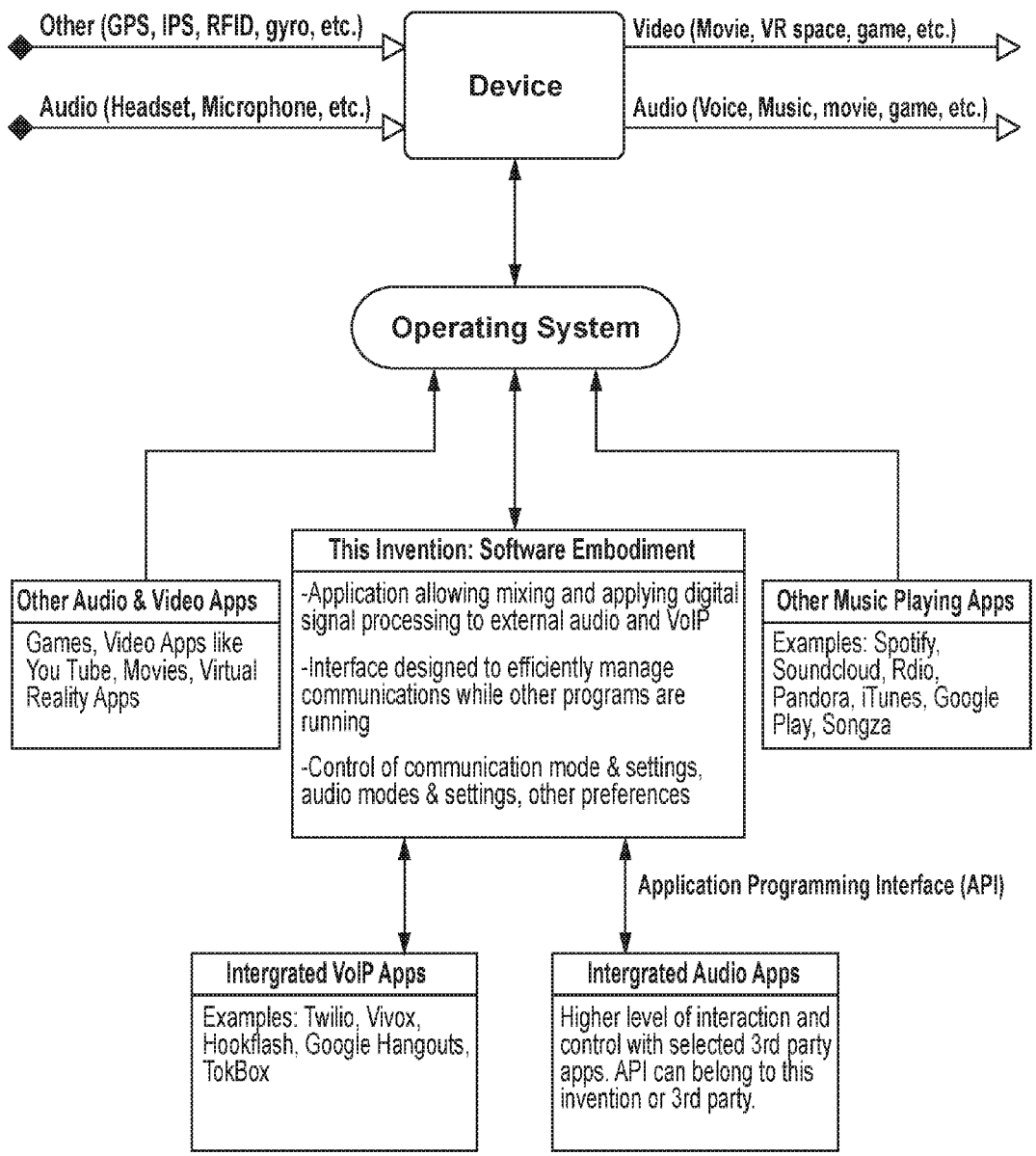
FIG. 9a illustrates an embodiment of the invention including a possible relationship between a device, operating system, and a software application serving as the software component of the invention.

FIG. 9a illustrates an embodiment of the invention including a possible relationship between a device, operating system, and a software application serving as the software component of the invention ("The Application"). The Application could integrate with third party VoIP and Audio Apps through an Application Programming Interface (API), Software Development Kit (SDK), or other means. Apps with a lesser degree of integration would rely on communication through the operating system, which may have limitations in terms of information that can be shared between The Application and 3rd party apps. These limitations are depicted through arrows pointing in one direction only, suggesting that only one application can communicate fully with the Operating System at any given time. Depending on the limitations of the operating system, The Application may be able to control audio signals from third party applications without an intentional integration through API or SDK. Fewer limitations would simplify software architecture, and limitations are subject to change over time as operating systems evolve, especially mobile operating systems.

Figure 9B:
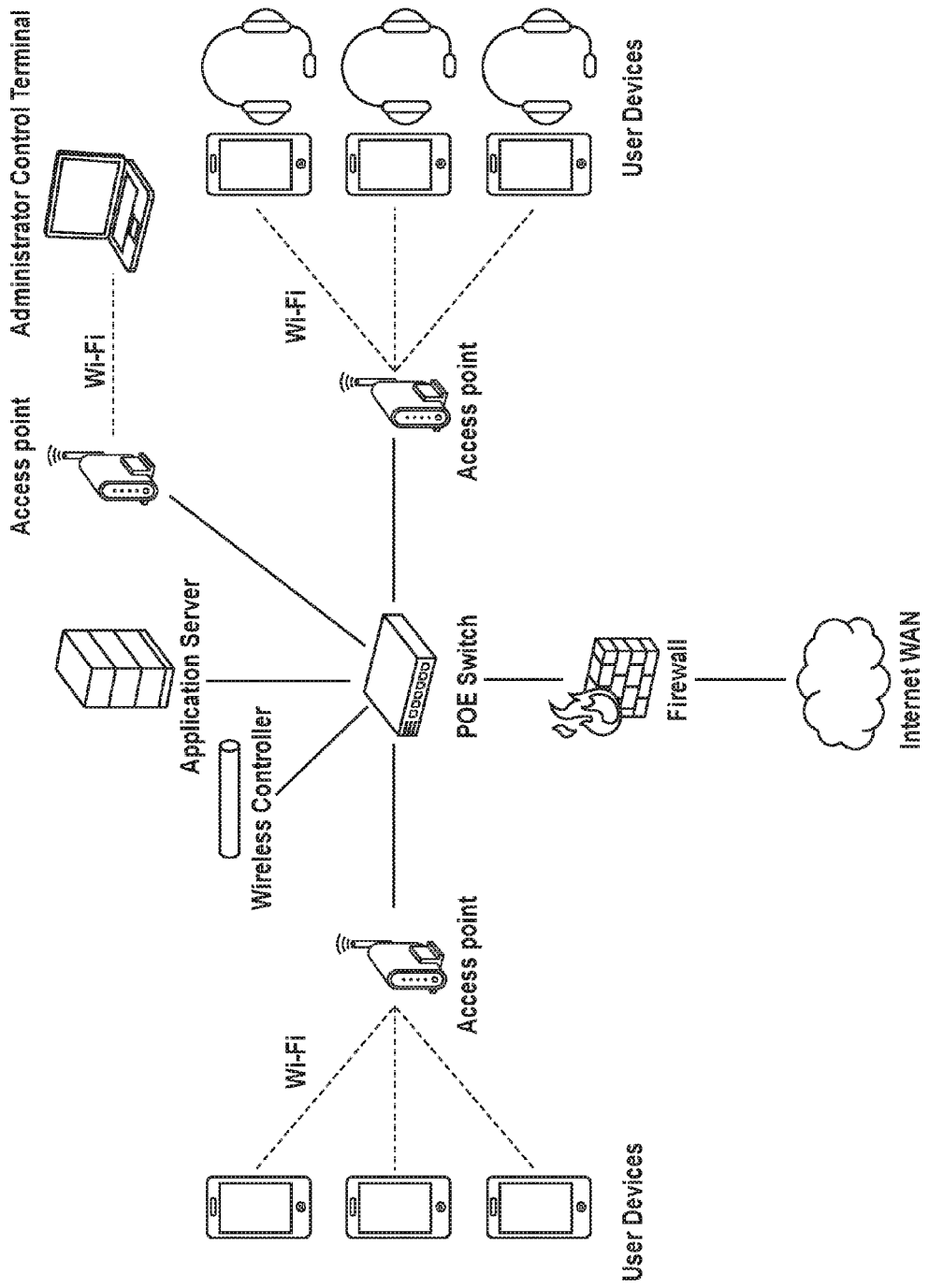
FIG. 9b illustrates an embodiment of the invention in which an application server is local, as in a commercial establishment.

FIG. 9b illustrates an embodiment of the invention in which an application server is local, as in a commercial establishment. A POE switch would control communication among various wireless access points that would serve the user devices via Wi-Fi. Connection to the internet may or may not be required depending on the features the commercial establishment administrator wanted to enable. The administrator control terminal could be used to manage various application features, including games and drink purchases, for example.

Figure 9C:
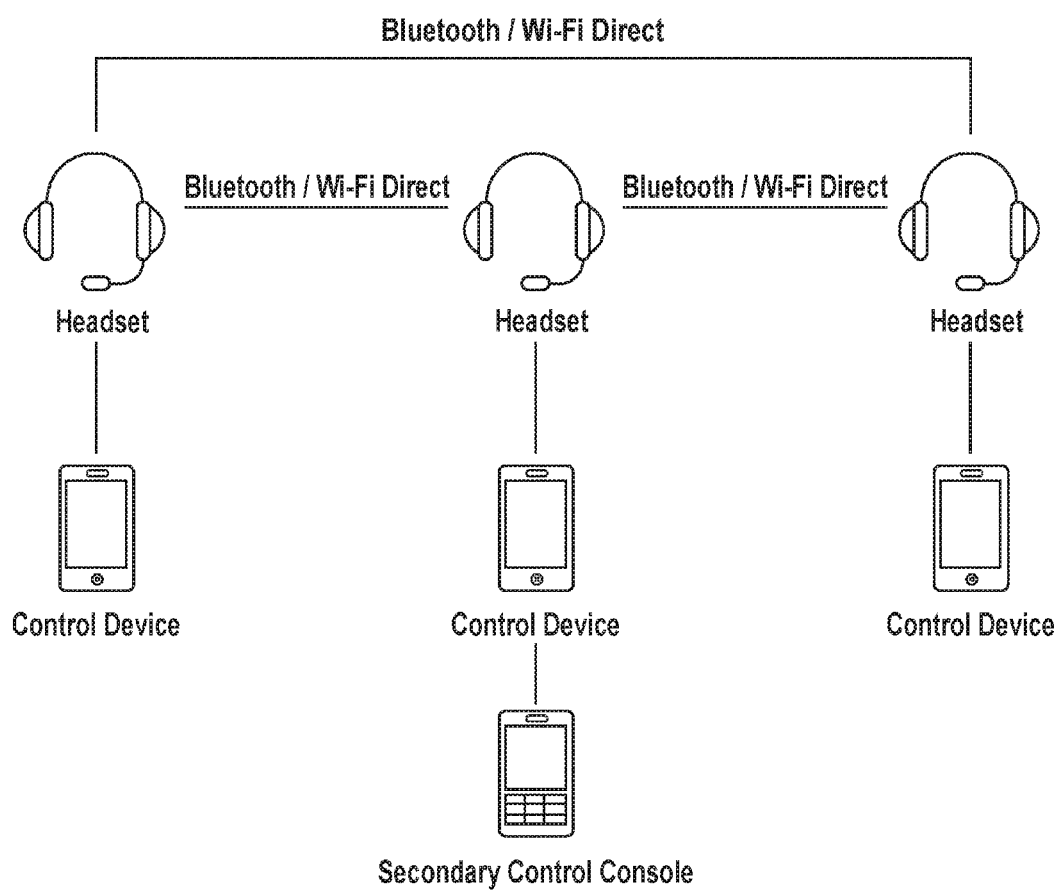
FIG. 9c illustrates an embodiment of the invention in which headsets are able to communicate directly.

FIG. 9c illustrates an embodiment of the invention in which headsets are able to communicate directly. The mixing of music and voice could be effected through hardware in the headsets, and communications may be established through proximity or other means. Control devices could be used to manage music, communications, or both, and connection to the headset could be wireless or wired. It would also be possible to connect a secondary control console, either through the control device or directly to the headsets. One use case of this embodiment might be motorcycle groups, where voice communication is transmitted directly between the headsets, which often have longer range than control devices such as cell phones. The secondary control console in this case might be the motorcycle's dashboard console. Bluetooth and other P2P communications enabled headsets might provide many more use cases for this, or a similar system architecture, based on increased range compared with architectures that transmit communications using the control device.

Figure 9D:
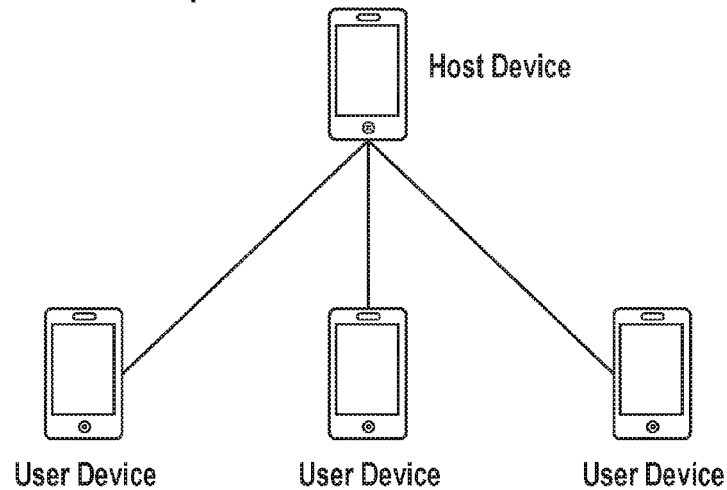
FIG. 9d illustrates an embodiment of the invention in which user devices communicate with one another in the absence of a router or any external equipment.
Figure 9D:
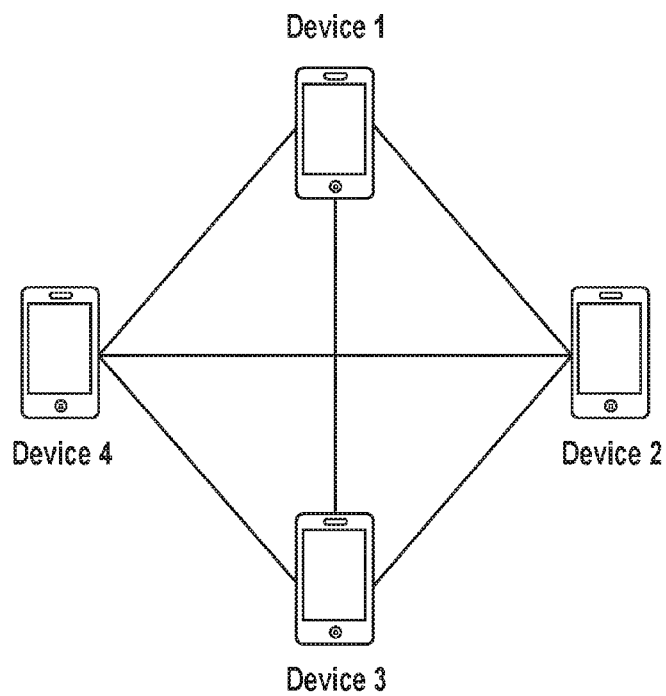

FIG. 9d illustrates an embodiment of the invention in which user devices communicate with one another in the absence of a router or any external equipment. In the client-server example, a host device is able to stream data such as music to client devices. In the Peer to Peer Example, devices communicate symmetrically with one another, as might be desirable for small group communications using Bluetooth or another wireless protocol. Combinations of architecture are also possible. For example, voice communication might use the P2P architecture, while music sharing and streaming may be achieved using the client-server architecture.

Figure 9E:
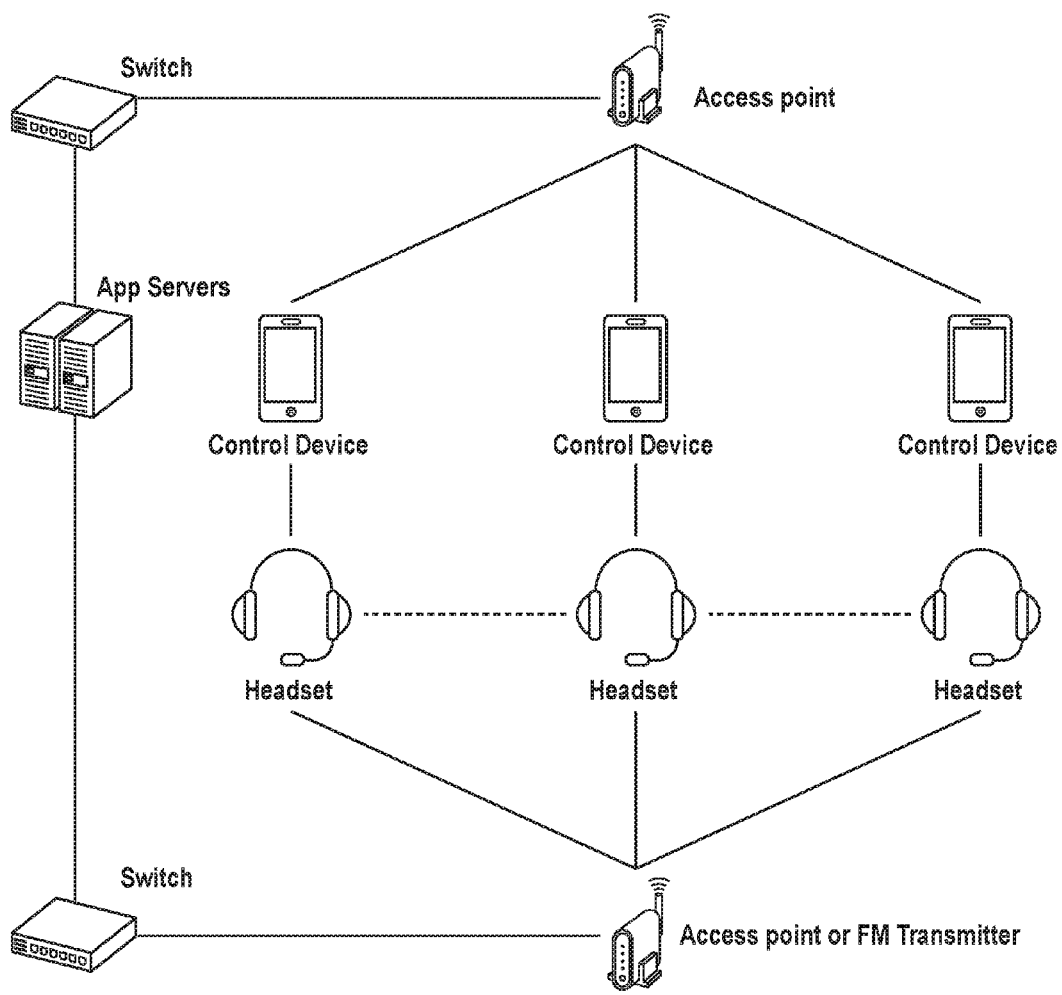
FIG. 9e depicts an embodiment of the system in which wireless access points are used to transmit different data separately to the control devices and the headsets.

FIG. 9e depicts an embodiment of the system in which wireless access points are used to transmit different data separately to the control devices and the headsets. A variant of this embodiment would be typical for commercial installations using a similar architecture with more devices. One access point, or set of access points, would communicate with control devices, such as smart phones. The control devices can communicate with both the headsets and the app servers, which indirectly allows the control devices to communicate with each other. Typically, communication between the control devices and the app server would be in both directions. The headsets could communicate in two directions with the app servers, but a more typical embodiment would be one way communication from a server (or another source) to the headphones, supplying music or another form of audio. The transmission of audio to the headsets would typically be FM or Wi-Fi based, but other communication modes are possible. Depending on the hardware and software built into the headsets, they could also potentially communicate directly with one another, as the figure shows. It might be the case, for example, that the headsets determine they are in close proximity and should thus establish a direct communication link from one headset to the other. This direct communication link could be Bluetooth based, Wi-Fi based, or any other mode of communication. The direct connection is not necessary, however, as communication could be established by indirectly (or directly) connecting the control devices to each other, and individually between each control device and headset. In this case voice communication would travel from one headset's microphone, through the switch and into another headset's headphones after passing through its control device. One benefit of direct communication between the headsets would be reduced latency, while another benefit would be reduced demand on the control device, and lower power consumption.

Figure 9F:
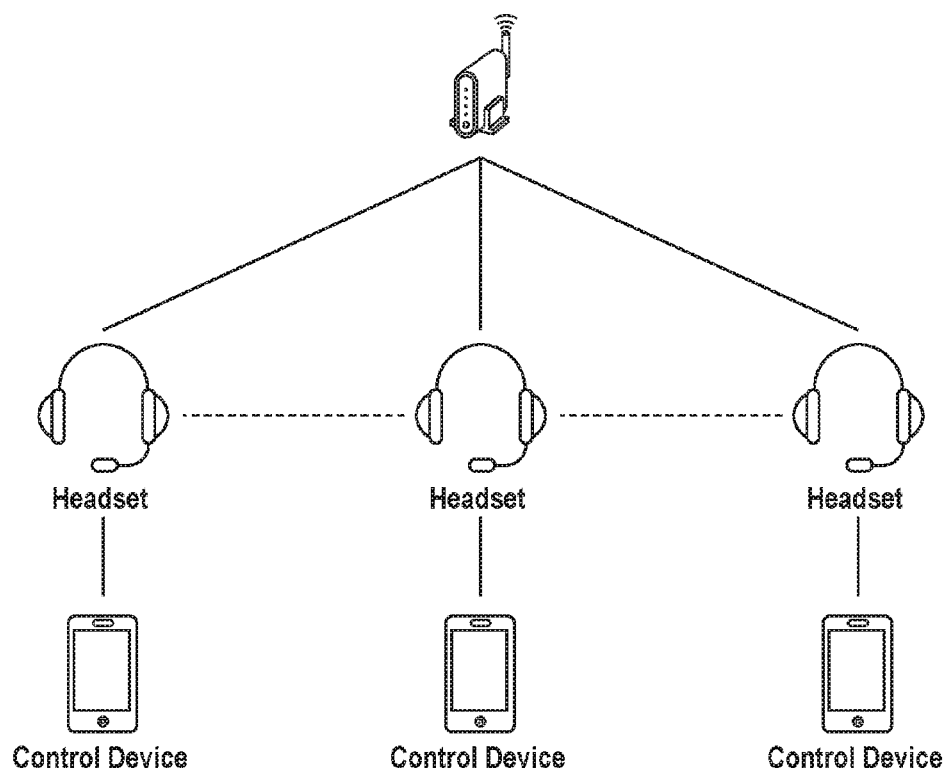
FIG. 9f illustrates an embodiment of the invention in which the control devices communicate with headsets (or other hardware devices) to reach the access point.

FIG. 9f illustrates an embodiment of the invention in which the control devices communicate with headsets (or other hardware devices) to reach the access point. This architecture might offer increased range, for example, compared with using communications hardware that may be more limited on the control devices. Music and communication signals may both be transmitted from headset to headset through the access point and a router or switch (not shown). The control device would only manage the communications in this embodiment, though in others the control devices could optionally communicate directly with other devices using onboard hardware.

Figure 10A:
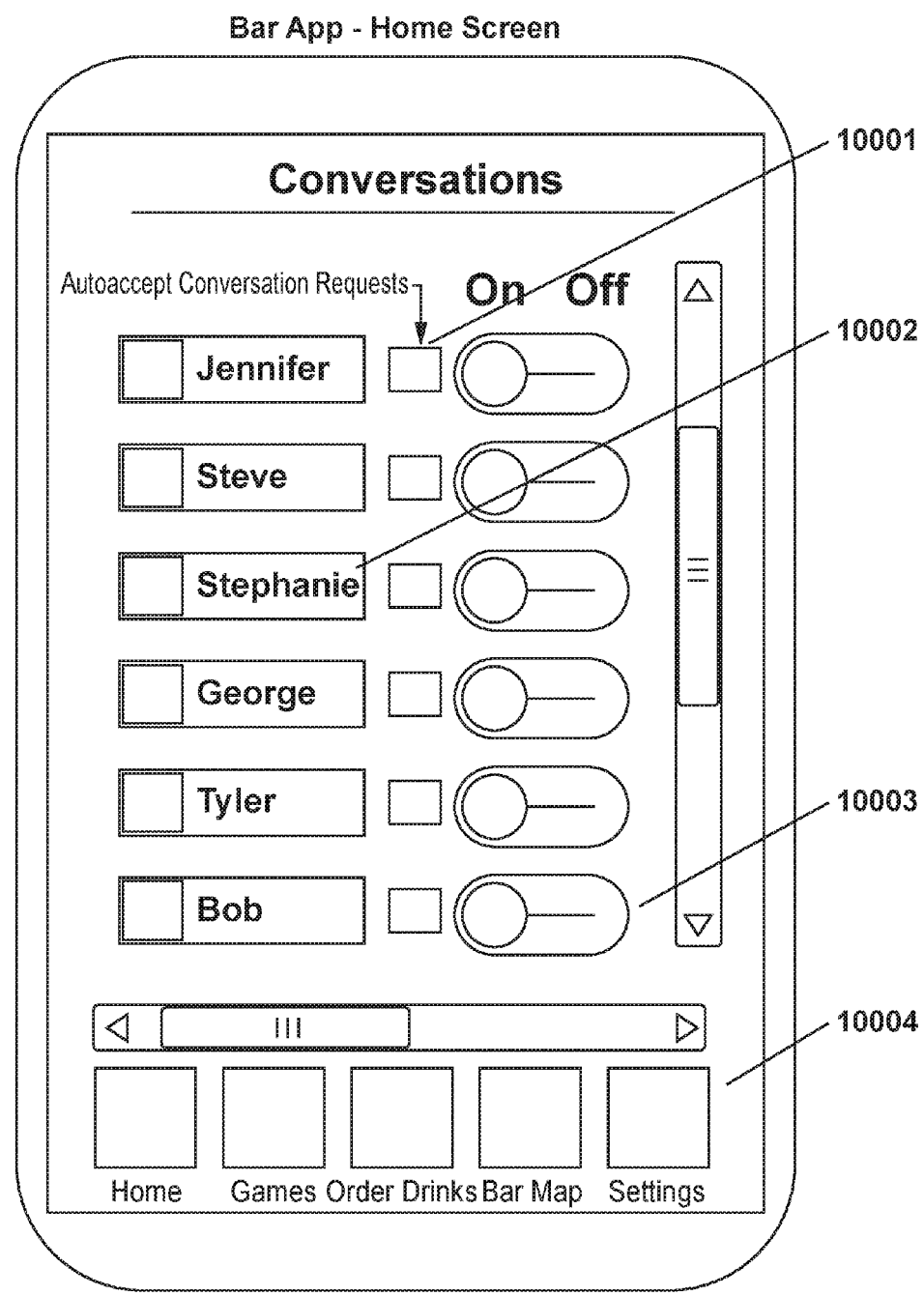
FIG. 10a illustrates a conversation management screen in which conversations have already been established with several other users in a public establishment.
Figure 10B:
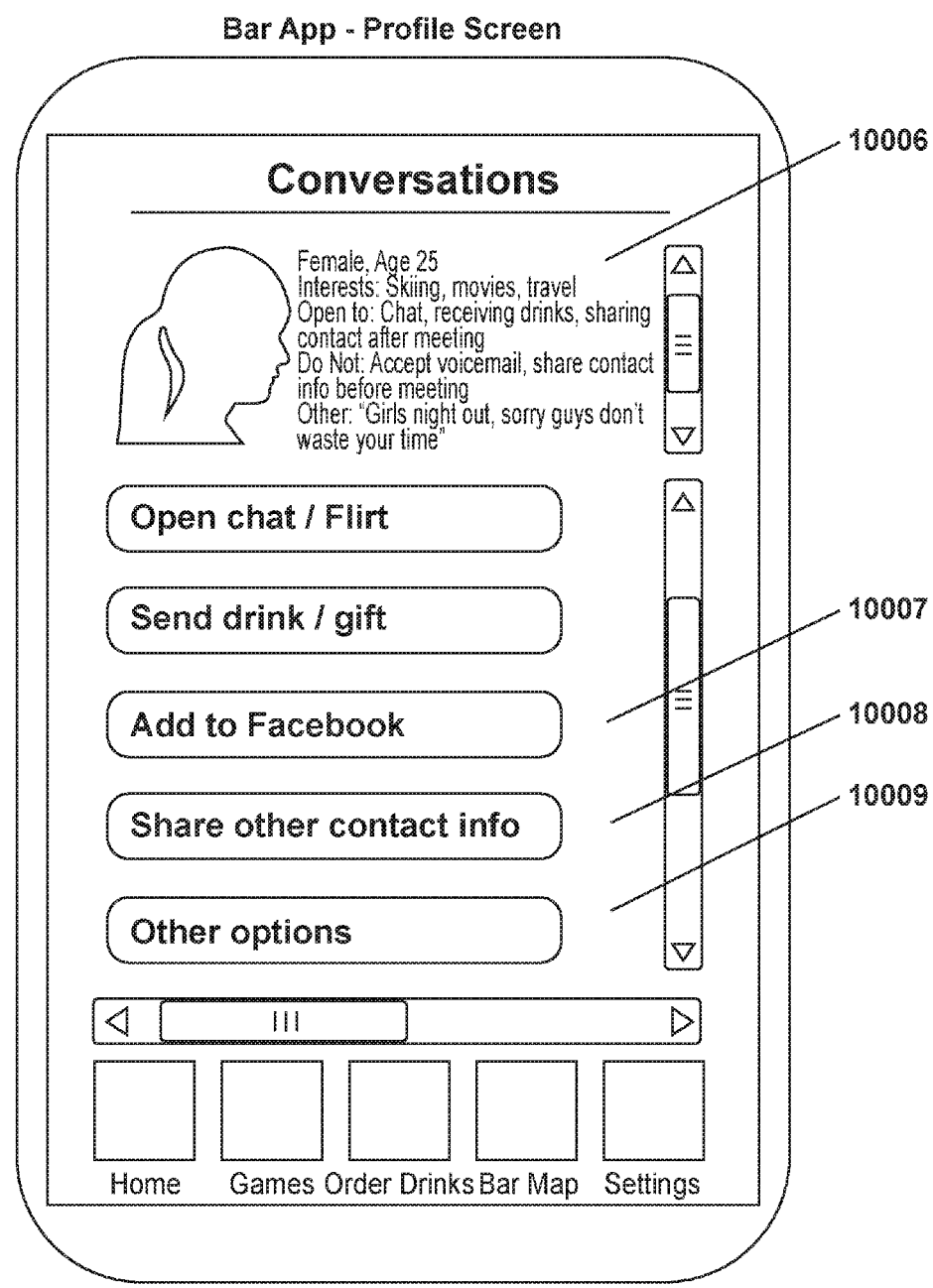
FIG. 10b illustrates a profile page that could be shared with those who have already established a connection in a public establishment.
Figure 10C:
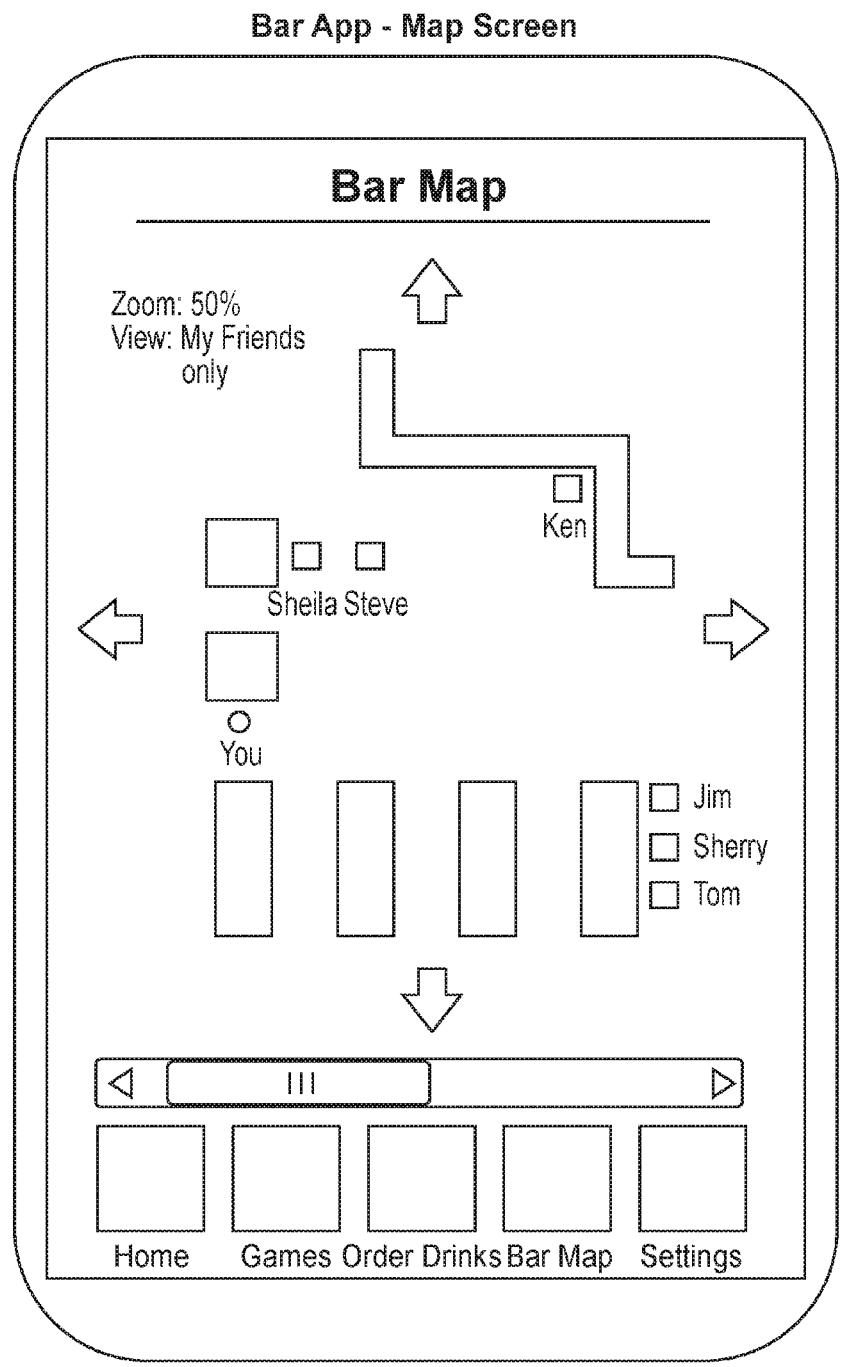
Figure 10D:
FIG. 10d depicts a games platform in which the event host might send a challenge to participants.
Figure 10E:
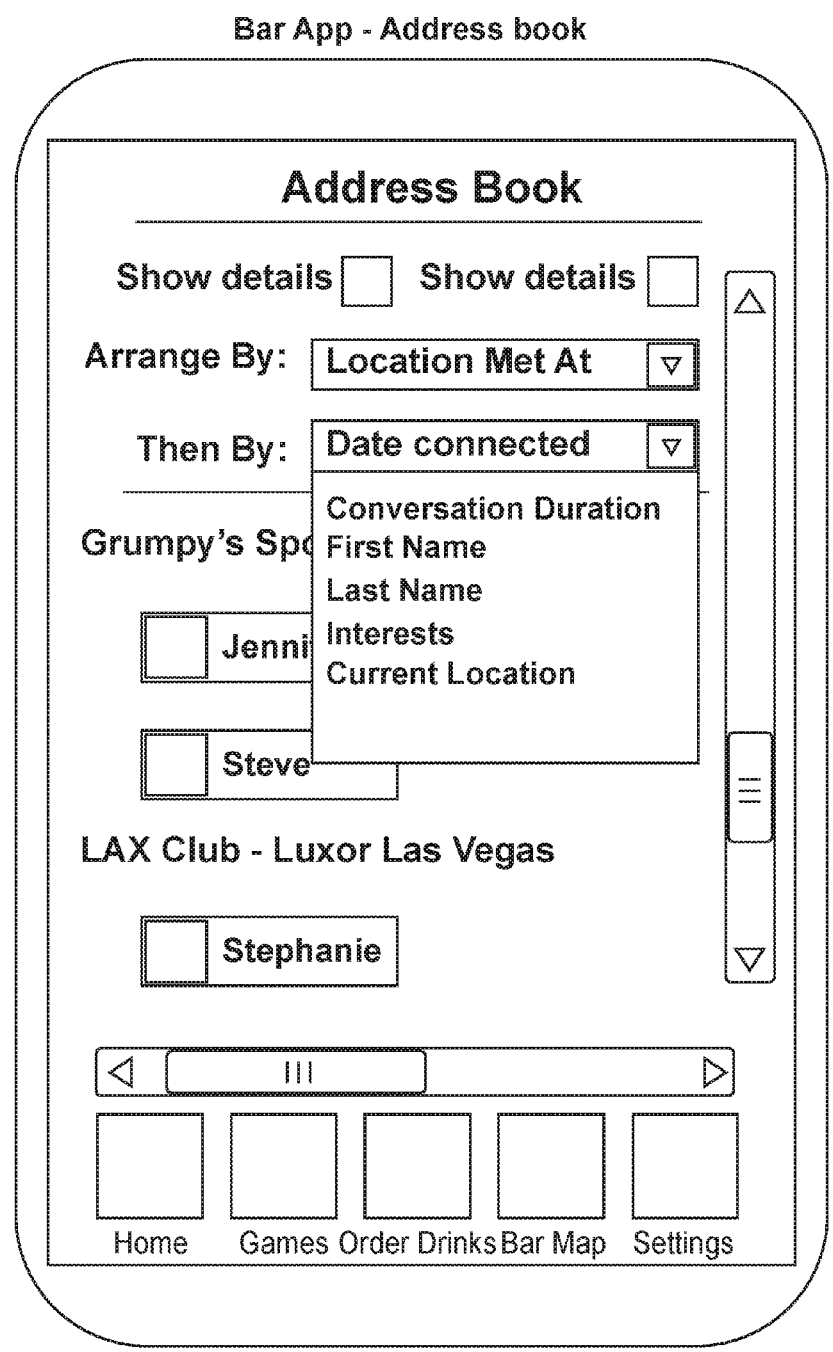
FIG. 10e depicts an address book that would be designed for keeping track of contacts met in a public establishment.
Figure 10F:
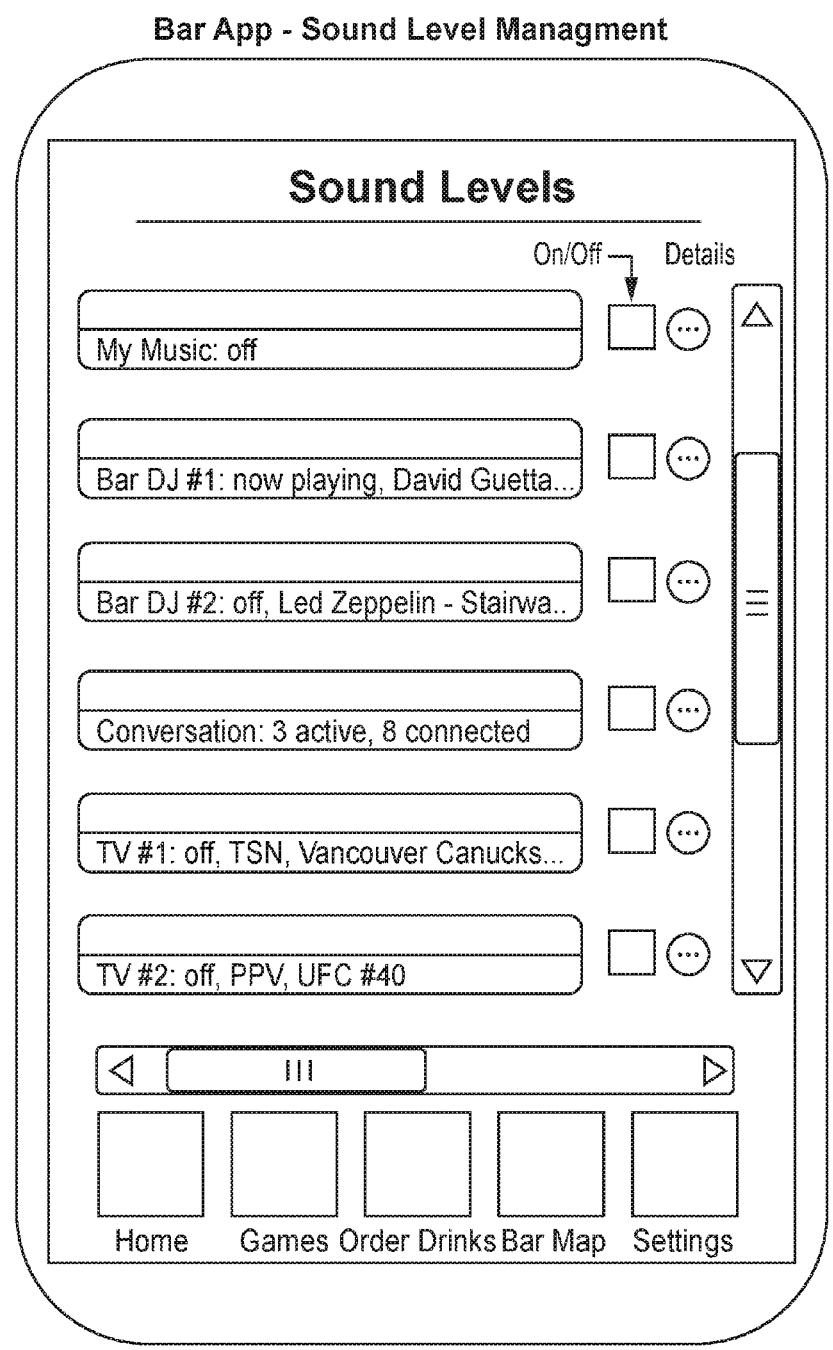
FIG. 10f depicts a sound level management interface for use at a sports bar.

FIGS. 10a through 10f depict a simplified graphical user interface (GUI) for one embodiment of the invention's software component; a mobile application designed as a stand-alone application for a bar. In this embodiment, music and/or television audio (audible media) would generally be streamed via FM to wireless headsets, and communications hardware included in the headsets would communicate with the users' mobile phones, enabling users to manage audio and conversation through the mobile app installed on their devices. Establishing a conversation in the first place could occur through any of the mechanisms described elsewhere, including NFC and other proximity events. FIG. 10a illustrates a conversation management screen in which conversations have already been established with several other users. The On/Off switch (10003) makes it easy to turn these conversations on and off at any time. When a user wishes to engage in a conversation with more than one person at a time, a group conversation would automatically request permissions from affected parties. The application would automatically create the connections required, and each group participant's list would show the On/Off switch set to On for all other group participants. The "Autoaccept Conversation Requests" option (10001) dictates whether incoming connection requests are answered automatically, or whether they must first be accepted intentionally. A basic profile for each user could be manually entered at the bar, and details shared with others. Accessing the profile page would be through a user name button (10006) on the Home Screen. This would provide a display as illustrated in FIG. 10b. Profile information would be shared with those who have already established a connection. A feature to connect profile information to Facebook (10007), or other social networks, might be included, as well as the option to share additional information (10008) such as phone numbers, email, etc. Other Options (10009) might be available or required for certain use cases. FIG. 10c illustrates a simple bar map, analogous to that already described in FIG. 6a. FIG. 10d depicts a games platform in which the event host might send a challenge to participants. FIG. 10e depicts an address book that would be designed for keeping track of contacts met in a public establishment. FIG. 10f depicts a sound level management interface for use at a sports bar.

Figure 11:
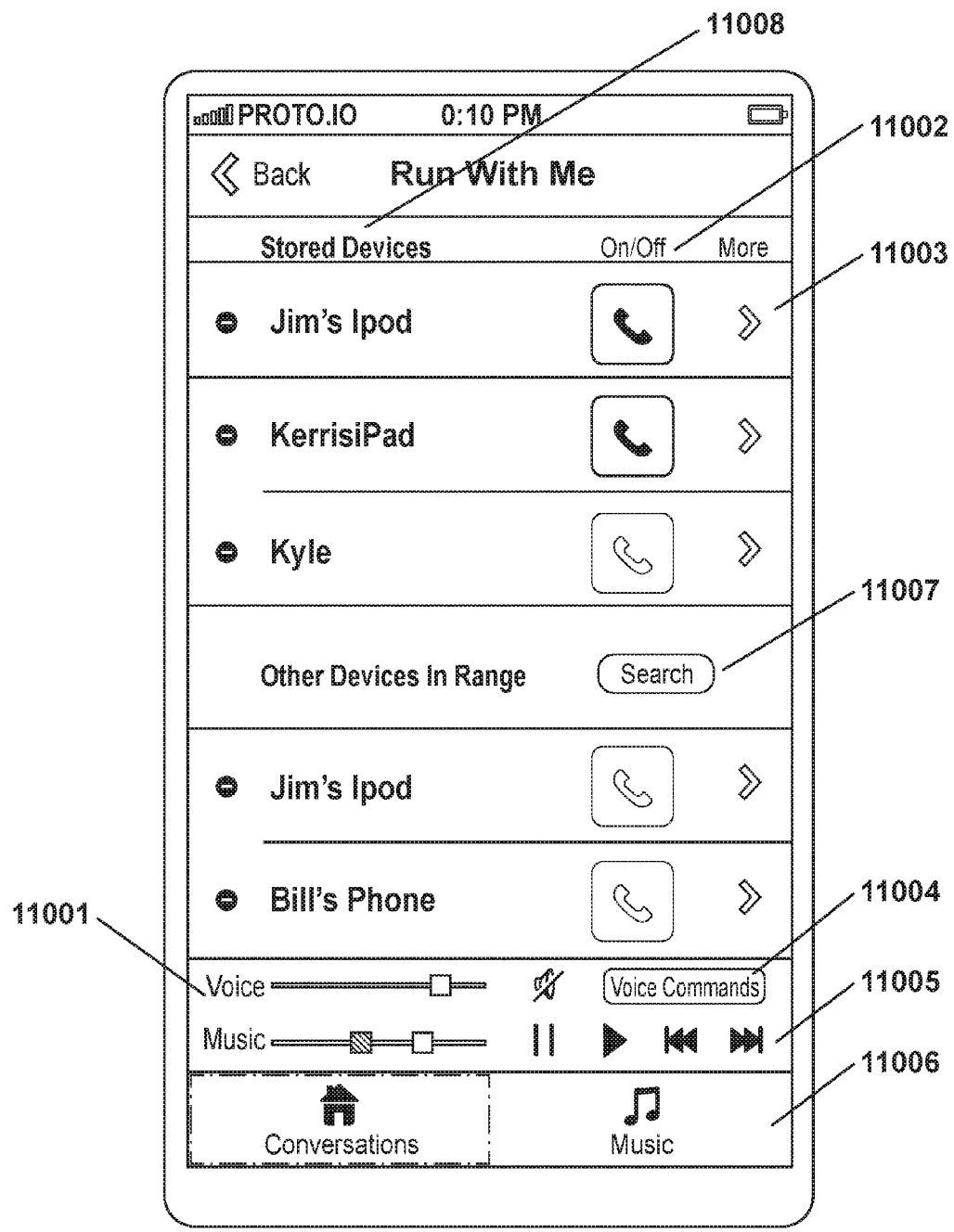
FIG. 11 illustrates a simple embodiment of the invention.

FIG. 11 illustrates a simple embodiment of the invention. It could be operable without external networking gear or an internet connection, and could use Bluetooth, Wi-Fi, or another wireless data communication protocol. Connecting and disconnecting friends within range could be done through the On/Off buttons (11002), and friends could be recalled from storage (11007) or searched (11008). Additional options such as music and file sharing could be made available through the more button, in addition to basic profile information and other features (11003). The relative volume slider would be readily available while in a conversation (11001). A mute button and voice command settings could also be readily accessed (11004). Basic music control would be available on the same screen as communication controls (11005), while additional music options and a music library would be also be easily accessible (11006). This embodiment would be especially useful for people who walk or run together, and would like to converse while still listening to music. As depicted, a voice connection can contain more than two people, and would generally be limited only by the quality of the devices and communications protocol used.

Figure 12:
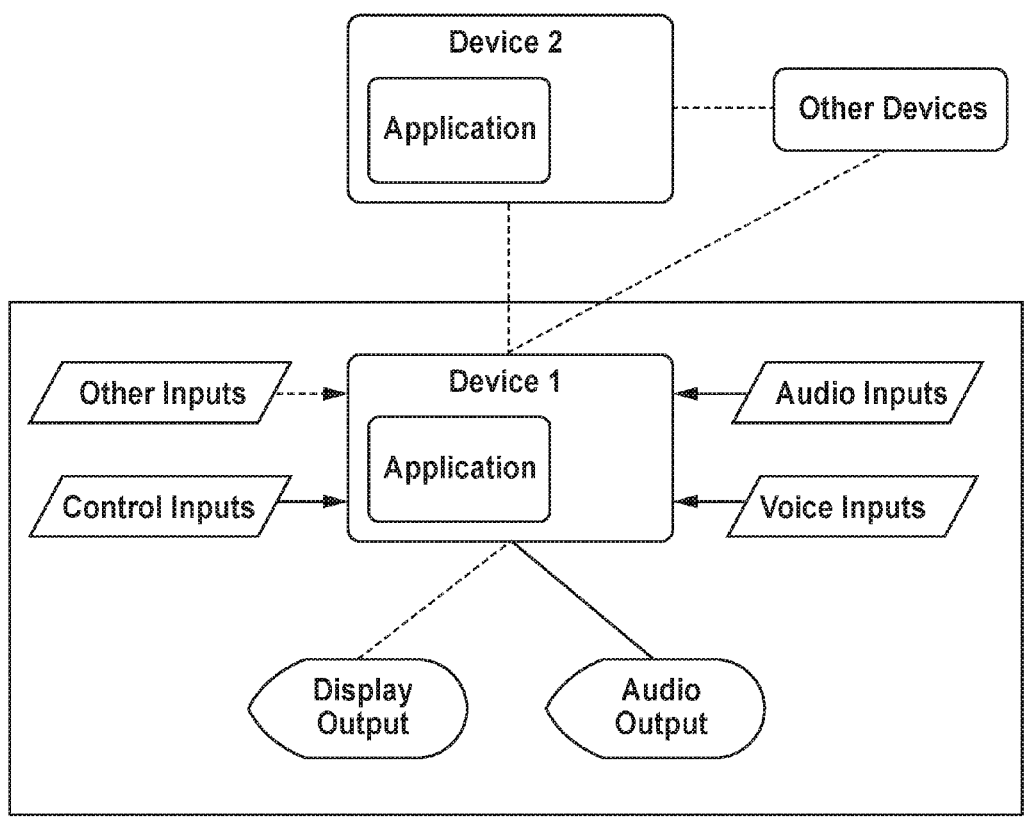
FIG. 12 illustrates a system schematic

FIG. 12 is a schematic depiction of a system architecture that may be utilized to implement the present invention. A first device is communicatively coupled to a second device, and optionally to additional devices. The coupling would typically be wireless, but could be wired, or a combination of wired and wireless connections. Each device contains an application with a set of instructions for controlling the various inputs. Each input could be a stand-alone device or part of the device itself, and could be hard coupled or wirelessly coupled. The control inputs may include keyboards, touchscreens, mice, buttons on headsets, wristbands, glasses, or other wearable devices, motion, location, and other sensors built into a phone, headset, or other device, as well as any other input to deliver a set of instructions to the application. The audio inputs may be received from wireless transmission including FM, Wi-Fi, 3G, 4G, Bluetooth, and other means, as well as hard coupled devices including the user's control device or other devices. Audio input signals may represent music, game audio, audio from television and movies, audio from other applications, and other audio sources. Voice Inputs may be received from wireless transmission including Wi-Fi, 3G, 4G, Bluetooth, and other means, as well as hard coupled devices. Voice inputs originate in a microphone that could be located on the control device, the output device, or any intermediate device. Other inputs are optional depending on the embodiment, and might include video signals or instructions from other applications. The output will generally contain an audio component played through headphones, loud speakers, or another audio output device. Display outputs are required for most embodiments, but may be avoided where control inputs can use buttons or other hardware without the need for a display screen. Display outputs, when used, may include mobile phone screens, tablet screens, televisions, computer monitors, and other displays.

Other embodiments, variants, features, uses and modes of operation are further described below. Whereas the detailed embodiments described above are particular to the reference illustrations, the embodiments, variants, features, uses, and modes of operation described below are organized into functional and use case specific categories to better illustrate that they can be utilized in different combinations and architectures depending on the purpose for using them. For clarity, reference may be made to illustrations, but these illustrations will represent only a single embodiment of the particular variant, feature, or mode being described.

Multiple, Unified Communication Modes

Push To Talk (PTT) mode: See FIG. 2a. Similar to a walkie talkie, using PTT sends one way voice messages. It can actually take on two sub-modes, 'live push to talk' and 'saved voice clip'. For example, pushing and holding can record a voice clip, while tapping can initiate 'live push to talk'. During 'live push to talk', one of two things can happen, depending on the friend's settings: 1) the communication will be sent directly to the friend's headset (or speakers); 2) the message will automatically record as a voice clip and go to an inbox. Users can change settings to be different for each friend to allow direct or indirect access.

The PTT indicators alert the sending party whether the message will be received directly or go to an inbox. PTT is an existing technology, and there are several methods of establishing connections between parties. To minimize latency in direct PTT mode, a two way connection could be left running and muting can be used to give an 'illusion' of walkie talkie mode. When all microphones are muted, the line is silent, and a minimal number of packets are exchanged to keep the connection alive. PTT mode could further comprise a Response Mode in which the application is able to determine when a user wishes to respond directly to an incoming voice message. For example, Response Mode would be activated when a Live Push To Talk message is received and the user has made a voice response within a prescribed time frame (i.e. Voice Activity Detection would listen for a voice response for 3 seconds, 5 seconds, or a user specified time). Response Mode could then be used to automatically initiate a duplex channel. Response mode could be activated intentionally through a specific command, as understood through Speech Recognition. Alternatively, it could be activated automatically, such that the user's first spoken words would be delivered to the recipient. In the event that a persistent connection was already established, Response Mode would simply unmute the Duplex connection and there would be no need to store the response before sending to the recipient.

Duplex mode: See FIG. 2a. Duplex mode is simple 2-way communications, where all parties can hear all other parties. This is ultimately equivalent to Skype, or other traditional VoIP communications. It is convenient, however, to have this option immediately adjacent to the PTT button. This allows the calling party to use PTT to test the status of the recipient, and switch to 2-way mode if appropriate. Too illustrate, imagine the following dialogue: "Hey buddy, you there?". If the friend answers "Yes", they could immediately jump into a 2-way call. If there is no answer, the sender would wait for a response and initiate 2-way mode at that time. Or alternatively the return message may be "Yeah just give me 5 minutes then we can talk". In any case, the adjacent pairing of PTT and Duplex helps to solve the problem of potentially interrupting the receiving party without limiting the conversation to a walkie talkie style dialogue. This mode works similarly with Groups, as seen in FIG. 2c.

Monitor Mode (listen to): See FIG. 2d. Monitor Mode is a form of one directional communication whereby a user monitors the voice of a friend (assuming the friend's settings allow for it). One example would be listening to a group leader. The leader is monitored by the followers, but the leader does not hear the conversations between the followers. This would be useful for use cases such as pub crawls, city tours, or group fitness instruction. Alternatively, it may be used in an office environment where a manager is monitoring his employees, or vice versa. This mode is essentially equivalent to wearing a headset with the microphone muted while monitoring a call or conference. The difference is that by basing the mode in software, different channels can be monitored simultaneously, and other channels can be active in two way mode. These channels would be activated through a purpose designed interface allowing the user to easily toggle between channels and modes See FIG. 7l.

Media Mode: See FIG. 2a and FIG. 7f. Media mode refers to the application's ability to detect when music or other media is playing, and to submit that information to the cloud. With this mode enabled, users can share the media they are listening to with others, make others aware of their status (e.g. make people aware that they are listening to music with their headphones on), and link their music to their status. For example, certain playlists may be linked to certain statuses or moods, and automatically played at certain times of day or during certain activities (e.g. Playlist 1 for "walking to work", Playlist 2 for "at the gym", Playlist 3 for "at work", etc.). Statuses could be tied to the planning feature such that statuses and music are updated automatically based on recurring events that the user can set up using the planner. Media mode can also be used in conjunction with the Media Cancellation feature for more accurate noise cancellation (see below).

Offline Mode: See FIG. 8c. Offline mode refers to the application's ability to function without an external Wi-Fi or cellular network. A P2P connection such as Bluetooth®, Zigbee® or equivalent may be used to enable communication at close range in remote areas without the use of external routers and other networking gear. The feature set would be reduced accordingly when operating in offline mode (i.e. the UI would hide parts of the application that require an external connection).

Interface Layout

Menu Bar: As depicted by way of example in FIG. 8a, the menu bar segments the application into related categories for easier navigation and provides a quick link between the segments. The application is designed to be modular, such that some segments or components of segments may come installed as part of the core application, while others can be downloaded as plug-ins. One version of the application has the following basic segments: Assistant, Connect, Media Player, Friends, and Settings.

Assistant Segment: contains tools providing useful data, such as a News Feed, Inbox and message history, planning tools, suggestions, and an audio store as shown by way of example in FIGS. 1a through 1i.
  Connect Segment: provides an interface for establishing and controlling communications. Communications can take on multiple modes, and can be between individuals or groups as shown by way of example in FIGS. 2a through 2h.
  Media Player Segment: provides an interface for playing and media that can be controlled by the application simultaneously with VoIP based communication. The media can be audio and video based, and will tie into existing applications where possible. This segment also provides an interface for media sharing. In some cases sharing will allow friends to listen to the same media source, or to synchronize it such that they are both listening to or watching the same thing, providing for a shared experience. A key aspect of this shared experience is that the users will be able to communicate through voice (and video) to share thoughts and feelings, something that is not currently possible on mobile devices, and something that is very difficult on PCs (requires multiple applications). The invention is designed to run persistent VoIP based communications while simultaneously mixing with audio from the media player as as shown by way of example in FIGS. 4a through 4e.
  Friends Segment: The friends segment organizes contacts and helps application users to find and connect with friends on other networks as shown by way of example in FIGS. 3a to 3e.
  My Settings Segment: The settings segment provides users with an interface for adjusting and controlling various elements of the application. Many of these settings are unavailable in other applications, as typically communications apps make assumptions about user behavior. This application challenges those assumptions and is designed for use cases in which those assumptions do not hold as shown by way of example in FIGS. 5a to 5d. For more information refer to Unique Settings and Controls below.

More Segment: As shown by way of example in FIG. 8a, clicking to activate the "more" option provides numerous other quick links. The ability to quickly toggle "Business Mode" is a key feature of the shortcut bar, allowing users to quickly toggle back and forth as necessary. Normally Business Mode will allow communications to be saved by the administrating company, so the user will want to switch it off if he also uses the phone for personal reasons. Bar plug-ins are key for people that use the app in "silent disco style" nightclubs (See Bars and Clubs below). Other specific plug-ins will be available to make the application work with other hardware and software.

Shortcut Bar: See FIG. 8b. The shortcut bar is a customizable quick link menu bar. It can be hidden by choice. It contains buttons to activate commands that will be needed commonly or in short notice. Some examples of features that can be included are:

Mute All Voice button: can be used to temporarily pause all voice connections when the user must speak to somebody nearby.

Relative Volume Slider: The relative volume slider controls the relative level of voice vs. background media. Further information is given below under Audio Control and Quality Features.

Inbox: The inbox button includes a badge indicating when indicating messages have been received. The single click access to incoming messages enhances user experience over the need to navigate through several buttons.

Pause Media: Pause media will allow the user to temporarily stop playback of other media to focus on communication if necessary. The shortcut makes sure it is available at quick notice.

More Button: Clicking the more button provides numerous other quick links. The ability to quickly toggle phone calls and the contacts list from any screen in the application enhances user experience. Quick access to "My Status" and "Available To" also encourages more updates of status and availability. The ability to add user-specified shortcuts also enhances user experience through personalization. Chat Heads will provide an easy way to toggle external programs. For example, users may wish to be able to easily switch back and forth between Spotify and the invention, allowing for media playback through Spotify and simultaneous communication in the invention. The Spotify chat head can be activated for a single click link to Spotify, and it can turn into a chat head to link back to the invention whenever Spotify is open.

Key Interface Features

Connect Screen: As depicted in FIG. 2a, the connect screen is designed to remove barriers to communication by providing multiple modes of communication and status & availability indicators all in one place. One aspect is the inclusion of PTT mode and Duplex mode buttons on a single screen, in line with friends' names and various indicators. The indicators provide information relevant to the calling party, helping to alert the caller as to whether now is an appropriate time to call the receiving party. The freeform status (e.g. "at work" or "writing my book") provides as much insight as the receiving party would like to provide. When Media Mode is enabled, the calling party can see whether the receiving party is listening to music, and whether that music is playing or paused, providing additional insight. The PTT Indicators and Duplex Indicators show whether the recipient can be reached directly (See PTT mode and Duplex Mode). The Status lights show whether the user is presently online or offline. An additional indicator that could be used is a 'last active' indicator, displaying the number of minutes since each friend was last active. The design of this screen and the inclusion of all of these elements together solve Customer Problems #1 and 6.

More Options: See FIG. 2b. By accessing the 'More' button on the Connect screens (See FIG. 2a) users will be able to access a number of other options for each friend, including the ability to adjust the microphone volume independently for each friend (See Audio Control and Quality Features for more details). Music sharing features and traditional communication modes including text and video calls can also be accessed from this screen. A unique feature is the 'Planner Widget' which provides a graphical display of the friend's availability, as set using the planner (see Planner feature).

Virtual Room: See FIG. 2e and FIG. 7k. The Virtual Room is a graphical representation of communication groups. Buttons are provided to toggle group wide communications, while individual user icons can be clicked in order to communicate individually. The user will be able to customize the layout and select groups and individuals to add to the room. The example shown in FIG. 7e is called Executive MBA. Everybody can hear the moderator, but the users can speak to one another without interrupting the remainder of the class. This would be useful for distance based learning, where all participants log into the virtual room through the internet. Similar rooms would be useful for office work groups and other team based groups, as well as groups of friends.

Planner: See FIGS. 1d, 1e, 1f, 2b, and FIGS. 7c and 7h. The planner is specifically designed to solve problems often encountered in electronic communications, as described below:

The planner can show who is available now, as well as who is available later. Existing communications systems do not offer this. Existing calendar applications are not tied into the same communications network, so they are less valuable and less user friendly. FIG. 2b provides a visual demonstration using the "Planner Widget", which will have different colors to indicate the party's availability (e.g. green=available to caller, red=busy, gray=not scheduled).

The planner recognizes that a user may want to be available to certain people but not others. By integrating this feature with the contacts list and groups, users can quickly make themselves available to friends, family, or other groups of their choice and design.

The planner recognizes that a user may wish to broadcast the user's availability for certain activities. That is, a user may wish to let people know that the user is willing to listen to music together from home. Alternatively, a user may wish to let people know that the user is available to go out and do something. This can be used in conjunction with the suggestions feature, which is designed for collaboration and planning outings.

The group search function (FIG. 7c) solves the problem of finding mutually agreeable times for multiple conversation/event participants. Normally participants manually share times they are available, often through chat or email. This feature provides automatic matching with different options available, including the ability to designate a minimum number of participants, a duration, and matching criteria (e.g. match only time that is specifically marked as available by the participants, or include times that are empty in the participants' calendars).

Suggestions: See FIGS. 1g, 1h, and 7j. People often need help coming up with ideas for entertainment. There are existing event planning applications that provide suggestions and coupons to help people decide what to do, but they do not provide for real time voice and video collaboration. Voice collaboration helps each person to stay hands free while they browse 'things to do', and not having to type back and forth increases efficiency. The increased efficiency will help to foster increased collaboration during review of suggestions and coupons, thereby increasing the effectiveness of each.

Live Streaming: See FIGS. 1g, 1h, and 7j. The suggestions feature will be leveraged to advertise live events to users, allowing them to collaborate in new ways while consuming live audio and video feeds. For example, a live music concert can be broadcast, but instead of needing to watch alone, or from a single laptop, users would be able to stream it to their own devices and maintain voice/video communications with one another. Users might choose to go hang out together at a park, each wearing headphones and streaming from his or her own device, communicating during the show.

Public Rooms: See FIGS. 2f, 2g, 2h, and 7i. A public chat room (voice based chat) will be made available in the communications platform in order to further unify modes of electronic communication. Most internet based chat rooms are text based. Public, voice based chat rooms are not yet available outside of gaming applications.

Audio Store: See FIGS. 1i, 7b. The purpose of the audio store is to include a targeted marketplace for users of the invention. Users are generally expected to be headphones users and/or audiophiles. The audio store will provide a list of carefully selected hardware and software that is expected to be beneficial for users of the invention. Featured items will provide descriptions on how the item can be used with the invention, helping to drive item sales and further engagement with the invention.

Voice Over Clip: See FIG. 3c. The voice over clip allows the user to transmit a clip including both voice and background audio in a single click. For example, the user may be listening to a song, and wish to record 10 second clip including a voice over to send to a friend. By hitting the record button, the user would record simultaneously the background audio and voice signal coming through the microphone, superimposing the two audio signals into a single recorded audio clip. There are currently no known applications with this functionality on the market.

Flexible Channel Interface: A flexible channel interface is depicted in FIG. 7l.

Persistent Channels: Persistent channels are set up and configured by the application. The user will have the option to provide access to existing friends and groups.

Dynamic Channels: Dynamic channels provide more flexibility and can be connected to external sources. For example, the user may wish to invite friends through a web link that he publishes via email, Facebook, Twitter, or other sources. Non-users can join the conversation, entering and exiting as they please. Users have additional control over settings and can provide moderator permissions to external users. Dynamic channels can be automatically created when certain criteria are met. For example, friends could set up a dynamic channel to automatically connect them when they are both connected to the app at certain times of day.

Proximate Channels: Proximate channels are dynamic channels that are automatically established based on user proximity. Use cases could include silent disco events, flash mobs, or any other event where users would be listening to music and wish to speak while wearing headphones. The communication would automatically be established when the users came within a specified range (as determined by GPS or indoor positioning, for example). Communication could get louder as users get closer to one another. Used in combination with Spatial Audio and Distance Attenuation there are many unique use cases for proximate channels (see below).

Recording Buffer: A buffer can store messages for playback. Settings can be accessed to select the size (e.g. recording time) of the buffer and when it records (e.g. automatic when a channel is closed to incoming voice). Messages can also optionally be saved to the user's inbox.

Audio Control and Quality Features

Relative volume slider: See FIG. 8b. If we use a decibel scale to represent the relative volumes of music and voice, then a 3 dB difference represents roughly a 50% difference, while a 10 dB difference represents a 100% difference (i.e. 10 dB louder=twice as "loud", loosely speaking). For example, assume that full scale (or "maximum loudness") is represented by 0 dB. Testing will determine an appropriate, or comfortable ratio of voice vs. background music for this purpose. In film editing, −12 dBFS (decibels below full scale) for voice and −30 dBFS for background music is a common standard. Suppose it is determined that a default level of −12 dBFS and −22 dBFS is appropriate for live communication purposes, and that these levels were set as the default. Then, the two controls would function as follows:

The volume buttons on the phone would control the full scale, maintaining the voice to background ratio of −12 dBFS to −22 dBFS (could also be expressed as 2:1 or 200%).

The relative volume slider could be used to adjust the ratio. Sliding towards the "voice" end would expand the ratio (e.g. −12 dBFS to −30 dBFS) while sliding towards the "background" end would narrow the ratio (e.g. −12 dBFS to −15 dBFS).

"Auto Ducker": In conjunction with Voice Activity Detection, the auto duck feature would recognize when somebody is speaking and automatically duck the background audio (music or otherwise). Whereas the relative volume slider is utilized to set a comfortable ratio of voice volume to background volume that is constant, the auto duck feature would ultimately adjust this ratio automatically when voice is detected, keeping the voice level constant and reducing the background audio according to a user adjustable value. When the voice signal was no longer detected, background audio would resume to its previous level. The comfortable amount of fluctuation is a matter of personal preference. For some, too much ducking may "interrupt" the music, and be annoying. Others may find conversation difficult with too little ducking. For this reason, the amount of ducking is provided as an option to the user (See FIG. 5b, "When voice detected in two way calls"). For simplicity, one embodiment of the auto ducking feature may be to override the relative volume slider completely, such that the voice level automatically adjusts to the current level of background audio, while the background audio ducks by a user set percentage (or amount). Another embodiment may be to adapt the user interface so that the relative volume slider contains two controls: one setting the level of background audio without voice detection, and a level to which background audio ducks when voice is detected (See FIG. 8b, "Alternative Embodiment of Relative Volume Slider"). In specific embodiment of the auto ducker, selective ducking would be used. Selective ducking would generally determine a voice frequency range to be ducked, based on the frequency range of incoming voice signals. This frequency range could be specific to the sending party's voice, or it could be a range that covers most human speech. A combination of high pass and low pass filters would be applied to the music signal, wherein the appropriate filters to be used could be based on presets, a user specified range, or determined from the voice signal that the ducking is intended to make more audible. Amplifying the voice signal within that range could potentially provide further conversation clarity. The low and high frequencies from the music would still be present during conversation. DJ's or other artists may also use the selective ducking mechanism for artistic purposes, similar to using equalizer controls but in this case the selected frequencies would be modified automatically, and in real time, based on either Voice Activity Detection or the detection of another signal.

Adjustable Speech Recognition Setting. In some embodiments, Speech Recognition will be used to better distinguish voice in the presence of noise, thus increasing the likelihood of detecting a voice signal when desirable. In these embodiments, the user would be able to train the application recognize his or her voice by reading a known passage. This would help to distinguish the user's voice from other background noise. The distinguished signal could be used to initiate ducking and to provide a set of further instructions for processing audio signals. For example, one embodiment of the feature may include a pre-recording phase, wherein the user would speak a known phrase in a setting that includes background noise. The feature may thus compare the signal received through the microphone to the signal expected in a quiet environment (as previously recorded) in order to roughly calculate the background noise signal. This background noise signal could thus be cancelled more precisely. This signal could be presumed constant or it could be updated periodically to a changing environment. For example, when the adjustable speech recognition setting is activated, a delay could be used on PTT messages such that the first 1000 ms (or another amount of time) would record only background noise, after which the user would be prompted to "Speak Now". The subsequent recording period would record both the user's voice signal and the background noise, but the background noise could be more accurately reduced given the noise signal's approximate form as determined during the initial delay. This feature could also be used in combination with duplex communications to enhance the accuracy of Voice Activity Detection. Improved accuracy would result in better voice signal quality and a higher probability of correct voice detection for the purpose of initiating the auto duck feature. Another possible refinement would be achieved in combination with selective ducking, whereby only a certain frequency band would be ducked, and that frequency band would be dependent on Speech Recognition rather than manual settings or other simplified means. Speech Recognition could also be used in conjunction with text messaging and voice command features. There have been many recent developments in Speech Recognition, especially in digital signal processing techniques and in combination with specific hardware. The purpose of the Adjustable Speech Recognition Setting is to leverage existing digital signal processing methods and provisions with interface features specifically designed for PTT, Duplex, and other modes of communication described in the embodiments herein.

Media cancellation: See FIG. 7f. Traditional noise cancellation techniques depend on complicated digital signal processing in order to determine what is background noise and what is the desired signal. These techniques assume that the pattern of the noise is unknown, and must be determined and distinguished from the desired signal. But in some cases the "noise" signal may be known. For example, if the noise is music coming through speakers and leaking into a microphone, the approximate noise signal can be predicted/estimated from the music signal that is being fed to the speakers. The opposite signal could then be superimposed at the microphone in order to cancel it (the time offset could be compensated for by a pre-set delay or by comparing the predicted to the actual noise signal). To illustrate this concept, imagine a smart phone is being used to play music through a car's speaker system via a Bluetooth connection (or a cord). The phone is thus aware of the music signal being sent to the car's speakers. Now suppose that a Voice Over IP connection is also running simultaneously, such that the person driving the car can be listening to music and talking to whoever is connected at the same time. The music playing out loud in the car could be cancelled at the microphone with great precision because the approximate noise signal is already known to the phone in advance. This methodology would enable voice communication simultaneously with background music or other media (like movie & game sounds) even when loudspeakers are used. This feature could be enabled when media mode is on and headphones are not plugged in.

Individual Volume Control: See FIG. 2b. The Individual volume control can regulate the volume of each friend's microphone separately. It will normally be set to an intelligent default level, but there are several purposes for including this functionality. Generally the application will be designed to auto-regulate the volume of each user's voice such that each person sounds similar, but in some cases volume regulation may not function as intended due to differences in hardware configuration, surrounding noise, and other variable conditions. A manual adjustment can correct these errors. Another way the individual volume control may be used is to establish different volume levels for each friend when multiple connections are running simultaneously. For example, a group of four motorcycle riders may consist of two pairs of riders: Rider A primarily wishes to speak with Rider B, and Rider C primarily with Rider D. But all four would like to remain connected. Rider A and Rider B could set the volumes of Rider C and Rider D relatively lower than their own, and vice versa. Riders C and D could still communicate with A and B assuming they are not mid-conversation. But if all four riders were conversing simultaneously, Riders A and B would hear mostly each other, and likewise for Riders C and D. Proximity and distance attenuation could also be used to effect this volume control automatically (See below).

Unique Settings and Controls

General Settings: See FIG. 5a and FIG. 7f. These settings allow users to set how incoming messages and call requests are handled for different communication modes and friends. For example:

When using Walkie Talkie Mode (PTT), the first incoming voice message can be received directly or be diverted to an inbox, and this setting can be different for each friend. There will be a similar setting for voice message responses (a response can be considered using PTT to reply within a certain amount of time, like 5 seconds, for example).

In 2-way mode, incoming calls can be automatically established (Direct) or answered in the traditional way. Silence suppression can be used whenever data consumption matters, but the user may wish to turn it off in order to avoid malfunction due to background noise interference, or to maintain a certain level of "comfort noise", for example.

Media mode will have several options. Users can share what they are listening to (i.e. make what they are listening to visible to others); tie music playlists to status updates (e.g. "At The Gym" status is connected to "Gym Playlist"); and apply Media cancellation (See Audio Control and Quality Features).

Sound Settings: See FIG. 5b and FIG. 7a. The application provides an option to reduce background audio according to user preferences, depending on the event type. For certain external events, it may be desirable to duck background audio, such as during a call from an external phone line. Because external callers are not using the invention, it may be desirable to treat the call in the traditional way, where one party is always speaking, and the connection is terminated when the discussion is finished. These types of discussions may deserve more full attention than the spontaneous conversations that are envisioned between users of the invention. Options are also provided for managing audio during events using this technology, as preferences may vary among users. FIG. 7a shows that additional audio management options will be available, including the ability to make specific apps louder and quieter. The "automatically detect and manage voice" option is a feature envisioned for managing voice audio in external applications. For example, a user may be playing music, and turn on a You Tube instructional video, but not be able to hear the voice over his music. Rather than having to manually adjust the You Tube and music volumes, this feature would recognize the human voice in You Tube, and amplify the voice signal to the same level as other VoIP signals for better clarity. This adjustment would make sense as long as the You Tube video was not a music video, which could be detected by analyzing other background sounds from the video.

Privacy Settings: FIG. 5c shows that standard privacy settings are available in the application. Additional settings will be dependent on which plug-in features are installed to the application (e.g. more settings will be available for people who install nightclub plug-ins).

Voice Navigation: FIG. 5d shows that voice navigation will be provided for in the application. It is intended that users will train the application to listen for their specific voice, and for specific commands. This will permit reliable hands free operation, which is especially important for use cases such as motorcycling and skiing, for example. The user will be able to access a list of commands and attach his/her voice print (e.g. "Connect Jim", "Initiate 2-way, "End Call"). To help the application distinguish voice commands from conversation, different methods can be used, depending on the hardware available.

A button could be pushed to initiate "Voice Command mode".

Alternatively, if the microphone were set to listen for voice commands, the user could activate Voice Command mode through a command such as "Listen Up". This would require a processing delay resulting in additional latency during conversation, but this would likely be acceptable in the context of initiating a conversation after a period of silence (e.g. if nobody has been speaking for 10 seconds, an extra 200 ms delay won't matter). For ongoing 2-way conversations, the microphone would not be listening for the "Listen Up" command until after a certain duration of silence, such as 5 seconds. See Other Technologies for more information on detecting silence.

Other Technologies

Voice Activity Detection: Voice Activity Detection (VAD) is a known speech processing technique in which the absence or presence of human speech is detected. In the case of the present invention, it is used both for initiating silence suppression and to assist in the detection of background noise in order to enhance call quality. Some embodiments of the invention will make use of an adjustable Voice Activity Detection threshold. This could be implemented by way of intentionally providing a delay at the beginning of a PTT message to measure background noise. For example, when the VAD setting is activated, a delay could be used on PTT messages such that the first 1000 ms (or another amount of time) would record only background noise, after which the user would be prompted to "Speak Now". This sample of background noise is thus used to set or change the VAD threshold. Alternatively, the VAD threshold can be manually controlled via a user interface element such as a slider or numerical input. Likewise, automated methods could be used in order to periodically sample the background noise through the periodic activation and recording of the microphone. The sampling rate could be determined by a user specified input, or it could detect changes in environment through ancillary hardware such as GPS. The VAD threshold could thus be updated periodically, independent of whether a user was actively involved in a voice conversation or otherwise actively using an application.

Silence suppression: Silence suppression refers to the known process of not transmitting information over a communications network when a party to the conversation is not speaking, thereby reducing bandwidth usage. It is a specific focus of the invention because the invention is designed to encourage users to stay connected for long periods of time while they are busy doing other things (such as listening to music or watching a movie). This means that for much of the duration of a 'call', users will be connected while nobody is speaking. Hence, minimizing bandwidth usage is important, especially when users are on a mobile network in which data consumption can be expensive. It is also an important feature that would enable a large number of users to stay connected in a business network, for example, without worrying about drawing too much bandwidth. Silence suppression can also be used to detect whether individuals are engaged in a real time conversation, having implications for how voice signals ought to be handled. For example, it may make sense to minimize latency during real time conversation, but to introduce latency after a period of silence in order to provide room for additional processing (e.g. listening for voice commands). To effectively utilize the embodiments envisioned herein, silence suppression would normally need to reduce the average bit rate during silence by more than 75% and in many cases by more than 90%.

Spatial Audio: Spatial audio refers the application's ability to detect the location of other parties or audio sources, and to process the incoming signals from those sources differently depending on where they are. It would generally be used in conjunction with 3D sound and/or distance attenuation to provide the user with a sense of where the sound is coming from, though other embodiments of spatial audio are possible.

3D sound: 3D sound refers to the practice of transmitting sounds from different virtual locations through the use of multiple speakers or headphones. For example, voices coming from the right can be made louder in the right ear of the headphones, and relatively even when the speaker is in front or behind. This can be changed in real time as the speaker (or other sound source) moves relative to the user. It is a known technology that is widely used in gaming, but there are few "real world" applications of this technology at present. The technology helps to change this by enabling headphone based communications in flash mobs, silent discos, nightclubs, tours, running groups, and many other use cases. Spatial sound and 3D audio could also be used with loudspeakers. For example, people might run the application through their car speakers and communicate with other vehicles in close proximity, with sounds relatively louder in the appropriate speakers depending on the location of other vehicles.

Distance Attenuation: Distance attenuation refers to the ability of the application to adjust the volume (or other facets of signal intensity) of incoming audio signals based on the proximity of the source. For example, if another user is nearby, the sound of his or her voice would be louder. This could be used in conjunction with proximate channels. It could be further leveraged through use with special hardware. Accurate GPS or indoor positioning would provide the ability to make communication through headphones lifelike. Communication would be automatically established when two users are close, reaching a comfortable level when they are very near one another, while other conversations would be attenuated according to the relative distance of the speakers. This would be very useful in the context of gatherings in which headphones are used, such as flash mobs and silent discos. Many more use cases open up as a result of enabling communication simultaneously with music, including tours, house parties and most other consumer, enterprise, and commercial use cases discussed below.

Consumer and Enterprise Use Case Examples

General Considerations

Consumer and Enterprise users could use the application through existing networks on any modern smart phone, mobile device, or computer. These networks would include Wi-Fi, 3G, 4G, and other networks, while additional P2P networks such as Bluetooth and ZigBee could be used in Offline Mode. This simplicity and exclusive need of software generally distinguishes consumer and enterprise use cases (described here) from use cases requiring special hardware, as would generally be the case for commercial applications (described later).

Team Work and Group Studying

Many people listen to headphones while working or studying. In some cases they may wish to be connected to others, such as when they are working in a team. Maintaining a voice connection while working would allow team members to ask spontaneous questions of one another. Normally these types of spontaneous questions would only be asked when the team was working together at a table in a shared workroom. Spontaneous discussions may also occur when teams are working on the same floor of an office, or in the same building, but at a diminished rate. When teams are working in different offices, normally the only recourse is a phone call. Voxer provides Push To Talk services to business to help address this problem, but it still requires users to pick up their phone, open the application, and navigate to the correct page to connect using Walkie Talkie messages. In some instances, teams may wish to work more closely with one another by maintaining voice connections for hours at a time. This would be particularly useful for people that already wear headphones, as it is a minimal alteration to their existing behavior. They would simply work while listening to music, and speak out to their team mates when they had something to discuss. This avoids the need to remove the headphones and visit the person or call them using a phone. This would work equally within an office or in different offices. Over time, it is possible that people who do not listen to music at work would join their coworkers' network by purchasing a wireless Bluetooth headset to stay connected, as many professionals do already. In conjunction with noise cancelling native to the headsets, Voice Activity Detection and Silence Suppression would be used to ensure that receiving parties do not hear ambient noise such as breathing, typing, or other background disturbances. The "Virtual Room" and "Planner" features would be particularly useful for team work use cases.

Walking or Running in Groups and Other Sports or Activities

Group sports and activities are a great application of the technology. The following examples illustrate how the app might be used:

Group runs/bike rides: People like to listen to music when running/biking, but when doing so in a group they generally need to do one of a few things: keep their music volume low, adjust the volume frequently, or remove the ear piece to talk. Furthermore, runners often tend to spread apart over time, making conversation difficult. The invention can connect people by Bluetooth when they are in close range, or via 3G/4G to help people connect over unlimited distances. Other applications are attempting to connect runners in different parts of the world by allowing them to "run with" or "compete with" one another, but any form of communication among the runners is still text based. The ability to communicate via voice while still listening to music enhances user experience significantly.

Group fitness: Imagine a group fitness class outside in a public space, or perhaps in an office lunch room. Normally these venues would be unavailable for a group fitness routine that required music (and most of them do). With people wearing headphones the music will not disturb others. This concept already exists without communication. With embodiments of the invention, the instructor can communicate with the class, and the class members can communicate with each other, without disturbing the music. This would be a significant improvement over alternatives.

Team sports: Envision playing a team sport that includes strategy, such as American football, ultimate frisbee, soccer, or rugby. Team members could remain paired, use proximity based communication, or a combination, allowing them to communicate over larger distances and more privately. For example, the quarterback would pair with receivers, who could change plans on the fly and communicate those plans back to the quarterback without alerting the opposing team. This could all be done while listening to motivational music. To be sure, this changes the nature of the sport, but it would be a fun application for an afternoon pick-up game in the park, for example.

House Parties and "Intercontinental Parties"

House parties could make great applications for this invention by reducing noise levels dramatically. Normally people need to talk over the music, and the music itself has deep base sounds which travel far and annoy neighbors. Another benefit of using the invention at a house party would be that people don't need to be in the same room to communicate. Friends could form groups and switch to different circles of conversation without moving—e.g. not leaving the living room to drop in on a conversation that's going on in the kitchen. This concept could extend all the way to an "intercontinental party". Because the invention can also function over the internet, friends on one side of the world could be listening to music and partying with friends in another part of the world. This concept also scales down to the individual level. For example, three friends in different cities may choose to connect and drink beer at home while remaining connected and listening to music from home.

Helmets: Motorcycle, Snowmobile, Ski, etc.

Bluetooth enabled helmets and accessories allow for communication among several riders (typically 3 to 4), but the connection is permanently coupled. The invention would allow users to connect and disconnect parties on the fly, meaning they don't always need to listen to all party members. Individual volume control would also help in this respect. The voice command features would add significant value by enabling hands free operation of the invention, allowing riders to keep their hands and eyes where they belong. Furthermore, the invention would extend connectivity beyond Bluetooth range because the riders' phones would often be connected to 3G or 4G networks. Bluetooth could be used to connect the earpiece to the phone, while the phone would control and send communications to the other riders, limited only by network connectivity. During a loss of network connectivity, the user could be prompted to reconnect using Bluetooth (or another P2P connection), or a connection could be established automatically.

Driving Applications

This would be a similar application to use with motorcycle groups. Sometimes friends do multi-car road trips but can't communicate effectively across cars. People could wear headsets or phones could be connected to the car's speakers through a two way audio cable, Bluetooth, or another method. Eventually this invention could be integrated directly with automobile hardware to appear as an application available in the car's dashboard. The "Media Cancellation" feature would be particularly useful while driving when music is playing. Beyond multi-car road trips, the technology could be used to help drivers communicate with one another. For example, truck drivers may use it to communicate with other nearby users in order to help them stay awake. Alternatively, some users may recognize when there are other users of the invention driving nearby, and request to establish communication between the cars for enjoyment. A particular embodiment may include a feature for drivers who are tired, and wish to communicate with others to stay awake. At any given time, many highway drivers are tired, and the feature may help to connect these drivers, improving both the safety and enjoyment of driving. Drivers might optionally use this feature to discover and share new music with other drivers.

Smartwear Integration

Emerging trends in wearable technology will open up additional opportunities. For example, Google Glass, smart watches, and other wearable technologies often including instrumentation such as gyroscopes, accelerometers, magnetometers (compass), light sensors, proximity sensors, bone conduction audio transducers, near field communication, and other hardware common in mobile devices. For example:

Bone conduction headphones would enable usage of the invention in situations where external noise is desirable (e.g. listening for oncoming traffic or emergency signals).

Gyroscopes would facilitate the initiation of communications when two users look at each other.

Light sensors could be used to enable communication only in the presence of light. People may choose to play with this feature at house parties, turning the lights on and off. Alternatively, silent disco event DJ's may light specific areas of a venue at different times throughout the show to encourage communication. Many other possibilities exist.

The GPS and compass could be used together to facilitate self guided tours, where users travel cities with their headphones on and listen to both music and narration from the travel application (or plug-in).

Many additional opportunities will open up when combining this system's audio technologies with other wearable tech.

Public Space Recreation (Park/Public Pool/Beach/etc.)

People often get together at parks and other public spaces and play music through a boom box. The experience remains social because they can converse over top of the music. There are plenty of public spaces in which people might like to listen to music without disturbing others, or where music would be banned entirely. But listening to headphones would destroy the social experience by making communication cumbersome. The present invention would get around this problem, enabling people to hang out in pools, parks, at beaches, and other public spaces; listening to music and conversing without disturbing others.

Recess, Lunch Break

Adolescents and teens often enjoy sharing music and are avid headphones users. They could use this invention while walking to school, at recess, on lunch break, or otherwise 'hanging out'. Music sharing features and the ability to listen to the same music simultaneously would augment this use case.

Pub Crawls/Group Tours

In New York there are pub crawls in which people wear wireless headphones and a tour leader transmits music to the headphones via FM signal. This is an adaptation of the silent disco concept, which is further described below under Commercial Adaptations of the Invention. These pub crawls can be further improved by enabling communication without the need for the participants to remove their headphones. City tours and other types of group tours can leverage this invention for the same purpose. Adding a layer of music without stifling communication would add an extra element of fun to many types of tour.

Remotely Watching Television, Movies, Live Events

Media could be enjoyed together through televisions, computers, mobile devices, or other devices. For example, family members in different cities may set a time to get together and watch a television show. They would connect the television show, as well as a persistent group voice connection, such that anybody could speak during the television show, as people often do in person. The media cancellation would be particularly useful so that the sound from the television show coming through loudspeakers could be cancelled before disturbing the other parties. It is envisioned that this would be achieved through an integrated application that controls both the media delivery (television show) and the voice connections. It is possible, however, that the audio output from the television or other device could be routed through a separate device controlling the VoIP and Media Cancellation. It is likely that in the latter case, a greater latency would be introduced to the voice communication as the audio signal to be cancelled (the TV show sounds) could not be predicted and processed ahead of time. In cases of increased integration with the media delivery, the delivery of video and audio could both be delayed intentionally by the same amount, providing a time buffer for Media Cancellation processing.

Commercial Adaptations of Invention

Overview

Commercial adaptations of the invention generally require specialized hardware and software features in addition to the core features of the application discussed above. For example, at venues with many people, reliable communications would be dependent on reliable networks with sufficient bandwidth and powerful access points. Indoor spaces might require indoor positioning systems (IPS). Public events would likely require handheld devices and headsets to be available for loan when their own devices are insufficient. For these reasons, commercial adaptations are considered separately from the embodiments discussed above which rely only on commonly available networks and hardware. Commercial adaptations will be further dependent on the use case in question. For illustrative purposes, a "silent disco style" adaptation is assumed in examples given below, and other potential adaptations are described subsequently. A description of silent disco and its relationship to the invention is given below, followed by examples of adaptations that could be used for "silent disco style" use cases.

Silent Disco Style Adaptations

A silent disco is essentially a disco where people dance to music played through wireless headphones instead of loudspeakers. An FM transmitter broadcasts music to wireless headphones which often have 2 or 3 channels allowing for users to choose among different broadcasts. There are many companies running silent disco events around the world, and ample background information is available on the internet. There have been numerous adaptations such as "mobile clubbing", "silent gigs", "silent theatre", and other "silent events" using headphones. The present invention seeks to enhance silent disco style events by supplementing them with communication enabled through the headsets in conjunction with the other audio sources.

At silent discos, people cannot communicate without taking their headsets off. It is likely that this problem is a partial limitation to the success of silent disco in becoming a more mainstream establishment in nightclubs and bars around the world because one of the key reasons people go to bars and clubs is to socialize. Music is usually an important component of nightclubs and bars, but often makes it difficult to communicate because of the need to speak over the music. A method for facilitating communication between people wearing headsets would likely help the silent disco concept to catch on and could help to popularize the concept of speaking while listening to music through headphones. In the context of bars and nightclubs, communication could be improved in several distinctive ways through the use of an improved silent disco concept:

Conversation Clarity: As mentioned above, speaking over music, other people, or other noise can be a source of frustration, impeding communications—especially between two people that have recently met and have yet to become accustomed with one another's accent, tone, and general way of speaking. A reduction of noise and the ability to regulate relative volume levels for music and voice channels could improve communications quality significantly.

Conversation Privacy: Communication could be restricted to two people such that bystanders could not hear what is being said between the two parties engaged in communication. For example, a man might approach a woman at a bar and initiate a conversation in which the woman's friend was not initially included, possibly decreasing the woman's self consciousness about her response. This might make the introduction easier on both parties.

Communication at distance:

Long range: By putting the headsets in wireless contact with one another, users could communicate from different parts of the establishment. This could make it easier to find friends who seem lost among the crowd, for example.

Close range: Not having to yell into someone's ear is clearly preferable. Visual communication would also be improved because the extra distance would enable communication through hand gestures, facial expressions, and other visual cues.

Ice-breakers: An improved silent disco concept could exploit the benefits that electronic devices offer in terms of potential to help 'break the ice' when meeting new people.

In the context of this invention, the issue of ice-breakers is primarily addressed through software features that are purpose-built for bars, nightclubs, and other public venues in which the event host would like to foster increased communication between strangers. The theory is discussed below under "Social Networking Bar Concept", while the specific mobile application features are described later in this document.

Social Networking Bar Concept

The idea behind using social media in a bar is that it would make the process of self-introduction more comfortable for many people. There are many people that are too shy to approach someone at a bar, usually for fear of being rejected, or because they don't have the time/confidence to think of a good opening line or follow-up. But put someone behind a computer screen, and their confidence to say what's on their mind improves substantially, as well as their ability to consider carefully what they are going to say. Many dating websites and online chat rooms have made use of these technological advantages, but a poor job has been done of enabling their use in a public setting. Normally people are at home, behind their computer screens when they have the confidence to talk to someone they have never met. Of course there are smart phone applications that have attempted to address this with 'location based social networking' (MeetMe, FaysMe, etc.), but inevitably one finds that there are just not enough people in the same vicinity, using the same mobile application to make it useful.

There needs to be a way of influencing people to use the same application to connect with others in their vicinity. The invention disclosed herein provides a solution to this problem. For this solution, all devices in the bar would be connected by running the same application on their respective devices through which users could communicate. This would be achieved by:
1. Encouraging users to download the appropriate mobile application (or plug-in to the mobile software) upon arrival.
2. Borrowing a device with this software from the bar if their phone is incompatible or dead.

Certain features of the application could be used outside of the bars as well. For example, contacts met in the bar could automatically be saved to the user's contacts list, or downloaded to a purpose built address book enabling contacts to be sorted using additional criteria (such as what bar they met at, date of meeting, age, interests, special user notes about the conversations, etc.). Certain games, coupons, points earned, and other features would be made available outside of the bar, while others would be exclusively available in the bar. Many of these games/features would be targeted at helping people to "break the ice".

There are many reasons that people do not physically meet following an online introduction, but most of those reasons are removed by placing the two subjects into a public setting where they are in close proximity. A thought experiment can help to illustrate the idea: Envision some men using a social media device to type a pickup line to a group of girls at a nearby table. Now envision the girls discussing a response. The following are a few of many possible responses, for illustrative purposes:
1. Not responding at all
2. Sending a message to the guys indicating their disinterest
3. Asking them to join their table for a drink.

In the case of response 3, the value is obvious, assuming that the men would not have made such an approach without the help of social media. In responses 1 and 2, the rejection from afar easy and unrecognizable to others nearby, so the guys would likely shrug it off and try again with another table, perhaps many times per night. If they were to eventually be successful, they would be interested in returning to the bar that afforded them the success. The value gained through the social media device is inversely proportional to the confidence of its user. Less confident users would derive the most value from ice-breaker features. The value of social media in facilitating introductions would help, along with other features of the invention, to drive repeat business for establishments offering such services. This technology helps people meet each other, improves communications and user experiences, and ultimately stimulates demand for the bar.

This technology may be applied to any other public establishment or commercial establishment where users may wish to communicate with each other.

Existing Alternatives

Some rudimentary social networking bar concepts have been attempted such the Inamo restaurant in London, UK. However, the Inamo application lacked any interactivity between users. The iBar in the Rio All-Suite Hotel in Las Vegas implemented a bar specific flirt application. iBar's biggest problems were:
1. The cost of retrofitting bars with expensive interactive tables. Users of this invention will have their own mobile devices, or loaners from the bar. In either case, the cost would be reduced.
2. Patrons of iBar noted that there was not a sufficient number of tables available. Users of this invention will all be able to use the flirting application simultaneously.
3. The use of the "Microsoft Surface" technology caused problems, allegedly due to software freezes caused by the processing of multiple threads of data, a difficulty encountered as a result of the "multiple touch" technology. The application described below does not process multiple threads of data simultaneously.

The problems above limited the success of the "social networking bar" concept at iBar.

Solution Using Adapted Invention

The commercial adaptation of this invention uses conventional single user technology (no multiple touch) because the UI will be controlled through individual mobile devices (e.g. a smart phone or another smart device is used by each person). This provides another key improvement over i-Bar: mobility. Additional hardware and software features will further augment the "social networking bar" concept. The overlap with the unified communications system described earlier lies largely in the software architecture that will enable users to listen to music and converse at the same time, though hardware adaptations are capable of achieving a similar function. Auxiliary features adapted for use in bars and nightclubs include games designed to encourage interaction with other patrons in the bar. If desired, people that meet in bars could remain connected in the system's network after leaving the bar.

Hardware Adaptations

Headsets

Commercial applications will in many cases need to supply the headphones. Traditional silent disco headphones have FM transmitters to receive the music broadcast signal. An adaptation that could be made for the present invention is adding a microphone for communications. The microphone could either communicate with a smartphone, or it could communicate with special hardware built into the headset. For example, if the headphones contain sensors for positioning (GPS or Indoor Positioning, for example), onboard communications hardware could enable users to communicate directly with one another based on their proximity. This would bypass the need for a phone altogether. The mixing of the voice and music could be done directly in the headphones. Superimposing the two signals through software would not even be necessary. For example, different leads could be soldered directly to the communications hardware and the headset speakers, such that the headset speakers would be receiving two (or more) signals: one from a cable connected to the FM transmitted audio, and one from a sound card that receives the microphone signal(s) from other user(s).

Smart Devices: Phones, Watches, Other Display Terminals

Smart devices containing the necessary software applications would in some cases be provided by the commercial establishment owner. For example, a bar may loan smart phones, smart watches, or it may provide fixed display terminals that are attached to or embedded in the tables, among other possibilities. Depending on the system chosen by the bar, some software features may be incompatible. For example, a smart watch screen may be too small to implement RFID based mapping of patrons within the bar, whereas certain games may need large screens installed at the tables. In many cases these devices would need to be shock proof, spill proof, and otherwise purpose built for public use. Anti-theft technology may also be required for certain commercial applications.

Network

A local Wi-Fi network is a likely embodiment of the technology in commercial establishments. Multiple access points would be required with power sufficient for the density of expected crowds. At a bar, for example, the local network would enable transmission of data between users' smart phones, and to the bar's ordering system and customer database as desired. The bar's POS terminal could function as a server which, in combination with an appropriate router, could organize and route the communications according to the software application's instructions. In other instances, a purpose built server may be required for reliable communications. In cases where the bar owner only cares to enable headset communication without data intensive features requiring a powerful Wi-Fi network, P2P connections could be employed. These P2P connections could be based in the users' own phones and a purpose built software application, or they could be based in specialized headset hardware as described above.

RFID Tags and NFC Devices on Phones or Wristband

The initiation of communication between users can occur in different ways. For example, when smart devices are "bumped" together, they could use a method similar to that originally employed by "Bump Technologies" (subsequently purchased by Google), assuming a license to do so. On the other hand, RFID tags or another form of NFC could be used in lieu of the bump mechanism. For example, bar patrons may be provided with RFID tags to stick onto their phones when entering. Each user would link the RFID tags to his or her device such that communications between devices could be initiated by RFID. Bluetooth Low Energy (BLE) could also be used as a means of initiating communication.

To reduce cost and complexity, in some cases smart devices might be avoided altogether. For example, RFID tags could be integrated into wristbands that have only basic on/off functionality. Users could touch their wristbands together to initiate conversation via Bluetooth (or another protocol), and buttons could be used to stop communication. These wristbands would be used in conjunction with adapted headsets as described above. Multiple channels could be built in to allow several sources to communicate with the wristband simultaneously. For example, 6 buttons might enable two channels preprogrammed by the bar and conversation ability with 4 friends simultaneously. As long as one channel is available, bumping wristbands would initiate a conversation on the next available channel. Time division multiplexing could be used to enable simultaneous communication across multiple channels.

RFID Sensors Throughout Bar

In cases where users were equipped with RFID tags (either worn, or integrated in their smart phones, for example), sensors could be placed around the bar to sense the position of the patrons. Their positions could be relayed to other smart devices via a mapping feature built into the mobile application software. Other forms of Indoor Positioning System are also possible.

Battery Chargers

Because the use of mobile smart devices and headphones is likely to consume a lot of energy, battery life may pose problems to implementation. For this reason the commercial establishment could keep extra batteries on hand for popular smart phone models. It would need to install a charging station to recharge its own batteries, and might choose to supply charging stations (wired or wireless) at tables, for example. Eventually wireless charging may advance (especially the range) to the point where users could be continually charging their phones while in the establishment. Alternatively, a super-capacitor solution may enable charging in a matter of seconds, eliminating this problem. External battery packs are another option in the meantime.

Smart Device Recognition Auto-Prompter

A device installed at a commercial establishment could recognize the presence of a new smart device. It could send a prompt to the device asking the user to download the application or a bar-specific plugin for the application. This would make it easy for users to download the appropriate software, ensuring that all users have access to the same platform and features. NFC (such as RFID) or signalling the device's microphone (as has been done by Shopkick) could be two enabling technologies.

Other Instrumentation

Gyroscopes, GPS, Magnetometers, and Accelerometers are other hardware adaptations that could be built into headsets or separate devices. These devices would enable the use of special software features, especially as related to methods of establishing and controlling communications. For example, this technology would enable users to look at each other from afar, and have communications automatically establish after locking eyes for a user-specified period, such as 1 second, for example. As described earlier, proximity based communications and distance attenuation (i.e. volume dependent on proximity) are also enabled by these types of instrumentation. Users might also control communications in virtual rooms through a compass, for example. To illustrate, imagine the compass pointed in the direction of voice propagation. Turning one's phone in another direction would cause the compass to point in another direction in the virtual room, meaning the sound could be focused on users located there. This has been done in gaming applications, but there would be many real world applications when used in conjunction with the various embodiments of the present invention.

Software Adaptations

Specialized software adaptations may also be required in the form of plug-ins or fully customized software applications. In general, a similar interface design and software architecture would underlie commercial adaptations. Each commercial use case could require different customizations.

Connection Adaptations

The Connect Screen (FIG. 2a) can be modified for various methods of establishing communication. For example, in public venues in which participants have not previously met, connections can be established through a proximity based event such as bumping phones together, or bringing phones very near one another. Different connection protocols can be used, but the general idea would be that a new connection could be established easily, and those new connections would show up on the Connect Screen. The users would then be able to establish and terminate voice conversations, groups, or to establish friendships and permissions that enable tying into the remaining functionality of the various embodiments of the present invention. In other cases, the initiation of communication with strangers may be entirely proximity based, and users would not first touch phones to exchange contact details. Instead, after speaking for some time, the users may decide to exchange details in order to enable future communication without being face to face. This might be the most natural way to connect in a bar, as it is very similar to the current experience. In this case, the connect screen might list nearby users in order of proximity, while buttons next to each device ID or nickname could be used to request 'friendships'. Different permissions could apply to these friendships, as exemplified by combining concepts demonstrated in FIG. 3b and FIG. 5a.

Profile Page

In a public setting, a user profile page could be used to share data and serve as a menu page from which various user-specific activities can be accessed. Each user would be required at a minimum to enter a name or nickname for identification purposes. Additional information can be provided and shared according to user preferences, and can make use of different device features including the camera and other on-board hardware. An option to synchronize to the user's Facebook profile or other social media platforms might integrated. Privacy settings and preferences could also be tailored to use cases at a bar, or certain types of events that may take place at the venue in question. FIG. 10b illustrates how some features may be used in the context of a bar or nightclub.

The chat/flirt feature: This can combine basic chat features, video chat, request to play games, canned one liners, group chat options, etc.
  Drink purchase feature: An optional feature allowing one user to purchase a drink electronically for another. The order could be automatic as soon as the 'drink request' was accepted. Other gifts could also be ordered, such as flowers, appetizers, etc. Some establishments may choose to use this feature as part of a game, whereby users compete to order at least one of each type of item for somebody else, for which they can be rewarded.

Mapping of Commercial Establishments

FIGS. 6a, 7d, and 7e depict the concept of mapping for use in commercial establishments like a bar. Venue owners would install positioning systems (Indoor Positioning System or GPS) compatible with mapping software such that users could track one another's position within the venue. Optical, radio, and acoustic based positioning systems could be used, but the software would need to be adapted to communicate with these positioning systems. Likewise, the positioning systems could have hardware adaptations for the software. Users could click on friends' icons in order to establish voice communications or to interact in other ways (such as sending a drink, a 'flirt', a game request, or otherwise). The map would be customizable by the venue owner, allowing him/her to draw walls, tables, and to place other items necessary for a proper layout diagram. The Bar Map could be part of a stand-alone software application purpose built for the bar as in FIG. 10c, or it could be integrated with a larger social network. FIG. 6a shows one method of integrating with an external application through the Menu bar, while FIG. 8a shows another (see Bar Plugins button on Expanded State of Menu Bar).

'Gamification' Features

Gamification is a term that has been given to the adoption of strategies that attempt to use game thinking mechanics to engage users for other purposes, especially in a marketing context. For example, by making competitions available to patrons at a bar, patrons can be encouraged interact with one another, improving both the user experience and providing an opportunity for the bar to sell additional services. This concept is illustrated in FIG. 10d. Many games that would otherwise not be feasible can be made to function in conjunction with some of the embodiments of the invention because of the dense user network created when all users are connected to the same communications network at a commercial or public venue. Some games may include:

Competitions whereby patrons must engage other users that meet certain profile criteria. For example, patrons may include in their profile such characteristics as education, job, age, hobbies, favourite artists, etc. The competition may be to find at least one person for each of a list of attributes. The bar may have a complete list of attributes to choose from assuming patrons share such attributes. Upon successfully connecting with those people, the bar could offer a free drink, for example.
  Competitions using the phone feature, whereby the bar may send its patrons a list of people that they must call and interact with for at least 2 minutes each in order to receive a drink discount.
  The bar may send out flirt suggestions, whereby they send a specific challenge to one user in regards to contacting another. For example, they may say "send the following one liner to User_X within 10 minutes to receive 20% off your next drink".
  Trivia games in which patrons compete within the bar, and among other bars.
  Games between users of different bars: Users at different bars can communicate with other application users, sharing such information as how full the bar is, rating the average 'hotness' of people in the bar, current specials, music, etc.
  Games between bars and prior customers: For example, the bar may maintain a database of previous customers and send them requests (if user settings allow) to participate in promotions, such as "the first 100 people through the door get free cover, or 50% off drinks". Customer retention mechanisms of other sorts are also possible given the database.
  Games could be designed to encourage interactivity with the bar's music or DJs. For example, users could compete for votes from the crowd which would entitle them to select music to be played in the bar or to communicate with the DJ on the crowd's behalf.
  Games could also be accessible outside of bars. To help privacy concerns, it could be a requirement that participating users have visited at least a certain number of real establishments before gaining access. Games outside of bars might include competitions that encourage users to meet and shop at partner retailers. For example, Starbucks may send out a discount coupon to several users who must meet at a Starbucks and touch phones in order to activate the discount.

A key feature of some bars games is that they can be mutually beneficial to the bar and the users by disguising intentions as "for the game". That is, the bar offers games to make the bar fun and to upsell its clientele, while its clientele are encouraged to interact with one another with under the pretense created by the games.

Augmented Reality Features

According to Wikipedia, augmented reality is "is a live, direct or indirect, view of a physical, real-world environment whose elements are augmented by computer-generated sensory input such as sound, video, graphics or GPS data". Features of this technology can be built into this application to augment user experience in a variety of ways. For instance, a phone might be held up and the camera used to identify other nearby users. User identification could be used to:

Overlay profile information on the user being viewed through the camera, including such information as whether or not they were open to meeting new people, and user entered data such as "please do not talk to me while I am dancing", or "Not educated? Not interested!"
  Overlaying options to communicate with the person being viewed through the camera.
  Communications could be established through interactivity with printed material. Layar is an application that enables such interactivity through object recognition (https://www.layar.com/). Communications could be established by providing buttons that overlay photos of friends that have been recognized by the system, for example. This feature might be used to recognize friends in photos, online profiles, websites, promotional material, or almost anywhere that one might put a printed or digital photograph.

FIG. 8b shows that the camera could be used to make this feature readily accessible.

Virtual Reality Features

Virtual reality could also be used in some embodiments of the present invention. In fact, many of the embodiments for real world use cases can be replicated in a virtual reality space. For example, silent discos and house parties could be replicated in a virtual space. Instead of speaking with someone who is physically nearby, proximity based communications could be established virtually. A user may approach an avatar to converse and share music, for instance. Alternatively, a 3D virtual workroom might be created in which individuals are able to listen to their own music and to still collaborate with others. Even simple use cases such as running could be replicated in a virtual environment. For example, a virtual reality headset might be worn while running on a treadmill, and friends running at the same time would be able to converse while listening to their music. The virtual reality device would simply add a visual component, perhaps a virtual world in which two runners on different continents could feel like they are running together, or competing on the same course. Virtual reality devices may contain sufficient instrumentation to facilitate, virtually, any of the use cases and embodiments described in this document.

Sound Channels Specific to Establishment

The audio settings interface could be modified to interact with specific channels available at a commercial establishment. For example, customers could choose to listen to different music or television channels as a result of wearing their own headphones. This concept is illustrated in FIG. 10f. They would still be in communication with their friends, who could be listening to the same or different programming. The details button illustrates that additional details could be accessed for each source, such as access to an equalizer and other sound settings like those illustrated earlier.

Upload to Cloud

When users have borrowed a device from a commercial establishment, and input or received information on the borrowed device, they may wish to have access to this information after leaving the establishment. A cloud based upload feature could address this, and could be a manual request or automatic as long as a user is signed in. Uploaded data may include contact details in the address book, photos, videos, points earned, or transactions, among other things.

Motorized Vehicle Integrations

As discussed earlier, some of the embodiments of the invention can be used to facilitate communications among drivers. Vehicle manufacturers and other product & service providers often make API's available such that software developers can provide for functionality with specific onboard hardware. This technology can also provide its own set of APIs for interoperability with products from other hardware and software providers. The following are a few examples of potential adaptations for enhanced interoperability with motorized vehicles:

Motorcycles: Interoperability with a motorcycle's visual console and intercom system, console buttons, onboard speakers, and handlebar controls. Interoperability with 3rd party equipment including Bluetooth ear pieces, helmet mounted cameras and communications systems, etc.).

Cars: Interoperability with visual console and GPS, onboard speakers, and 3rd party equipment designed to connect smart phones to the car's audio system (e.g. special Bluetooth modules, audio cables, tape and CD adapters, etc.).

Transport Trucks: Embodiments of the invention could be modified for functionality with CB radios if it doesn't supersede them completely. Software could be purpose designed to help tired truck drivers find and communicate with one another (only when desirable) to stay awake.

Other Potential Software Features

Voice Over Recording: Embodiments of the invention will have functionality for recording background audio and microphone audio separately. The would provide both higher quality audio and the option to edit each audio stream independently. Two example where this would be useful are:

In Karaoke Bars and Singing Rooms users could record their singing independently of background music, allowing them to edit it later.

Teens might record voice over messages or singing on their mix tapes. This feature could integrate with 3rd party applications such as "Songify".

Teen Plugin: For teen users, a plug-in could be installed to provide games and communication options that enable anonymity and discrete methods of communicating feelings towards others. For example, teens may indicate who they 'like' in their friends list, and receive notification when the opposite party 'likes' them back. Guessing games and anonymous user names could be used to help encourage teens to start communicating after a 'mutual like' had been detected.

Address book: An address book purpose designed for meeting new people in public. It would enable new contacts to be sorted using additional criteria (such as where they met, date of meeting, age, interests, special user notes about the conversations, etc.). This may be adapted for bars or specific types of events, but the data would feed into a central database compatible with the system or software.

Easily programmable menus, ordering, and payments: For bars, restaurants, and other commercial users, menus and electronic ordering and payments could be added. To minimize the need to tailor this feature for each customer, it could be made highly customizable such that menus, ordering, and payment options could all be set up by the commercial users. Payments would likely be integrated with an established provider such as PayPal or Google Wallet, for example.

Commercial Administrator Control: Commercial administrators may request access to record data transmitted through the system for the purposes of identifying their best customers and marketing to them. Alternatively they may monitor communications to protect users in a number of ways: inappropriate conduct would be minimized because the identity of abusers would be known by administrators; administrators could warn users of suspicious activity; administrators could keep a backup of data stored on the users' phones in the event that they are lost or stolen.

Speech to Text & Text to Speech

Real time language translation (could be used in combination with Speech to Text and Text to Speech).

Commercial Use Cases

Adapted Silent Disco Events

As described earlier, a silent disco is essentially a disco where people dance to music played through wireless headphones instead of loudspeakers. There are many other types of events based on a similar concept including silent theatre, silent disco pub crawls, group fitness events, and others. Any of these applications could be adapted and improved by enabling headset based communication in addition to the other audio sources that are already being transmitted to the headsets wirelessly. The audio from this communication could be mixed with or separate from other audio. Generally speaking, music would still be transmitted via FM, the receiver being either built into the headphones (as now) or through a purpose built accessory that can communicate with both a mobile phone and the headphones. Intelligent headsets could be used along with, or in place of, other hardware to enable functionality with the software features. For example, intelligent headsets or other hardware combinations may include hardware and instrumentation such as gyroscopes, magnetometers, accelerometers, and GPS.

The most fundamental change to existing silent disco style events will be the addition of communication. Whereas voice communication at silent disco events now requires users to remove their headsets, utilizing the new technology would enable simultaneous communication through the headsets. Modes of establishing connections could be intentional, as in the pushing of a button or a gesture; or they could be automatic, and based on sensing technology. For example, a precise GPS signal (or indoor positioning system) could detect when two users are very close to one another and automatically establish communication between them, so that being able to talk is proximity based (as in real life, without headphones). Alternatively, gyro sensors could be used to detect when two users are looking at one another, and establish communication then, even from a distance. Manual communication controls would be available on software installed to the phones, and combinations of manual and automated methods could be used to establish and control communications, creating very unique experiences.

Games at silent disco events and nightclubs: An important result of adapting silent disco technologies to include smart phones is that users could all be connected to a common network by default. For example, if all users installed the novel software on their devices to control communications, a dense network of users would be created. It would then be feasible for the system to include games and services that rely on dense networks of people. Some examples: a game that encourages people at a bar to meet each other to receive a free drink; a drink ordering and payment feature; features that enable the crowd to vote on something (like music, drink specials, or the winner of a competition). There are many more options, each of them with the ability to make a unique experience and keep people coming back to a particular event or venue.

Location based musical experiences: Location aware music is a new concept in which music can be streamed to a mobile device based on its location, as determined by GPS. Examples are "The National Mall" and "Listen to the Light" by Bluebrain. Listen to the Light plays different music depending on where the user is, enabling a musical interpretation of one's surroundings. Intelligent headsets can add another layer of interactivity because they can infer not only user location, but what users are looking at. Adding communication would enable the design and creation of many unique location based musical experiences. The application of this concept is not limited to the outdoors; indoor venues can utilize an indoor positioning system. Multiple layers of FM can be transmitted such that the musical experience can automatically change from one area (or room) to the next. In addition, more FM signals can be utilized by removing the limitation imposed by the switch on a traditional silent disco headset, and replacing it with software based selection on mobile phones.

Line of sight experiences: Because intelligent headsets can be aware of when two people are looking at each other, a layer of audio can be superimposed when they do. This might take the form of a game, where people choose a sound to transmit to people that they look at. Alternatively, it may be a sound layer that the DJ can impose on a selected audience by looking at it. A DJ might raise his hands and shine a light on a specific area of the crowd. Only the lit area of the crowd would receive the additional layer of music/sound, while the others would watch the light and anticipate it reaching them. These, and similar experiences would keep people wanting to come back to see what's next. These types of use cases would not be limited to DJs. Any band could choose to produce a silent disco style event in which the lights could be used in combination with the headphones for very unique experiences, with different forms of communication enabled throughout the entire show.

Tours: "Intelligent Headset", a specific headset made by GN Store Nord, has an app that enables a headset user to walk around a city, look at a building, and have the software recognize what it is and provide an informative narration. This technology, by itself, could be used to direct self guided tours. But group tours would be much more interesting by adding communication. Add a layer of music, and the experience becomes that much more unique and enjoyable. Silent disco style pub crawls are already being run in locations around the world including New York City. Merging these concepts together again yields a huge variety of opportunity. Imagine a city that speaks to the user and plays music according to where the user are, and being able to share that experience by communicating with friends in real time; whether or not they are a part of the group!

There are many more use case possibilities already known, and likely many more that will be conceived over time.

Bars and Clubs

Implementing a Silent Disco style embodiment of the invention in bars and nightclubs would offer a number of benefits to bar owners and patrons.

Benefits to Bar

Increased clientele through the following mechanisms:
  i) Demand for a unique service: improved ability to converse and play social games will draw users for a new experience.
  ii) Database: Bars could improve repeat business by improving their ability to reach previous customers. By using the application inside of a bar, users could choose to receive promotional offers from that bar. Likely, such offers would be 'gamified' in some way, making the promotions through the application more successful than conventional email promotions.
  iii) Word of mouth from others using the app.
  iv) Anything that is a benefit to the user/patron can result in increased demand for the bar, see below for more examples.

Increased revenue and reduced cost through the following mechanisms:
  i) Increased patronage=more drinks sold
  ii) Increased prices for drinks iii) Cover charge if demand is increased sufficiently
iv) Increased number of nights open (e.g. enough demand to stay open during the week, and getting around noise bylaws).
v) Pass cost onto users directly by renting out headphones and handheld terminals.
vi) More drinks purchased due to increased order speed—people ordering through phone means faster payment and foresight on order sizes enabling more efficient allocation of personnel. Waiters/waitresses can bring drinks to location from which it was ordered where bar map & RFID capabilities are installed. Efficiency may result in fewer personnel required.
vii) In some cases bars don't need to hire a DJ, or to spend as much money on expensive sound equipment. Such bars can rely on users to supply their own music through their Smart Devices, or upload music to the loaner devices.
viii) Reduced marketing costs (higher demand, regardless)

Noise reduction
i) Increased hours of operation (where noise bylaws limited before).
ii) Reduction in fines.
iii) Ability to open new bars in areas otherwise prohibited by noise ordinance including spaces with cheaper rent, outdoor spaces, nearer to residential neighbourhoods.

Value Proposition to Customers/Bar Patrons

There are numerous benefits to the user, some of which are listed below:
Headsets provide improved ability to communicate by allowing voice over top of music, with customizable volume levels. This can improve communication confidence for a number of reasons:
  i) The user doesn't need to awkwardly yell into somebody's ear to make them hear.
  ii) The user doesn't need to repeat himself multiple times to get a point across
  iii) The user can choose settings that allows the user to speak with someone without their friends, or the user's friends, being able to hear what's going on.
Mobile app features and games help to break the ice. Users can flirt more comfortably with greatly diminished fear of rejection. People have grown very comfortable when protected behind a screen. But by moving the screens into the same room, the step of meeting and actually conversing becomes much easier.
Customized audio inputs: As is the case in other silent parties, users can choose their own music if they do not like what is being played. This allows them to go to bars that they were otherwise uninterested in. Another example is at sports bars where they can switch between audio of different games.
Where specialized smart devices are rented from the bar, users can take photos of their night out without the need to bring their smartphones or an additional higher quality camera & flash. The rental devices could be slightly larger and purpose built.
Not waiting for drinks when the bar installs an automatic ordering feature.

Conference Centers

Booths could use RFID to transmit messages to conference attendees passing by. Conference attendees walking by would receive an invite from the booth to receive an audio stream and/or an information file that would be stored and organized within the application. Upon accepting the invitation, the conference attendee could change to an audio stream pertinent to the booth adjacent to him. Alternatively, the attendee could listen to a speech or Q&A session being presented elsewhere at the conference while he continued to browse booths or tend to his own.

Museums

Similar to existing audio guides, patrons would receive audio streams pertinent to their current location in the museum. The use of a microphone would enable users to speak with friends (both proximal and in other parts of the museum) more conveniently (without removing headset) and more quietly (amplification through microphone). Features could be built into the mobile application to allow users to read and download information related to each exhibit. The application could be designed to store and organize this information in conjunction with photos that the user takes.

Movies & Live Theatre

Theatre-goers could speak with their friends without disturbing others. Additionally, new theatres could be constructed with minimal attention to soundproofing as the noise level would be lower and ambient noise would be cancelled through the headphones, leaving the audio experience of the user unaffected. Furthermore, different audio signals could be sent to different users, in different languages for example.

Dispatch Applications

Dispatch applications include public safety and emergency response, transportation dispatch (taxi, transport, train & other freight), public utility, and military. Dispatch operations often require that several communication channels be monitored and that field operators can be quickly reached by the dispatchers. Likewise field operators may be operating different channels simultaneously, and desire flexibility with different communications modes and more flexibility with audio settings. Several aspects and features of the various embodiments of this invention can be leveraged for these purposes, and can be adapted for interoperability with existing hardware and software that is already used by dispatch operators and field personnel.

Construction & Other Worksites

Ear protection is often worn by construction workers and others involved in noisy operations. This ear protection could be purpose designed to include headphone speakers and microphones for communications. In conjunction with a suitable network infrastructure, this would make persistent voice connections feasible, thereby increasing collaboration and safety. Safety could be further improved through hands-free operation of the communication system. Workers would not need to risk dropping tools to grab for a walkie talkie, and they would not need to divert their attention from what they are doing in order to communicate.

General Note on Methods and Computer-Readable Medium

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electro-magnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

The present invention has been described in terms of specific embodiments, examples, implementations and configurations which are intended to be exemplary or illustrative only. Other variants, modifications, refinements and applications of this innovative technology will become readily apparent to those of ordinary skill in the art who have had the benefit of reading this disclosure. Such variants, modifications, refinements and applications fall within the ambit and scope of the present invention. Accordingly, the scope of the exclusive right sought by the Applicant for the present invention is intended to be limited solely by the appended claims and their legal equivalents.

The invention claimed is:

1. A system comprising:
a first device and a second device,
each device being operatively coupled to a microphone,
each device having access to a set of instructions in code,
the code containing instructions for executing voice communication between the devices over a network,
the code containing instructions wherein the audio signals admitted through the microphones are continuously monitored wherein the signals are, on a continuous basis, identified as either human voice, or not,
the code containing instructions for playing background audio from a source other than the device's microphone,
the code containing instructions for communicating to a second device, the ongoing presence of voice, or lack thereof, on the first device, and
the code containing instructions to automatically adjust background audio on the second device when human voice on the first device is detected.

2. The system of claim 1, wherein the automatic background audio adjustment is related to ducking the volume of background audio.

3. The system of claim 1, wherein the basis for detecting the presence of human voice is a threshold-based Voice Activity Detection.

4. The system of claim 1, wherein the basis for detecting the presence of human voice is Speech Recognition.

5. The system of claim 1, wherein the human voice detection code is executed on the first device.

6. The system of claim 1, wherein the network is a peer to peer based network.

7. The system of claim 1, wherein the code is further configured to selectively duck background audio signals within a specific frequency band.

8. The system of claim 1, wherein the first device contains a display screen.

9. The system of claim 8, wherein the code is further configured to display a user interface object that controls the ducked volume of background audio when voice is detected on the second device during duplex communication.

10. The system of claim 8, wherein the code is further configured to display the following set of user interface objects on a single screen:
a friends list;
a Push-To-Talk (PTT) button; and
a Two-Way (Duplex) Voice Calling Button.

11. The system of claim 8, wherein the code is further configured to display a user interface object having a single volume slider capable of controlling a proportionate volume relationship between a voice audio signal and one other audio signal.

12. The system of claim 8, wherein the code is further configured to display a user interface object comprising a set of volume sliders wherein at least one slider controls voice, and a second volume slider controls another audio input, and wherein the user interface object includes a control, on a volume slider, or otherwise, for setting a ducked level of music, the ducked level related to the detection of human voice activity on the other device.

13. A method comprising:
at a first device with a display,
displaying a user interface object having a control for controlling a ducked level of background audio;
detecting a first input;
recording the input as a setting that controls the ducked level of background audio;
ducking the background audio to the ducked level in response to receiving a positive voice signal from a second device;
at the second device with a display,
detecting the presence of human voice on the second device by means of a threshold-based Voice Activity Detection;
recording the input as a positive voice signal;
transmitting the positive voice signal from the second device to the first device.

14. A method comprising:
at a first device with a display,
displaying a user interface object having a control for controlling a ducked level of background audio;
detecting a first input;
recording the input as a setting that controls the ducked level of background audio; and
ducking the background audio to the ducked level in response to receiving a positive voice signal from a second device;
at the second device with a display,
detecting the presence of human voice on the second device by means of Speech Recognition;
recording the input as a positive voice signal; and
transmitting the positive voice signal from the second device to the first device.

15. The system of claim 8, wherein the code is further configured to display a user interface object comprising a Media Player.

16. The system of claim 15, wherein the code is further configured to display a user interface object comprising a Connect Screen.

17. The system of claim 16, wherein the code is further configured to display a user interface object comprising buttons capable of toggling back and forth between the Media Player and the Connect Screen.

18. The system of claim 8, wherein the code is further configured to display a user interface element to mute and unmute a persistent connection with another communication device.

19. The system of claim 8, wherein the code is further configured to display the following set of user interface objects:
a friends list;
a button allowing users to share music with friends.

20. The system of claim 8, wherein the code is further configured to display the following set of user interface objects:
a friends list;
a button allowing users to share media with friends.

21. The system of claim 1, wherein the code is further configured to execute an Offline Mode.

22. The system of claim 1, wherein the background audio is delivered via FM transmission.

\* \* \* \* \*